US012737656B2

(12) United States Patent
Soeken et al.

(10) Patent No.: US 12,737,656 B2
(45) Date of Patent: Sep. 15, 2026

(54) DOUBLY CONTROLLED IX CIRCUIT

(71) Applicant: Microsoft Technology Licensing, LLC, Redmond, WA (US)

(72) Inventors: Mathias Soeken, Montreux (CH); Thomas Haener, Zug (CH); Vadym Kliuchnikov, Redmond, WA (US); Martin Henri Roetteler, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1053 days.

(21) Appl. No.: 17/806,927

(22) Filed: Jun. 14, 2022

(65) Prior Publication Data

US 2023/0401474 A1 Dec. 14, 2023

(51) Int. Cl.
*G06N 10/40* (2022.01)
*G06F 15/82* (2006.01)

(52) U.S. Cl.
CPC ............. *G06N 10/40* (2022.01); *G06F 15/82* (2013.01)

(58) Field of Classification Search
CPC ........ G06N 10/40; G06N 10/20; G06N 10/70; G06F 15/82
See application file for complete search history.

(56) References Cited

U.S. PATENT DOCUMENTS 11,119,773 B1 * 9/2021 Soeken .................. G06N 10/40
11,586,969 B2 * 2/2023 Gidney .................. G06N 10/20
11,863,668 B2 * 1/2024 McCarty ............... H04L 9/0858
2016/0328253 A1 11/2016 Majumdar
2017/0194930 A1 7/2017 Wiebe et al.
2020/0311592 A1 10/2020 Gidney
2020/0311593 A1 10/2020 Gidney
2020/0311594 A1 10/2020 Gidney
2020/0401478 A1 12/2020 Reilly (Continued)

FOREIGN PATENT DOCUMENTS

CA 3135494 A1 10/2020

OTHER PUBLICATIONS

"International Search Report and Written Opinion Issued in PCT Application No. PCT/US2023/012066", Mailed Date: Apr. 19, 2023, 15 Pages.

(Continued)

*Primary Examiner* — An H Do
(74) *Attorney, Agent, or Firm* — Alleman Hall LLP

(57) ABSTRACT

A quantum computing device including a doubly controlled iX (CCiX) circuit. The CCiX circuit may be configured to, in a preparation stage, prepare a plurality of magic states. The CCiX circuit may be further configured to receive a plurality of input qubit states including a first control qubit state, a second control qubit state, and a target qubit state. In an execution stage, the CCiX circuit may be further configured to perform a CCiX operation on the target qubit state at least in part by performing a plurality of local joint measurements. At least a subset of the plurality of local joint measurements may be performed between the plurality of magic states and a plurality of auxiliary qubits. Performing the CCiX operation may further include performing a plurality of remote joint measurements of the input qubit states and a plurality of interface qubits included among the plurality of auxiliary qubits.

20 Claims, 45 Drawing Sheets

(56) References Cited

U.S. PATENT DOCUMENTS

| | | | |
|---|---|---|---|
| 2021/0374586 A1 | 12/2021 | Kliuchnikov et al. |
| 2023/0143652 A1 | 5/2023 | Mckiernan |
| 2023/0401470 A1 | 12/2023 | Soeken |

OTHER PUBLICATIONS

Srikanth, R., "Entanglement, Intractability and No. Signaling", In Journal of Physica Scripta, vol. 81, Issue 6, May 11, 2010, pp. 1-15.
Ceschini, et al., "Design of an LSTM Cell on a Quantum Hardware", In Journal of IEEE Transactions on Circuits and Systems II: Express Briefs, vol. 69, Issue 3, Mar. 2022, pp. 1822-1826.
"International Search Report and Written Opinion Issued in PCT Application No. PCT/US2023/012065", Mailed Date: May 15, 2023, 15 Pages.
Babbush, et al., "Encoding Electronic Spectra in Quantum Circuits with Linear T Complexity", In Journal of Physical Review X, vol. 8, Issue 4, Oct. 23, 2018, 36 Pages.
Bombin, et al., "Logical Blocks for Fault-Tolerant Topological Quantum Computation", In Repository of arXiv:2112.12160v1, Dec. 22, 2021, 34 Pages.
Bravyi, et al., "Universal Quantum Computation with Ideal Clifford Gates and Noisy Ancillas", In Journal of Physical Review A, vol. 71, Issue 2, Feb. 22, 2005, 14 Pages.
Burg, et al., "Quantum Computing Enhanced Computational Catalysis", In Journal of Physical Review Research, vol. 3, Issue 3, Jul. 16, 2021, 16 Pages.
Crooks, Gavin E., "Gates, States, and Circuits", Retrieved from: https://threeplusone.com/pubs/on_gates.pdf, Jan. 12, 2022, 79 Pages.
Fowler, et al., "Low Overhead Quantum Computation using Lattice Surgery", In Repository of arXiv:1808.06709v4, Aug. 30, 2019, 15 Pages.
Gidney, et al., "Flexible Layout of Surface Code Computations using AutoCCZ States", In Repository of arXiv:1905.08916v1, May 22, 2019, 17 Pages.
Gidney, et al., "How to Factor 2048 Bit RSA Integers in 8 Hours using 20 Million Noisy Qubits", In Repository of arXiv:1905.09749v1, May 23, 2019, 25 Pages.
Haner, et al., "Improved Quantum Circuits for Elliptic Curve Discrete Logarithms", In Proceedings of International Conference on Post-Quantum Cryptography, Apr. 15, 2020, pp. 425-444.
Lee, et al., "Even More Efficient Quantum Computations of Chemistry Through Tensor Hypercontraction", In Journal of PRX Quantum, vol. 2, Issue 3, Jul. 8, 2021, 62 Pages.
Litinski, et al., "Quantum Computing with Majorana Fermion Codes", In Journal of Physical Review B, vol. 97, Issue 20, May 2, 2018, 27 Pages.
Low, et al., "Trading T-Gates for Dirty Qubits in State Preparation and Unitary Synthesis", In Repository of arXiv:1812.00954v1, Dec. 3, 2018, 11 Pages.
Nielsen, et al., "Quantum Computation and Quantum Information", In Publication of Cambridge University Press, 2010, 704 Pages.
Rosenbaum, David J., "Optimal Quantum Circuits for Nearest-Neighbor Architectures", In Repository of arXiv:1205.0036v3, May 8, 2013, 24 Pages.
Shor, Peter W., "Polynomial-Time Algorithms for Prime Factorization and Discrete Logarithms on a Quantum Computer", In SIAM Journal on Computing, vol. 26, Issue 5, Oct. 1997, pp. 1484-1509.
Final Office Action mailed on Dec. 1, 2025, in U.S. Appl. No. 17/806,923, 18 pages.
Communication pursuant to Article 94(3) EPC Received for European Application No. 23709797.7, mailed on Jan. 15, 2026, 08 pages.
Non-Final Office Action mailed on Jul. 24, 2025, in U.S. Appl. No. 17/806,923, 25 pages.
Notice of Allowance mailed on Apr. 24, 2026, in U.S. Appl. No. 17/806,923, 10 Pages.

* cited by examiner

122

150
S
=
|S⟩
Z
X

152
S
=
|S⟩
Z 160
a
=
152
|+⟩
|+⟩
a
Z
X
c1
c2
a

162
|+⟩
|+⟩
=
X
Z
|CZ⟩

430

432

434 z
Z
=
462
460
A
B
C
D
E
X
B
464
470
τ1
τ2
|t1⟩
|t2⟩
2n+1
QUBITS
PATH
472
2n
QUBITS
PATH
474

480

500

510

540

|c⟩

|t⟩

=

A B C D E

542

544

|c⟩

|t ⊕ c⟩

550

|c⟩

|t⟩

=

A B C D E

552

554

|c⟩

|t ⊕ c⟩

600
|q1⟩
|q2⟩
=
B
B
|GHZ2⟩
602
|q1⟩
•••
|qn-1⟩
|qn⟩
=
Z
X
Z
X
|GHZn⟩
604
|q1⟩
•••
|qn-2⟩
|qn-1⟩
|qn⟩
=
B
B
Z
Z
X
X
|GHZn⟩
606
|q1⟩
|q2⟩
=
B
B
|GHZ2⟩X
608
|q1⟩
•••
|qn-1⟩
|qn⟩
=
X
Z
X
Z
|GHZn⟩X
610
|q1⟩
•••
|qn-2⟩
|qn-1⟩
|qn⟩
=
B
B
X
X
Z
Z
|GHZ2⟩X

DOUBLY CONTROLLED IX CIRCUIT

BACKGROUND

For certain computational tasks, quantum computers are known to asymptotically outperform classical computers. Examples of such tasks are factoring large numbers and simulating some properties of molecular orbitals. To assess whether an asymptotic speedup translates to a computational advantage in practice, a quantum algorithm is broken down into elementary operations for which runtime estimates can be derived from a chosen error correction protocol. Promising applications may then be optimized to reduce resource requirements (e.g. qubits and time) further. Over the recent years, quantum algorithms for applications such as factoring and simulating quantum chemistry have been optimized significantly. Researchers have explored various tradeoffs (e.g., space for time) in order to reduce the overhead costs associated with achieving fault-tolerant implementations of such algorithms.

SUMMARY

According to one aspect of the present disclosure, a quantum computing device is provided, including a doubly controlled iX (CCiX) circuit. The CCiX circuit may be configured to, in a preparation stage, prepare a plurality of magic states. The CCiX circuit may be further configured to receive a plurality of input qubit states including a first control qubit state, a second control qubit state, and a target qubit state. In an execution stage, the CCiX circuit may be further configured to perform a CCiX operation on the target qubit state at least in part by performing a plurality of local joint measurements. At least a subset of the plurality of local joint measurements may be performed between the plurality of magic states and a plurality of auxiliary qubits. Performing the CCiX operation may further include performing a plurality of remote joint measurements of the input qubit states and a plurality of interface qubits included among the plurality of auxiliary qubits.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Table lookup is a subroutine that may be used to reduce the resource requirements for state preparation and arithmetic performed at a quantum computing device. Table lookup may, for example, be used in implementations of Shor's algorithm for factoring, algorithms for computing discrete logarithms, and quantum chemistry algorithms. Since table lookup operations have broad applications in quantum computing, reducing the qubit requirements and time requirements of table lookup may allow a wide variety of quantum algorithms to be performed more efficiently.

Figure 1:
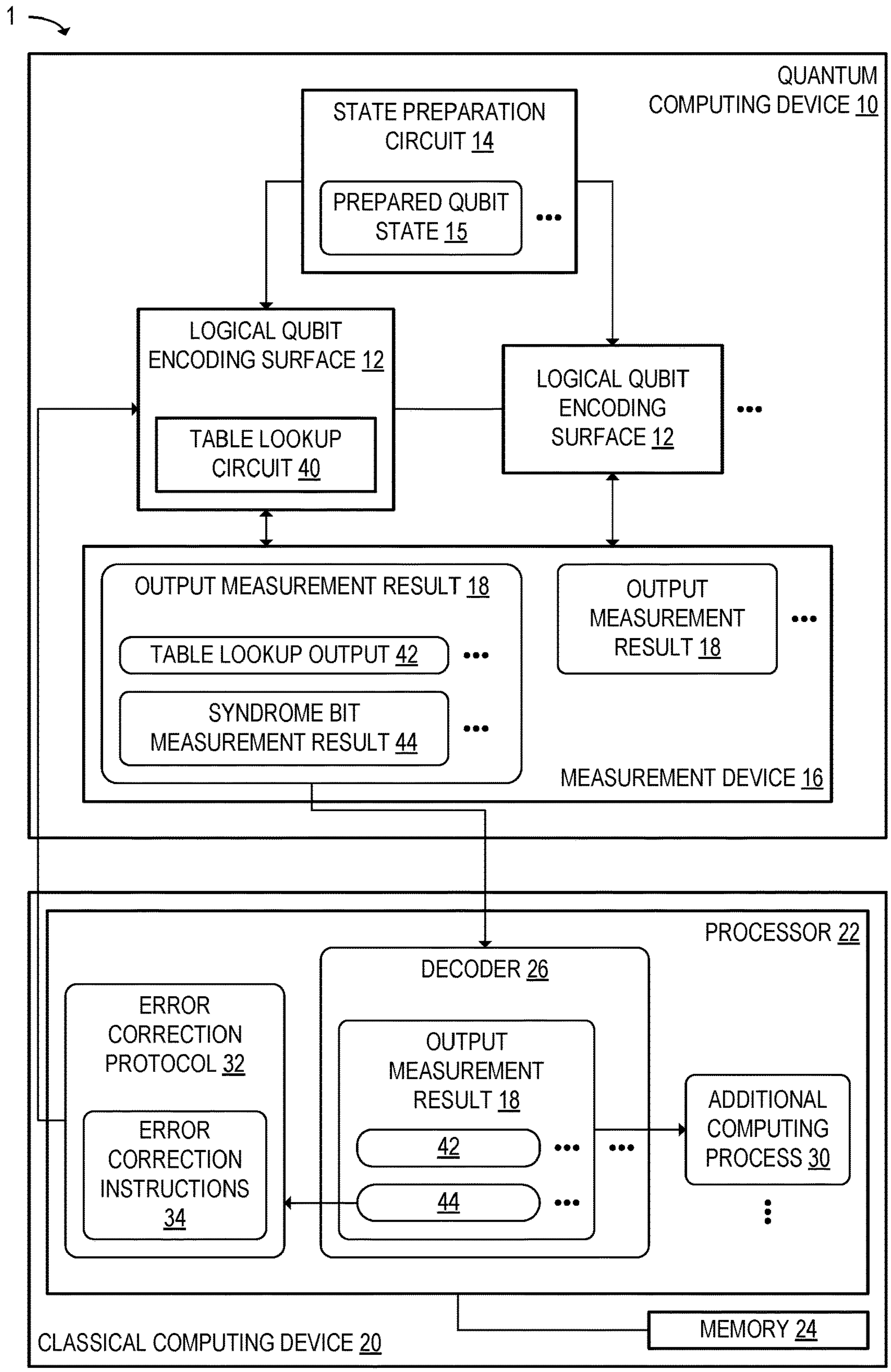
FIG. 1 schematically shows an example computing system including a quantum computing device that is communicatively coupled to a classical computing device, according to one example embodiment.

FIG. 1 schematically shows an example computing system 1 including a quantum computing device 10 that is communicatively coupled to a classical computing device 20. The quantum computing device 10 may include one or more logical qubit encoding surfaces 12. At each of the logical qubit encoding surfaces 12, a plurality of logical qubits may be encoded by corresponding arrays of physical qubits. Encoding the logical qubits using arrays of physical qubits may allow the logical qubits to be instantiated in a fault-tolerant manner in which errors that occur at the logical qubit encoding surface 12 may be identified and corrected.

The quantum computing device 10 may further include a state preparation circuit 14 at which a plurality of prepared qubit states 15 may be generated as inputs to the one or more logical qubit encoding surfaces 12. For example, the plurality of prepared qubit states 15 may include a plurality of magic states that may allow for universal quantum computation when subjected to Clifford operations. Additionally or alternatively, the prepared qubit states 15 may include other states such as a blank state of a qubit register.

The quantum computing device 10 may further include a measurement device 16 at which measurements may be performed on qubits included in the one or more logical qubit encoding surfaces 12. By performing measurements at the one or more logical qubit encoding surfaces 12, the quantum computing device 10 may be configured to perform quantum computations on the prepared qubit states 15 by applying logic gates. At the measurement device 16, the quantum computing device 10 may be configured to measure a plurality of output qubit states to obtain a plurality of output measurement results 18. The measurement device 16 may be further configured to transmit the plurality of output measurement results 18 to the classical computing device 20. The output measurement results 18 may, in some examples, include one or more syndrome bit measurement results 44 that may indicate one or more locations on the one or more logical qubit encoding surfaces 12 at which errors have occurred.

The quantum computing device 10 may include a table lookup circuit 40 located on a corresponding logical qubit encoding surface 12. At the table lookup circuit 40, measurements may be performed on a plurality of prepared qubit states 15 as discussed below to perform table lookup operations. Thus, the output measurement results 18 computed for the output qubits of the table lookup circuit 40 may include a plurality of table lookup outputs 42. The lookup table outputs 42 may be transmitted to the classical computing device 20 subsequently to measurement at the measurement device 16.

The classical computing device 20 may include a processor 22 that is communicatively coupled to memory 24. The processor 22 may include one or more physical processing devices, which may, for example, include one or more central processing units (CPUs), graphical processing units (GPUs), application-specific integrated circuits (ASICs), field-programmable gate arrays (FPGAs), specialized hardware accelerators, or other types of classical processing devices. The memory 24 may, for example, include one or more volatile memory devices and/or one or more non-volatile memory devices.

In some examples, the computing system 1 may be instantiated in a single physical computing device that includes both the quantum computing device 10 and the classical computing device 20. Alternatively, the computing system 1 may be provided as a plurality of communicatively coupled physical computing devices. In some examples, the functionality of the quantum computing device 10 and/or the classical computing device 20 may be divided between a plurality of interconnected physical computing devices, such as server computing devices located in a data center.

The processor 22 of the classical computing device 20 may be configured to implement a decoder 26 that is configured to receive the measurements of the plurality of output measurement results 18 from the quantum computing device 10. At the decoder 26, the processor 22 may be configured to preprocess the output measurement results 18 into forms in which further classical computations may be performed on the output measurement results 18. The preprocessed measurements may subsequently be transmitted to one or more additional computing processes 30.

In examples in which the output measurement results 18 include one or more syndrome bit measurement results 44, the syndrome bit measurement results 44 may be preprocessed at the decoder 26 and input into an error correction protocol 32. At the error correction protocol 32, the processor 22 may be configured to generate error correction instructions 34 that may be transmitted to the quantum computing device 10 for execution at the one or more logical qubit encoding surfaces 12. Thus, errors that occur at the one or more logical qubit encoding surfaces 12 may be corrected.

The operation of the table lookup circuit 40 is discussed in further detail below. As preliminaries to the discussion of the operation of the table lookup circuit 40, the operation of logic gates that may be included in the table lookup circuit 40 is now discussed. A controlled not (CNOT) gate is defined as:

$$|c\rangle|t\rangle \mapsto |c\rangle|t \oplus c\rangle$$

where $|c\rangle$ is a control qubit and $|t\rangle$ is a target qubit. A multi-target CNOT gate is defined as:

$$|c\rangle|t_1\rangle \ldots |t_m\rangle \mapsto |c\rangle|t_1 \oplus c\rangle \ldots |t_m \oplus c\rangle$$

In the above definitions, $\oplus$ is used to denote both Boolean and bitwise exclusive or (XOR).

A table lookup function has k input qubits $|x\rangle=|x_1 \ldots x_k\rangle$ and m output qubits $|y\rangle=|y_1 \ldots y_m\rangle$. The input $|x\rangle$ has a number of input qubits $k \geq \lceil \log_2 K \rceil$, where K is a number of bit strings $d_0, \ldots, d_{K-1}$ that each have length m. These bit strings are the data that is looked up by the table lookup circuit 40. The table lookup function maps $$|x\rangle|y\rangle \mapsto |x\rangle|y \oplus f(x)\rangle$$

where $f(x_1, \ldots, x_k)=d_x$ if $x=(x_1 \ldots x_k)_2<K$ and an arbitrarily chosen output if $x \geq K$. In the input assignment, $x_1$ is the most significant bit. For K=1 and k=0 input qubits, the function $f$ becomes a constant bit string $d_0$, and the definition of the table lookup operation becomes $|y\rangle \mapsto |y \oplus d_0\rangle$.

A controlled table lookup function is defined similarly to the uncontrolled table lookup function discussed above, but with an additional control qubit $|c\rangle$. The controlled table lookup function maps $$|c\rangle|x\rangle|y\rangle \mapsto |c\rangle|x\rangle|c\,?\,y \oplus f(x):y\rangle$$

where the "?•:•" denotes an if-then-else operation.

For a bit string a of length m, a bitwise XOR operation maps $$|y\rangle \mapsto |y \oplus a\rangle$$

where $|y\rangle$ is an m-qubit computational basis state. Thus, the bitwise XOR operation is a table lookup with zero inputs. A controlled bitwise XOR (CXOR) operation maps $$|c\rangle|y\rangle \mapsto |c\rangle|c\,?\,y \oplus a:y\rangle$$

and is, accordingly, a controlled table lookup operation with zero inputs.

Figure 2C:
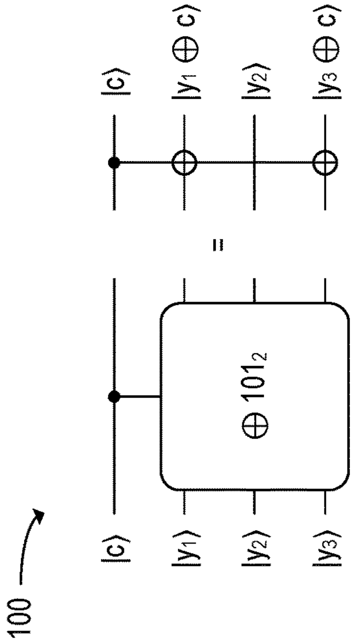
FIGS. 2A-2C show an example controlled exclusive or (CXOR) gate, according to the example of FIG. 1.
Figure 2B:
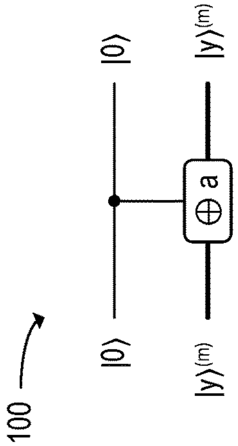
Figure 2A:
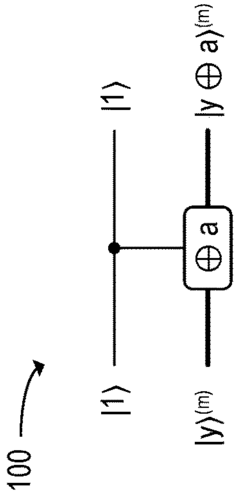

FIG. 2A shows an example of a CXOR gate 100 implemented using a multi-target CNOT gate when the control qubit $|c\rangle$ is set to $|1\rangle$. When the control qubit $|c\rangle$ is set to $|1\rangle$ as shown in FIG. 2A, the CXOR gate outputs $|y \oplus a\rangle^{(m)}$. The state of the control qubit $|c\rangle$ remains unchanged. In FIG. 2A and subsequent figures, the bold line and the superscript (m) represent an m-qubit register.

FIG. 2B shows the example CXOR gate 100 of FIG. 2A when the control qubit $|c\rangle$ is set to $|0\rangle$. When the control qubit $|c\rangle$ is set to $|0\rangle$ as shown in FIG. 2B, the CXOR gate outputs $|y\rangle^{(m)}$. The state of the control qubit $|c\rangle$ remains unchanged. Thus, the control qubit $|c\rangle$ controls the CXOR gate 100 such that the table lookup is performed when $|c\rangle=|1\rangle$ and the state $|y\rangle$ is left unchanged when $|c\rangle=|0\rangle$.

FIG. 2C shows the CXOR gate 100 in an example in which the number of output qubits m=3 and the output bit string a=101. The subscript 2 in the CXOR gate 100 indicates that a is configured to be expressed in binary. In the example of FIG. 2C, the CXOR gate 100 maps $|y_1\rangle\rangle$ $|y_1\oplus c\rangle$, $|y_2\rangle\rangle|y_2\rangle$ and $|y_3\rangle\rangle|y_3\oplus c\rangle$. The state of the control qubit $|c\rangle$ remains unchanged.

Figure 3:
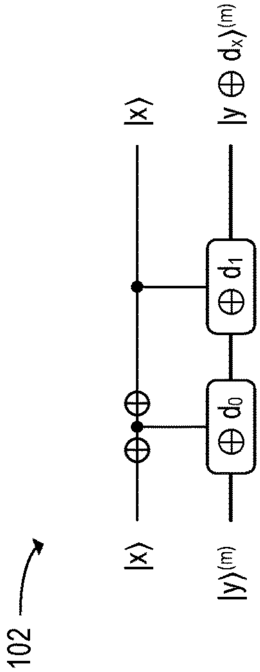
FIG. 3 shows an example of a one-input table lookup for two bit strings, according to the example of FIG. 1.

FIG. 3 shows an example of a one-input lookup table circuit 102 for two bit strings $d_0$ and $d_1$. In the example of FIG. 3, the function $f(x)$ has a type $f:\{0,1\}\rightarrow\{0,1\}^m$. The example one-input table lookup circuit 102 includes two XOR gates $\oplus d_0$ and $\oplus d_1$. Performing the one-input table lookup maps $|y\rangle^{(m)}\rangle|y\oplus d_x\rangle^{(m)}$ and leaves $|x\rangle$ unchanged. Thus, the state of $|x\rangle$ determines whether $d_0$ or $d_1$ is selected.

Figure 4A:
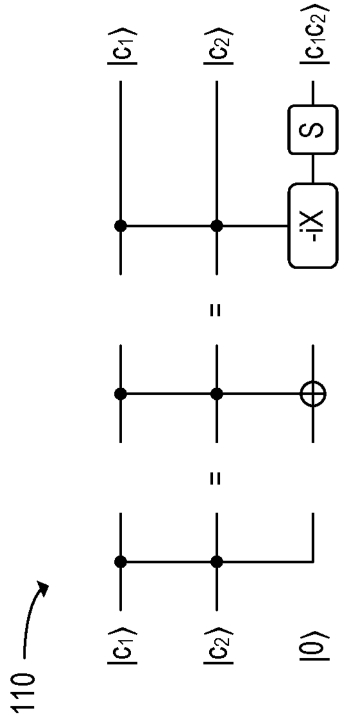
FIG. 4A shows an example AND gate, according to the example of FIG. 1.
Figure 4B:
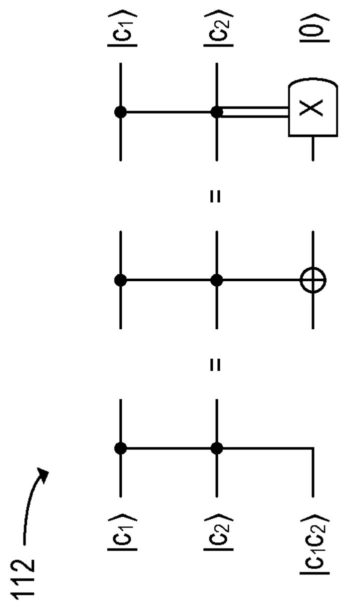
FIG. 4B shows an example $\text{AND}^{\dagger}$ gate, according to the example of FIG. 1.

As discussed in further detail below, an AND gate and an AND† gate may additionally be utilized in a controlled one-input table lookup, where † indicates a conjugate transpose. An example AND gate 110 and an example AND† gate 112 are respectively depicted in FIG. 4A and FIG. 4B. The AND gate 110 of FIG. 4A is configured to perform an AND operation to the input qubits $|c_1\rangle$ and $|c_2\rangle$ and write an output $|c_1c_2\rangle$ to an output register initially set to $|0\rangle$. The AND† gate 112 of FIG. 4B is configured to receive $|c_1\rangle$, $|c_2\rangle$, and $|c_1c_2\rangle$ as inputs and map $|c_1c_2\rangle\mapsto|0\rangle$. Thus, the AND gate 110 and the AND† gate 112 are inverses of each other. The AND gate 110 includes a −iX gate and an S gate, and the AND† gate 112 includes an X measurement. As discussed in further detail below, the −iX gate shown in FIG. 4A is a doubly controlled iX (CCiX) gate. In the examples of FIGS. 4A-4B, the AND gate 110 consumes four $|T\rangle$ magic states or one $|CCZ\rangle$ magic state as additional input, whereas the ANDY gate 112 may be implemented without consuming any magic states.

Figure 5A:
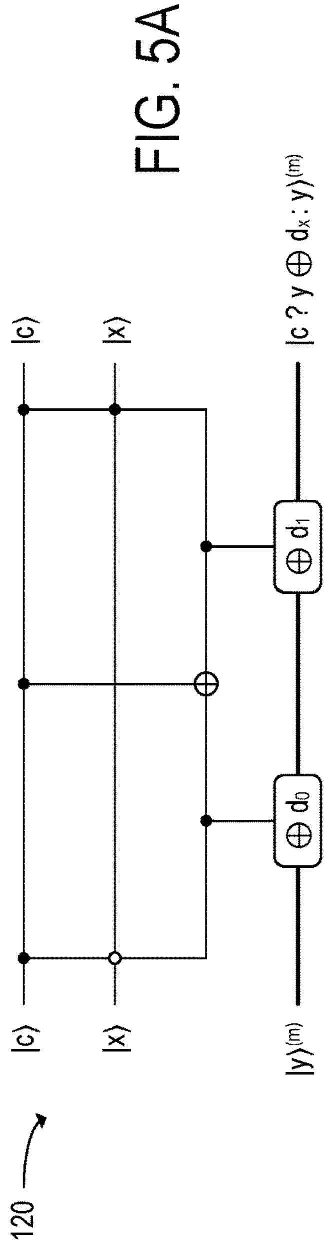
FIG. 5A shows an example of a controlled one-input table lookup circuit, according to the example of FIG. 1.

FIG. 5A shows an example controlled one-input table lookup circuit 120, which may be an example of the table lookup circuit 40 of FIG. 1. The controlled one-input table lookup circuit 120 includes an AND gate 110 and an ANDY gate 112. In the example of FIG. 5A, the controlled one-input table lookup circuit 120 is configured to map $|y\rangle^{(m)}\mapsto|c?y\oplus d_x:y\rangle^{(m)}$ while leaving $|c\rangle$ and $|x\rangle$ unchanged. The open dot in FIG. 5A indicates that an output is controlled on a $|0\rangle$ state, whereas a closed dot indicates that the output is controlled on a $|1\rangle$ state. Thus, the first CXOR gate is executed when $|c\rangle$ is $|0\rangle$ and $|x\rangle$ is $|1\rangle$, and the second CXOR gate is executed when both $|c\rangle$ and $|x\rangle$ are $|1\rangle$. As in the example one-input table lookup circuit 102 of FIG. 3, the function $f(x)$ has the type $f:\{0,1\}\rightarrow\{0,1\}^m$ in FIG. 5A.

Figure 5B:
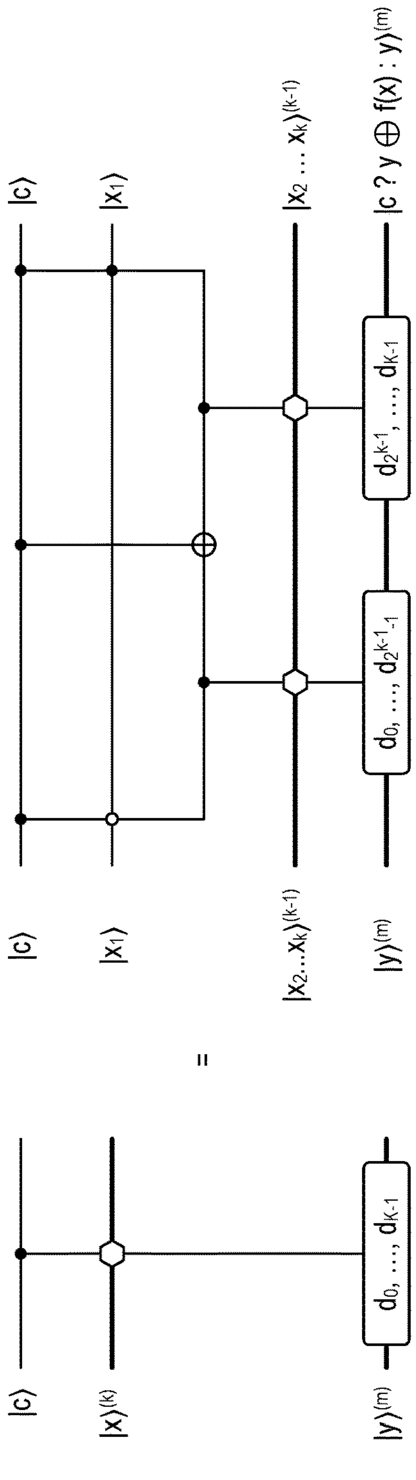
FIG. 5B shows an example of a controlled multi-input table lookup circuit, according to the example of FIG. 1.
Figure 5C:
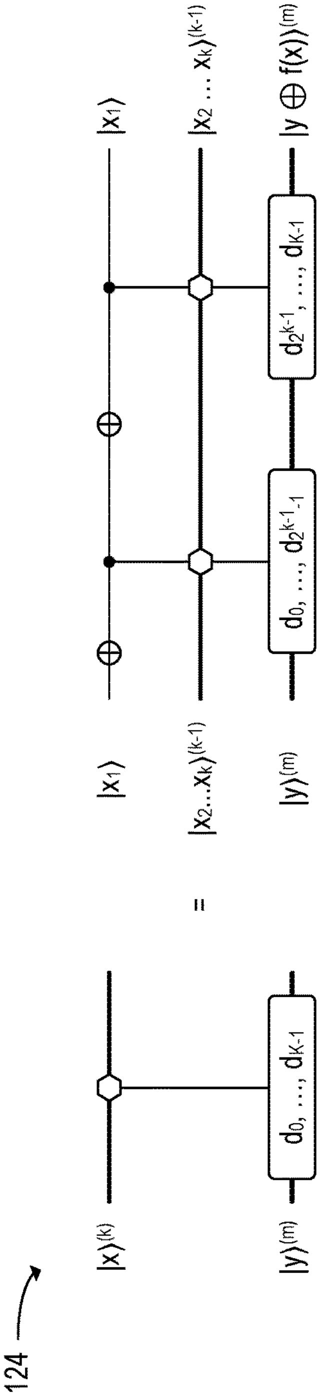
FIG. 5C shows an example of two controlled (k−1)-input table lookup circuits that are combined into a k-input table lookup circuit, according to the example of FIG. 1.

FIGS. 5B-5C show multi-input table lookup circuits 122 and 124 that may be additional examples of the table lookup circuit 40 of FIG. 1. As shown in FIGS. 5B-5C, multi-input table lookup circuits 122 and 124 may be constructed recursively from the controlled one-input table lookup circuit 120 of FIG. 5A. The multi-input table lookup circuits constructed as shown in FIGS. 5B-5C may therefore be referred to as unary-iterate table lookup circuits. FIG. 5B shows a controlled multi-input table lookup circuit 122. The input registers of the controlled multi-input table lookup 122 are denoted with hexagons. In the controlled multi-input table lookup circuit 122 of FIG. 5B, the input qubits other than the first input qubit $|x_1\rangle$ are located in a position corresponding to that of the output register of the controlled one-input table lookup circuit 120 of FIG. 5A.

The controlled multi-input table lookup circuit 122 is configured to perform a table lookup operation over K bit strings $d_0, \ldots, d_{K-1}$ when $k=\lceil \log_2 K\rceil$ inputs are received. The controlled multi-input table lookup 122 is configured to split the plurality of bit strings into two sets, the first set including the first $2^{k-1}$ bit strings and the second set including the rest of the bit strings. In the example of FIG. 5B, the first set is addressed when the most-significant bit $x_1$ is 0, and the second set is addressed when the most-significant bit $x_1$ is 1. This addressing structure corresponds to the co-factors $f(0, x_2, \ldots, x_k)$ and $f(1, x_2, \ldots, x_k)$ of $f$. Accordingly, in the controlled multi-input table lookup circuit 122, a table lookup operation over k input bits may be divided into two controlled table lookup operations over k−1 bits. In some examples, the input register in the controlled table lookup performed on $f(1, x_2, \ldots, x_k)$ may take fewer than k−1 inputs.

FIG. 5C shows two controlled (k−1)-input table lookup circuits that are combined into a k-input table lookup circuit 124. In the example k-input table lookup circuit of FIG. 5C, a negatively controlled table lookup is applied to look up the bit strings at addresses that start with 0. Subsequently to applying the negatively controlled table lookup, a positively controlled table lookup is applied to look up the bit strings at addresses that start with 1. In other examples, the order of the negatively controlled table lookup and the positively controlled table lookup may be reversed.

The numbers of magic states consumed by table lookup operations performed at the k-input table lookup circuit 124 are discussed below. Let $$N_{AND}^{TL}(k)$$

be the number of AND gates 110 used by the k-input table lookup circuit 124 and let $$N_{AND}^{CTL}(k)$$

be the number of AND gates 110 used by a k-input controlled table lookup circuit. The numbers of AND gates 110 are given as follows:

$$N_{AND}^{TL}(k) = 2N_{AND}^{CTL}(k-1)$$

$$N_{AND}^{CTL}(0) = 0$$

$$N_{AND}^{CTL}(1) = 1$$

$$N_{AND}^{CTL}(k) = 1 + 2N_{AND}^{CTL}(k-1) = 2^k - 1,\quad k \geq 0$$

$$N_{AND}^{TL}(k) = 2*(2^{k-1}-1) = 2^k - 2,\quad k \geq 1$$

$$N_{AND}^{TL}(0) = 0$$

Therefore, the number of T states consumed by the unary-iterate table lookup circuit is given by:

$$N_T^{TL}(k) = 4(2^k - 2) = 2^{k+2} - 8,\quad k \geq 1$$

$$N_T^{TL}(0) = 0$$

The k-input table lookup circuit 124 in the example of FIGS. 5B-5C uses O(K)T gates. This number of T gates does not depend upon the number of output bits m.

Figure 6A:
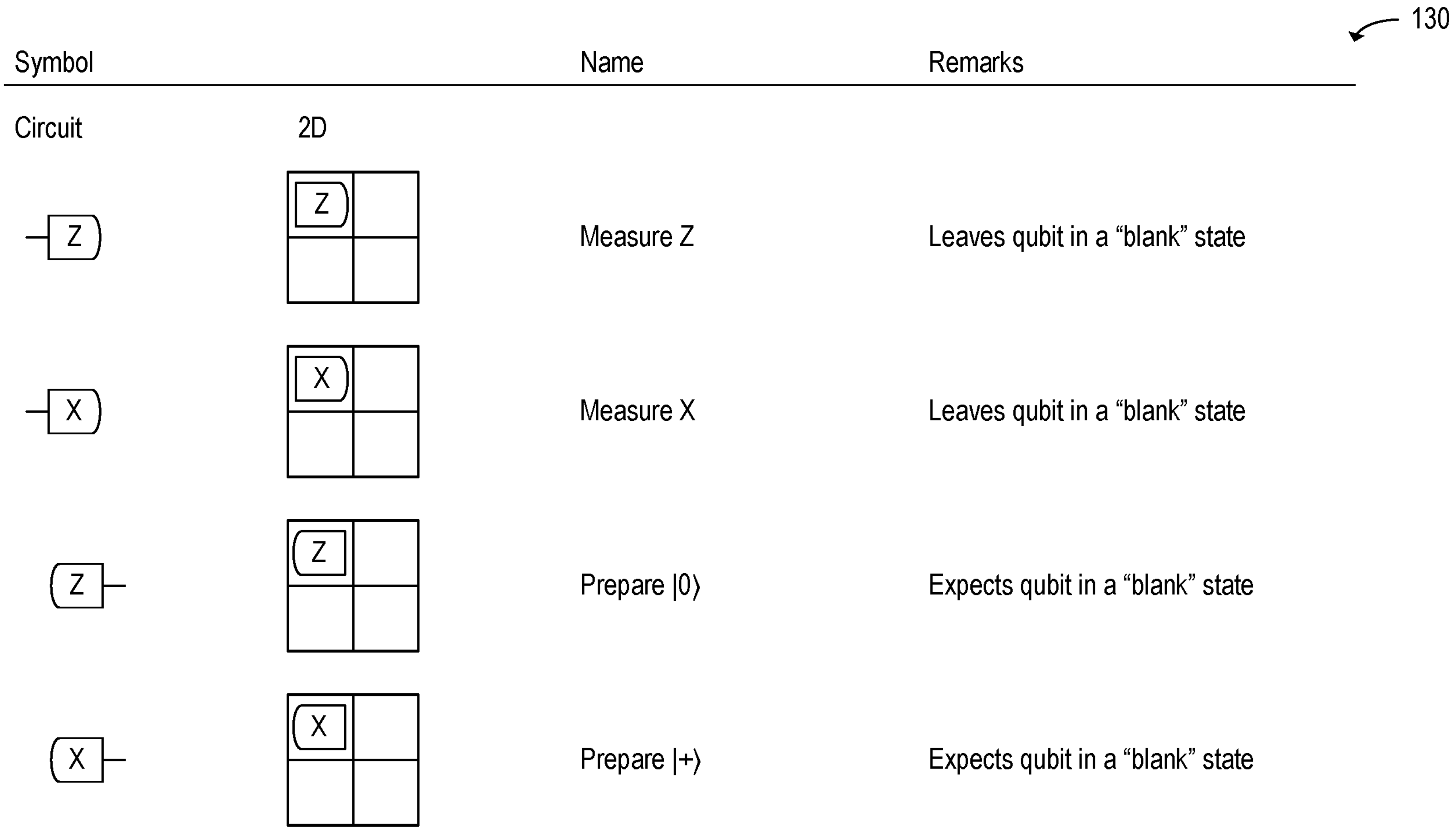
FIG. 6A shows a table including the symbols associated with a "measure Z" operation, a "measure X" operation, a "prepare $|0\rangle$" operation, and a "prepare $|+\rangle$" operation, according to the example of FIG. 1.
Figure 6B:
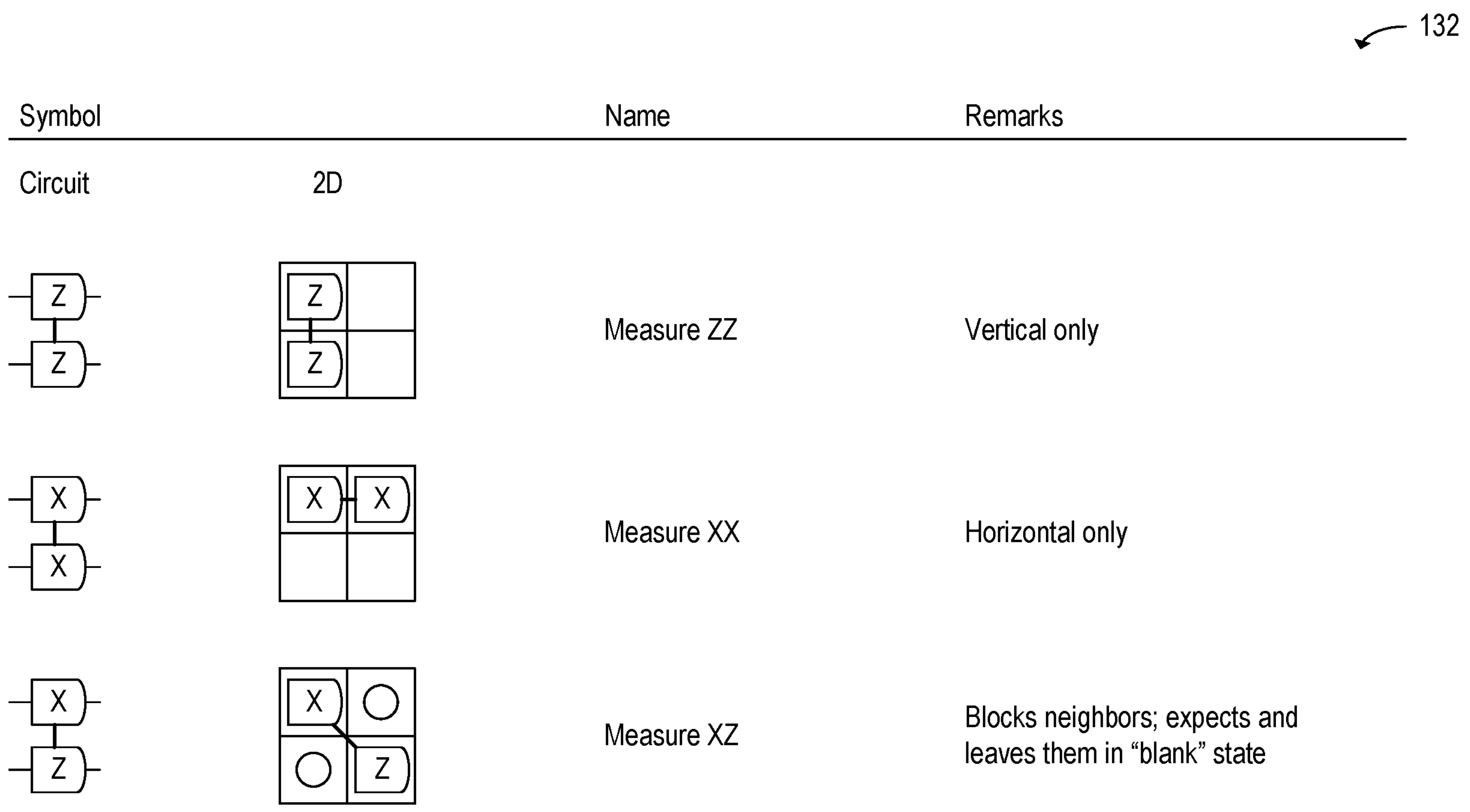
FIG. 6B shows a table including the symbols associated with a "measure ZZ" operation, a "measure XX" operation, and a "measure XZ" operation, according to the example of FIG. 1.

Table lookup circuits may be mapped to lattice surgery operations performed on logical qubits included in a logical qubit encoding surface 12. The qubits included in the logical qubit encoding surface 12 may be arranged in a two-dimensional rectangular grid of logical qubits. FIGS. 6A-6B show respective tables of symbols associated with operations performed at the logical qubit encoding surface 12. FIG. 6A shows a first table 130 including the symbols associated with a "measure Z" operation, a "measure X" operation, a "prepare $|0\rangle$" operation, and a "prepare $|+\rangle$" operation. FIG. 6B shows a second table 132 including the symbols associated with a "measure ZZ" operation, a "measure XX" operation, and a "measure XZ" operation. The "measure Z" and "measure X" operations leave the respective qubits on which they are performed in a blank state. The "prepare $|0\rangle$" and "prepare $|+\rangle$" operations receive qubits in blank states as input. The "measure ZZ" operation is performed on vertically adjacent qubits on the logical qubit encoding surface 12, and the "measure XX" operation is performed on horizontally adjacent qubits. The "measure XZ" operation is performed on diagonally adjacent qubits. In addition, the "measure XZ" operation blocks preparation and measurement operations on the other two qubits included in the two-by-two block of qubits that includes the X and Z gates, such that the other two qubits are both received and output in a blank state.

Figure 7A:
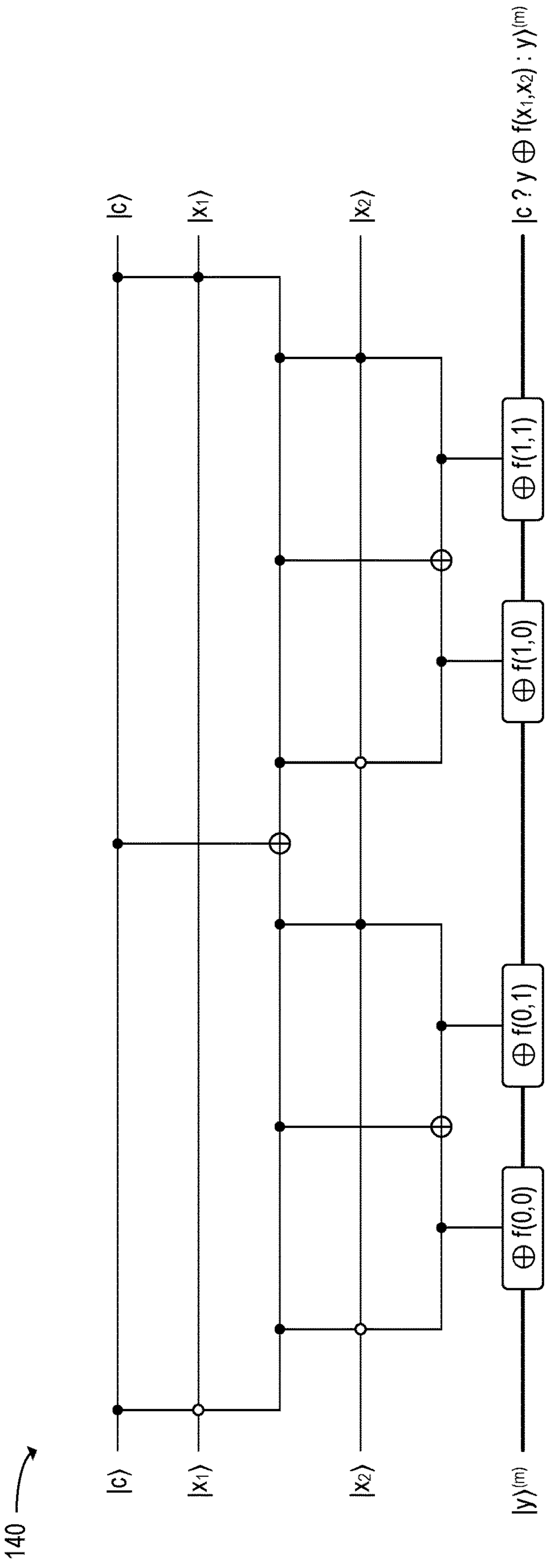
FIG. 7A shows an example two-input controlled table lookup circuit, according to the example of FIG. 1.

FIG. 7A shows an example controlled table lookup circuit 140 with k=2 input bits and m output bits, which may be another example of the table lookup circuit 40 of FIG. 1. The controlled table lookup circuit 140 of FIG. 7A is configured to receive a control qubit $|c\rangle$, a first input qubit $|x_1\rangle$, and a second input qubit $|x_2\rangle$. The controlled table lookup circuit 140 is configured to write a table lookup output $|c?y\oplus f(x_1, x_2):y\rangle^{(m)}$ to the output qubit register, thereby selecting the table lookup result based on the states of $|x_1\rangle$ and $|x_2\rangle$ when the control qubit $|c\rangle$ is set to $|1\rangle$ and leaving the output qubit register unchanged when the control qubit $|c\rangle$ is set to $|0\rangle$.

Figure 7B:
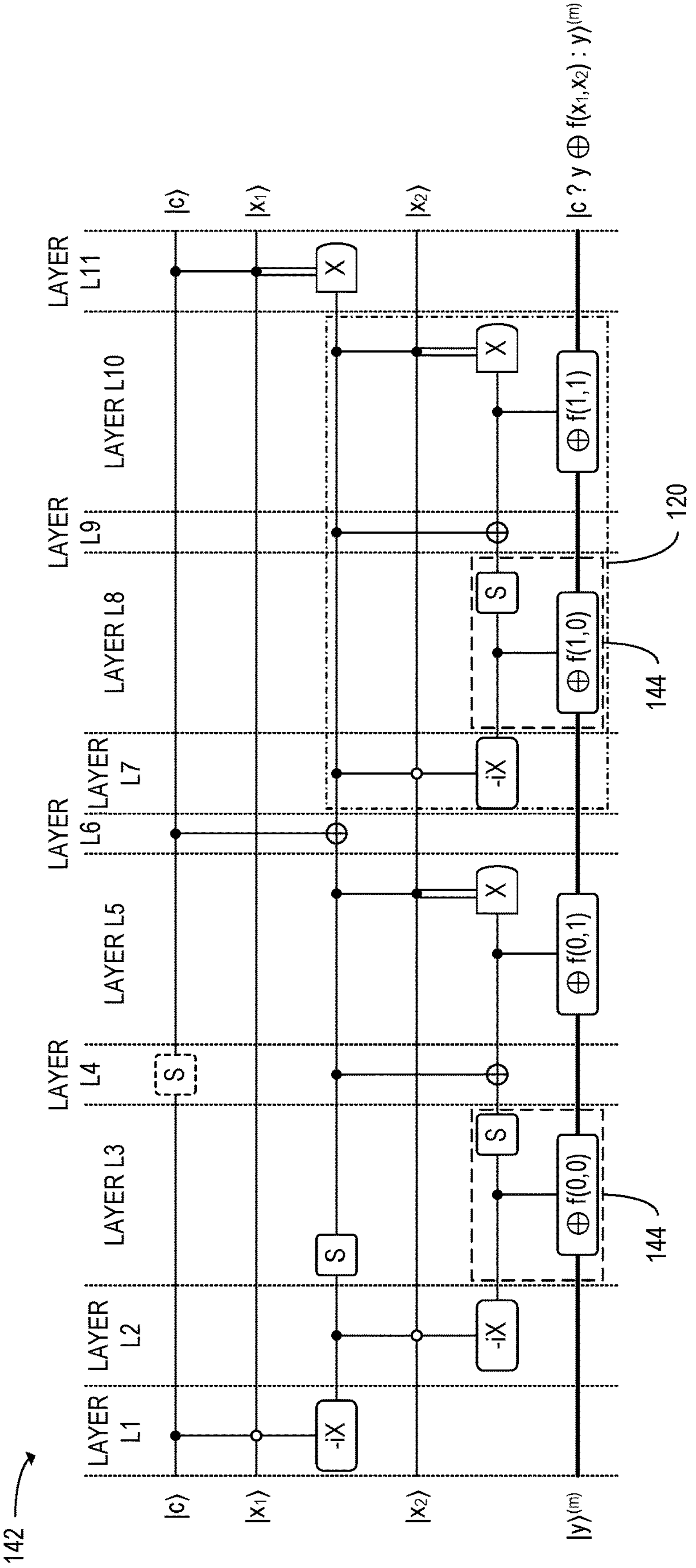
FIG. 7B shows a temporal layer view of the example two-input controlled table lookup circuit of FIG. 7A.

A temporal layer view 142 of the controlled table lookup circuit 140 is shown in FIG. 7B. The AND gates included in the controlled table lookup circuit 140 may be rewritten in terms of CCiX gates and S gates as shown in the example of FIG. 4A. In addition, the AND$^\dagger$ gates included in the controlled table lookup circuit 140 may be rewritten in terms of X measurements and classically controlled CZ gates. The S gates may be moved past the controls of the CXOR and CCiX gates. In the temporal layer view 142 of FIG. 7B, the controlled table lookup operation is displayed in a plurality of temporal layers within which gates may be executed in parallel. The controlled table lookup circuit 140 is instantiated over eleven temporal layers L1-L11 in the example of FIG. 7B. As shown in FIG. 7B, the example controlled table lookup circuit 140 includes a one-input controlled table lookup circuit 120. In addition, the controlled table lookup circuit 140 includes two instances of a parallelizable operation 144 that may be performed concurrently despite being shown in different temporal layers. The S gate indicated with a dashed border in FIG. 7B may be included when the two-input controlled table lookup circuit 140 is included in a controlled table lookup circuit with more than two inputs.

Figure 8A:
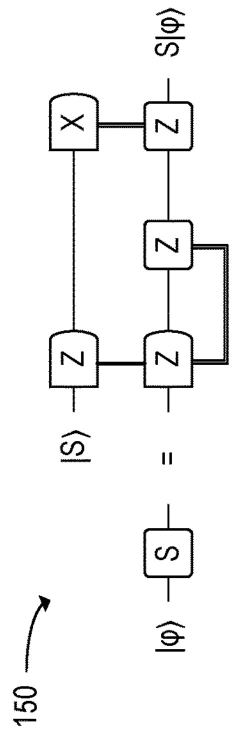
FIGS. 8A-8B show example $|S\rangle$-state injection circuits, according to the example of FIG. 1.
Figure 8B:
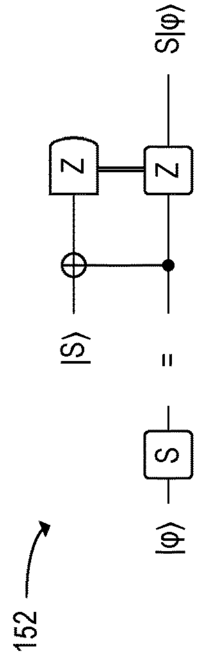

The controlled table lookup circuit 140 of FIGS. 7A-7B may be modified by replacing the S gates with joint-measurement-based S state injection circuits. FIGS. 8A-8B respective show an example first $|S\rangle$-state injection circuit 150 and an example second $|S\rangle$-state injection circuit 152. The first $|S\rangle$-state injection circuit 150 applies an S operation to a qubit $|S\rangle$ by consuming an injecting an $|S\rangle$ state via a ZZ measurement. The second $|S\rangle$-state injection circuit 152 applies an S operation to a qubit $|\varphi\rangle$ by consuming an injecting an $|S\rangle$ state via a CNOT gate. The first $|S\rangle$-state injection circuit 150 may replace the S gates included in the controlled table lookup circuit 140. The Z with all rounded corners in the diagram of FIG. 8A indicates a quantum Z operation. The double lines connected to the quantum Z operation in the diagram indicates that the quantum Z operation is classically conditioned on the result of the measurement operation connected to the quantum Z operation by the double lines.

Figure 9A:
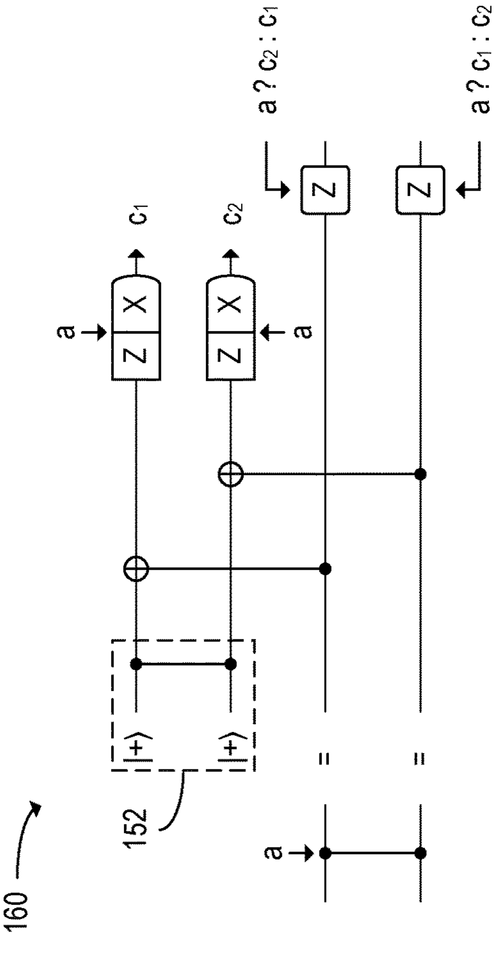
FIG. 9A shows an example delayed-choice $|CZ\rangle$ circuit, according to the example of FIG. 1.
Figure 9B:
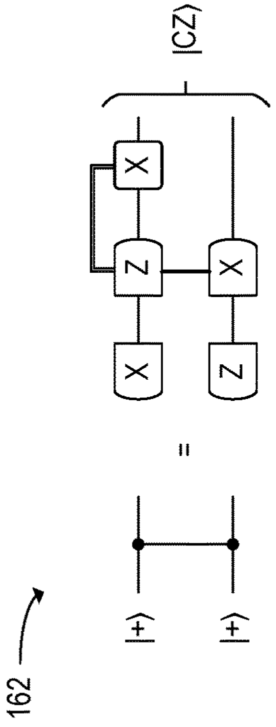
FIG. 9B shows an example $|CZ\rangle$ preparation circuit, according to the example of FIG. 1.

FIGS. 9A-9B respectively show a delayed-choice $|CZ\rangle$ circuit 160 and a $|CZ\rangle$ preparation circuit 162. The delayed-choice $|CZ\rangle$ circuit 160 may be used as a replacement for the classically controlled CZ gates included in the controlled table lookup circuit 140 of FIGS. 7A-7B. The delayed-choice $|CZ\rangle$ circuit 160 of FIG. 9A includes an instance of the $|CZ\rangle$ preparation circuit 162 of FIG. 9B.

Figure 10:
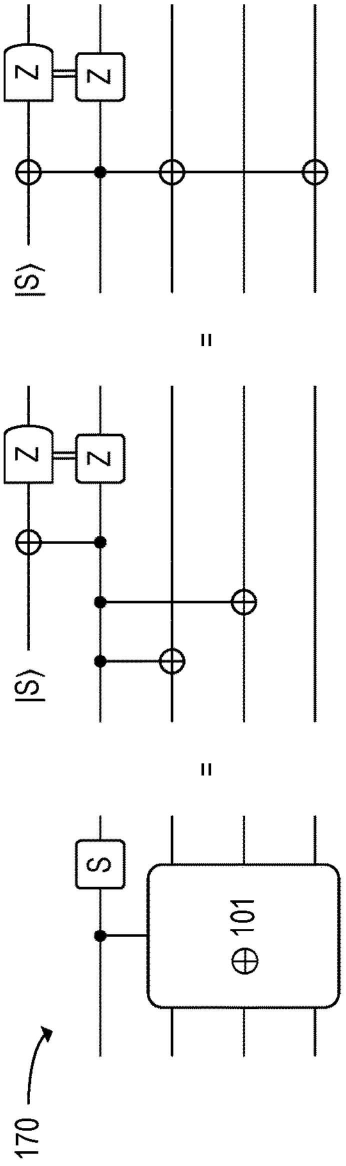
FIG. 10 shows an example multi-target controlled not (CNOT) circuit, according to the example of FIG. 1.

CXOR gates included in the controlled table lookup circuit 140 may be replaced by multi-target CNOT gates that utilize the second $|S\rangle$-state injection circuit 152. FIG. 10 shows an example multi-target CNOT circuit 170 that utilizes an instance of the second $|S\rangle$-state injection circuit 152 of FIG. 8B.

Figure 11:
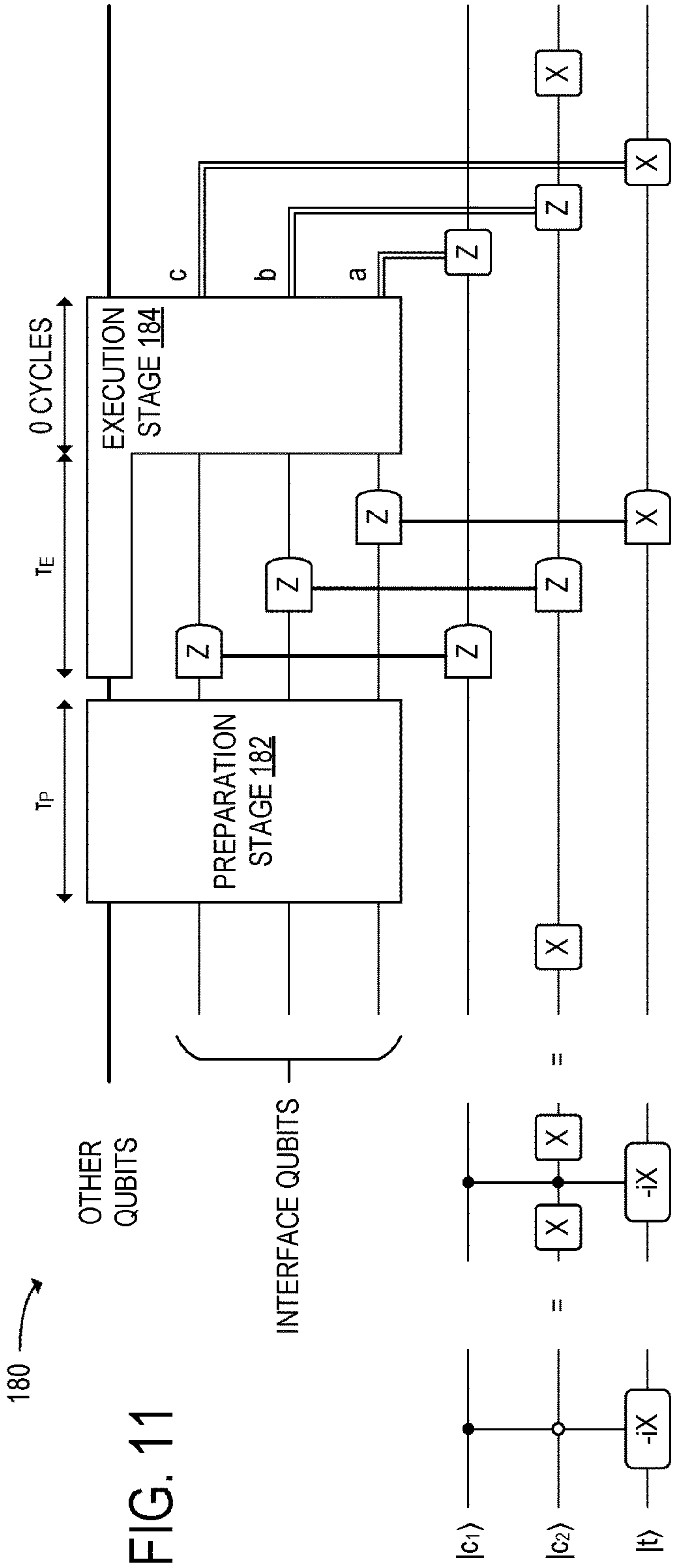
FIG. 11 shows an example doubly-controlled iX (CCiX) circuit, according to the example of FIG. 1.

FIG. 11 shows an example CCiX circuit 180 that may be used to implement the CCiX gates included in the controlled table lookup circuit 140 of FIGS. 7A-7B. The CCiX gate implemented at the CCiX circuit 180 may be written in matrix form as follows:

$$CCiX = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 0 & i \\ 0 & 0 & 0 & 0 & 0 & 0 & i & 0 \end{bmatrix}$$

The example CCiX circuit 180 of FIG. 11 is configured to perform a preparation stage 182 and an execution stage 184. The CCiX circuit 180 may be configured to prepare a plurality of magic states during the preparation stage 182. As discussed in further detail below, the plurality of magic states prepared in the preparation stage may include a plurality of $|S_x\rangle$ states and a plurality of $|T\rangle$ states. Subsequently to the preparation stage 182, the CCiX circuit 180 may be further configured to perform the execution stage 184 at which the CCiX operation is performed.

During the execution stage 184, the CCiX circuit 180 may be configured to perform a plurality of local joint measurements and a plurality of remote joint measurements in parallel. As discussed in further detail below, the plurality of local joint measurements may include a plurality of local ZZ measurements and a plurality of local XZ measurements. The plurality of remote joint measurements in the example of FIG. 11 includes two ZZ measurements and an XZ measurement. One or more Clifford operations may also be performed at the CCiX circuit 180 subsequently to the joint measurements. The one or more Clifford operations may be one or more Pauli corrections may be performed subsequently to the execution stage 184, as shown in the example of FIG. 11.

The estimated numbers of logical cycles performed in the different temporal layers at the example controlled table lookup circuit 140 are discussed below. The durations of the temporal layers, in terms of numbers of logical cycles, are estimated as functions of the following frequently used operations:

$\tau_{RCX}$: time of remote CNOT gate along an arbitrary path of qubits.

$\tau_{RZZ}$: time of remote ZZ measurement along an arbitrary path of qubits.

$\tau_{RXZ}$: time of remote XZ measurement along an arbitrary path of qubits.

$\tau_{CXOR}$: total time of CXOR.

$\tau_{CAT}$: cat state initiation time in CXOR implementation.

The duration estimates performed herein further assume that the durations of X measurements, Z measurements, X corrections, and Z corrections are negligible.

Temporal layers L1, L2, and L7: the execution duration for the CCiX circuit 180 is dominated by the two remote ZZ measurements and the remote XZ measurement shown in FIG. 11. XZ measurements typically have longer durations than ZZ measurements. However, the XZ measurement includes a portion in which a Hadamard conjugated Bell pair is prepared. This portion of the XZ measurement may be moved to an earlier time such that the total number of logical cycles used to perform the remote measurements is reduced. Accordingly, the qubits used when performing the remote ZZ measurements and the remote XZ measurement are typically occupied for $\tau_{RZZ}$ logical cycles.

In examples in which the controlled table lookup circuit 140 includes two or more CCiX circuits 180, the preparation stage 182 of the CCiX circuit 180 may be moved to an earlier temporal layer. In such examples, the preparation stage 182 may alternate between preparing the |T⟩ states of the CCiX circuits 180. In order to avoid delays due to waiting for Pauli corrections that depend on measurement outcomes that are not yet known, the execution stage of the CCiX circuit 180 is configured to use fewer logical cycles than a remote ZZ measurement, such that the execution stage duration $\tau_E$ of the CCiX circuit 180 is less than or equal to $T_{RZZ}$. Overall, each of the temporal layers L1, L2, and L7 has an execution time of $\tau_{RZZ}$ logical cycles.

Temporal layer L3: a portion of the multi-target CNOT gate may be moved to temporal layer L4. The cat state preparation, which has the duration $\tau_{CAT}$, occurs in temporal layer L3. In addition, a S gate is applied via |S⟩-state injection in temporal layer L3, which occurs over $\tau_{RZZ}$ logical cycles. Thus, the duration of temporal layer L3 is given by $\max(\tau_{RZZ}, \tau_{CAT})$.

Temporal layers L4, L6, and L9: at these layers, an |S⟩-state injection is performed. The number of logical cycles used when performing the |S⟩-state injection is the number of logical cycles used when performing a remote CNOT operation. Thus, temporal layers L4, L6, and L9 each have durations of $\tau_{RCX}$ logical cycles.

Temporal layers L5 and L10: a respective instance of the delayed choice |CZ⟩ circuit 160 is used at each of temporal layer L5 and temporal layer L10. The |CZ⟩ state preparations for the delayed choice |CZ⟩ circuits 160 may be executed in prior layers. The two CNOT gates included in each of the delayed choice |CZ⟩ circuits 160 may be executed in parallel with the CXOR gate. Since the delayed choice |CZ⟩ circuits 160 in temporal layers L5 and L10 are followed by respective X measurements, the outputs of the delayed choice |CZ⟩ circuits 160 are utilized within the temporal layers L5 and L10. Thus, the full durations of the respective CXOR gates included in the delayed choice |CZ⟩ circuits 160 are included in the temporal layers L5 and L10. Temporal layers L5 and L10 each have total durations of $\max(\tau_{CXOR}, \tau_{RCX})$ logical cycles.

Temporal layer L8: temporal layer L8 corresponds to temporal layer L3 in structure, but without the |S⟩-state injection. Thus, temporal layer L8 has a duration of $\tau_{CAT}$ logical cycles.

Temporal layer L11: the duration of temporal layer L11 is dominated by the duration of the CNOT operations included in the delayed choice |CZ⟩ circuit 160. Thus, temporal layer L11 has a duration of $\tau_{RCX}$.

In order to simplify the notation for the overall duration of the controlled table lookup, the following quantities are defined:

$$\tau_R = \max(\tau_{RCX}, \tau_{RZZ}, \tau_{CAT})$$

$$\tau_M = \max(\tau_{RCX}, \tau_{CXOR})$$

In most examples, $\tau_{RCX}$, $\tau_{RZZ}$, and $\tau_{CAT}$ have approximately equal durations, and $\tau_{CXOR} \geq \tau_{RCX}$. Thus, $\tau_R = \tau_{RCX}$ and $\tau_M = \tau_{CXOR}$ in such examples. With the above assumptions the duration $\tau_{CTL}(k)$ of a k-input controlled table lookup circuit may be estimated. In the base case, the duration of a one-input controlled table lookup circuit is given by:

$$\tau_{CTL}(1) \leq 3\tau_R + \tau_M$$

In the base case, temporal layers L7-L9 each contribute $T_R$, and temporal layer L10 contributes $\tau_M$.

The duration of a recursively-constructed controlled table lookup circuit is given by $$\tau_{CTL}(k) \leq 3\tau_R + 2\tau_{CTL}(k-1),\ k \geq 2$$

In the recursively-constructed controlled table lookup circuit, the temporal layers L1, L6, and L11 each contribute $\tau_R$ logical cycles. Combining the expressions for the duration of the base case and the recursively-constructed controlled table lookup circuit gives the following closed-form expression:

$$\tau_{CTL}(k) \leq 2^{k-1}(6\tau_R + \tau_M) - 3\tau_R,\ k \geq 1$$

The duration of an uncontrolled table lookup operation $\tau_{TL}(k)$ is given by $$\tau_{TL}(k) = 2\tau_{CTL}(k-1)$$

$$\tau_{TL}(1) = 2\tau_M$$

The above estimates assume that a sufficient number of ancillary qubits are provided to perform the remote operations within any given layer in parallel. A 4:1 ratio of logical qubits to ancillary qubits may provide the sufficient number of ancillary qubits.

Estimates of the number of the numbers of logical qubits used in table lookup circuits are provided below. The number of abstract qubits used by a controlled table lookup circuit with k inputs and m outputs is given by 2k+m+1. The abstract qubits include two qubits per input bit, one qubit per output bit, and one control qubit. The number of logical qubits used by the controlled table lookup operation is given by $$\sigma_{CTL}(k) = 4*(2k+1) + O(\sqrt{k}) + 2*m + O(\sqrt{m}) + O(1)$$

The constant-order term in the above equation is a term for the number of logical qubits used by the CCiX circuits 180 and the delayed-choice |C⟩ circuits 160, qubits used for |S⟩-state delivery, and additional padding qubits that are used to fit the input qubits into a square shape on the logical qubit encoding surface 12. The controlled table lookup circuit 140 may be laid out such that consecutive dependent CCiX operations and delayed-choice |CZ⟩ operations may be performed without delays. The number of output qubits is multiplied by two to correspond to the number of logical qubits per output qubit included in the CXOR circuit discussed below. In the above equation for the number of logical qubits used for the controlled table lookup operation, the target qubits are assumed to be aligned in a square shape. As discussed in further detail below, a cat state generating routine may be performed to generate a corresponding cat state for every second column of the square. The cat state generating routine incurs an overhead of $O(\sqrt{m})$ logical qubits. The number of other abstract qubits (the control qubit, the input qubits, and the helper qubits) is multiplied by four in the above equation to provide sufficient qubits for parallelization. In addition, to allow the remote measurements to be routed efficiently from the input qubits to the CCiX circuits 180, the input qubits may be arranged in a rectangular pattern on the logical qubit encoding surface 12. The qubits at the boundary of the rectangular pattern may be used as auxiliary qubits, thereby resulting in the $O(\sqrt{k})$ term in the above equation. In the above equation, the number of CCiX circuits 180 and the number of delayed-choice |CZ⟩ circuits 160 are constant as functions of k and m.

The number of logical qubits used in an uncontrolled table lookup operation on k input qubits is equal to the number of qubits used in a controlled table lookup operation on k−1 input qubits, since the control qubit in the controlled table lookup operation is used as the most-significant bit:

$$\sigma_{TL}(k) = \sigma_{CTL}(k-1)$$

Figure 12:
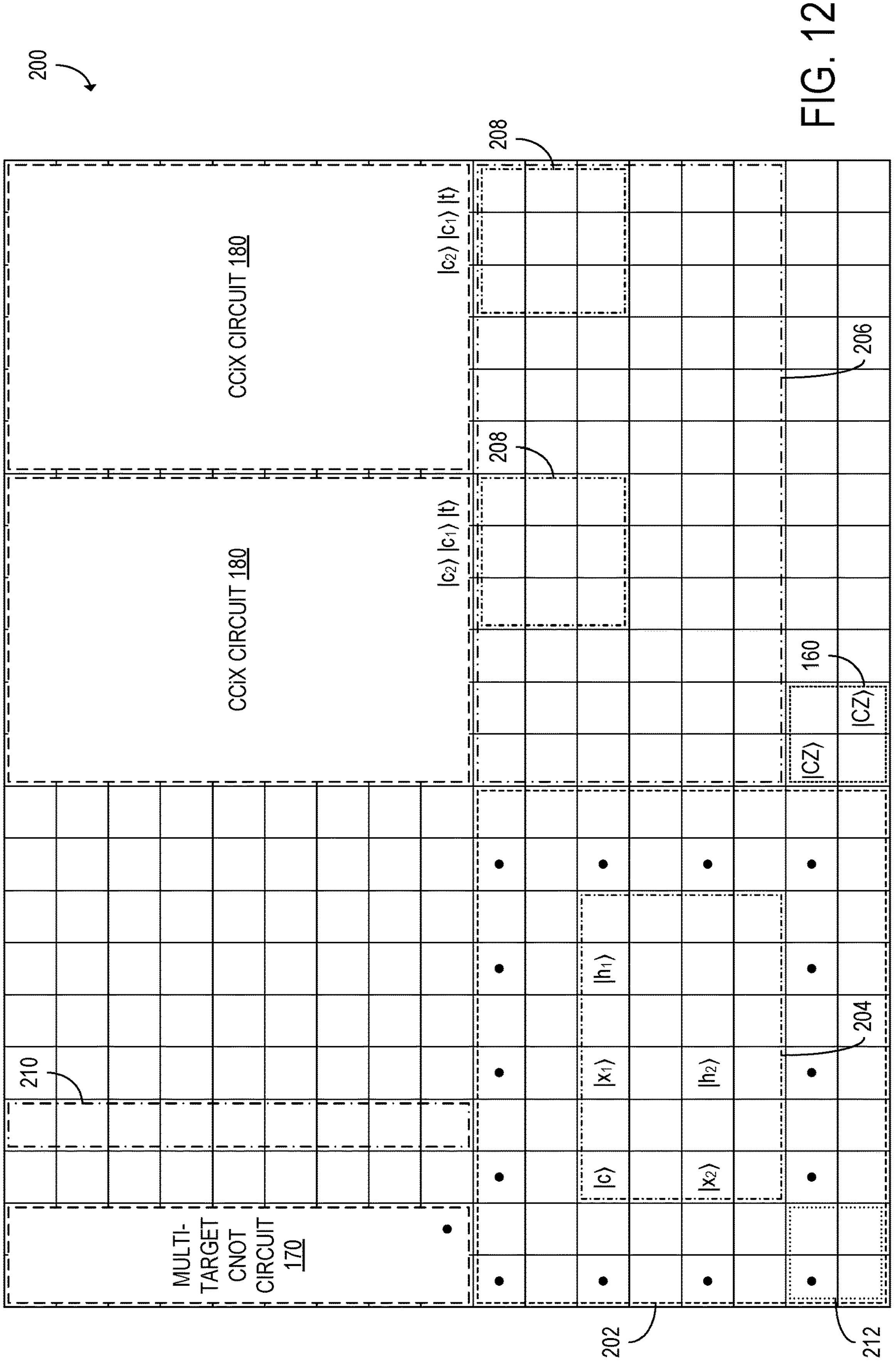
FIG. 12 shows an example encoding surface layout of a logical qubit encoding surface that may be used to instantiate a controlled table lookup circuit, according to the example of FIG. 1.

FIG. 12 shows an example encoding surface layout 200 of the logical qubit encoding surface 12 that may be used to instantiate the controlled table lookup circuit 140. The example encoding surface layout 200 includes, as subcircuits, an instance of the multi-target CNOT circuit 170 and two instances of the CCiX circuit 180. In addition, the encoding surface layout 200 includes a data qubit region 202 in the lower lefthand corner. The data qubit region 202 includes a plurality of 2×2 patches 212 that each include a data qubit and three auxiliary qubits arranged in a square. In each of the patches 212 shown in the example of FIG. 12, the data qubit (indicated with a dot) is located in the upper lefthand corner, and the other qubits included in the patch 212 are the auxiliary qubits. Within the data qubit region 202, an input qubit region 204 is provided. The portions of the data qubit region 202 located outside the input qubit region 204 may be used for routing, as discussed in further detail below. The qubits $|h_1\rangle$ and $|h_2\rangle$ located in the input qubit region 204 are helper qubits.

The output qubits of the controlled table lookup circuit 140 are included in the multi-target CNOT circuit 170 in the example of FIG. 12. The output qubits are configured to be written to the output register of the controlled table lookup circuit 140 via plurality of CXOR gates included in the multi-target CNOT circuit 170. The dot in the bottom righthand corner of the multi-target CNOT circuit 170 is an interface qubit via which a remote ZZ measurement may be performed.

The CCiX circuits 180 included in the encoding surface layout 200 may each occupy an area of 9×6 qubits. In addition, a routing region 206 that occupies a 6×12 rectangle of qubits is located below the CCiX circuits 180. The routing region 206 may be used to connect the input qubits to interface qubits of the CCiX circuits 180 via joint ZZ and XZ measurements and teleportation circuits. The routing region includes two switchboard regions 208, which are 3×3 regions of qubits located below the CCiX circuits 180. As discussed in further detail below, permutations of the target qubits and the control qubits of the CCiX circuits 180 may be selected at the switchboard regions 208.

The encoding surface layout 200 further includes an |S⟩-state delivery region 210 provided as a column of qubits in the upper left and an additional qubit located to the left of the uppermost qubit in the column. Via the |S⟩-state delivery region 210, the |S⟩ states are configured to be delivered to the input qubit region 204. In addition, the encoding surface layout 200 includes an instance of the delayed-choice |CZ⟩ circuit 160 located in a 2×2 patch below the routing region 206 and adjacent to the data qubit region 202.

In the encoding surface layout 200 of FIG. 12, the number of logical qubits used in the controlled table lookup operation may be given by:

$$\sigma_{CTL}(k) = 4(c+2)(r+2) + 90*\#CCiX + 4*\#CZ + 2m + O(\sqrt{m})$$

In the above equation, $c=\lceil\sqrt{2k+1}\rceil$ and $$r = \left\lceil \frac{2k+1}{c} \right\rceil$$

are the respective numbers of columns and rows with which the 2k+1 input qubits are fit into a square shape. #CCiX and #CZ are the numbers of CCiX circuits 180 and delayed-choice |CZ⟩ circuits 160, respectively.

Figure 13A:
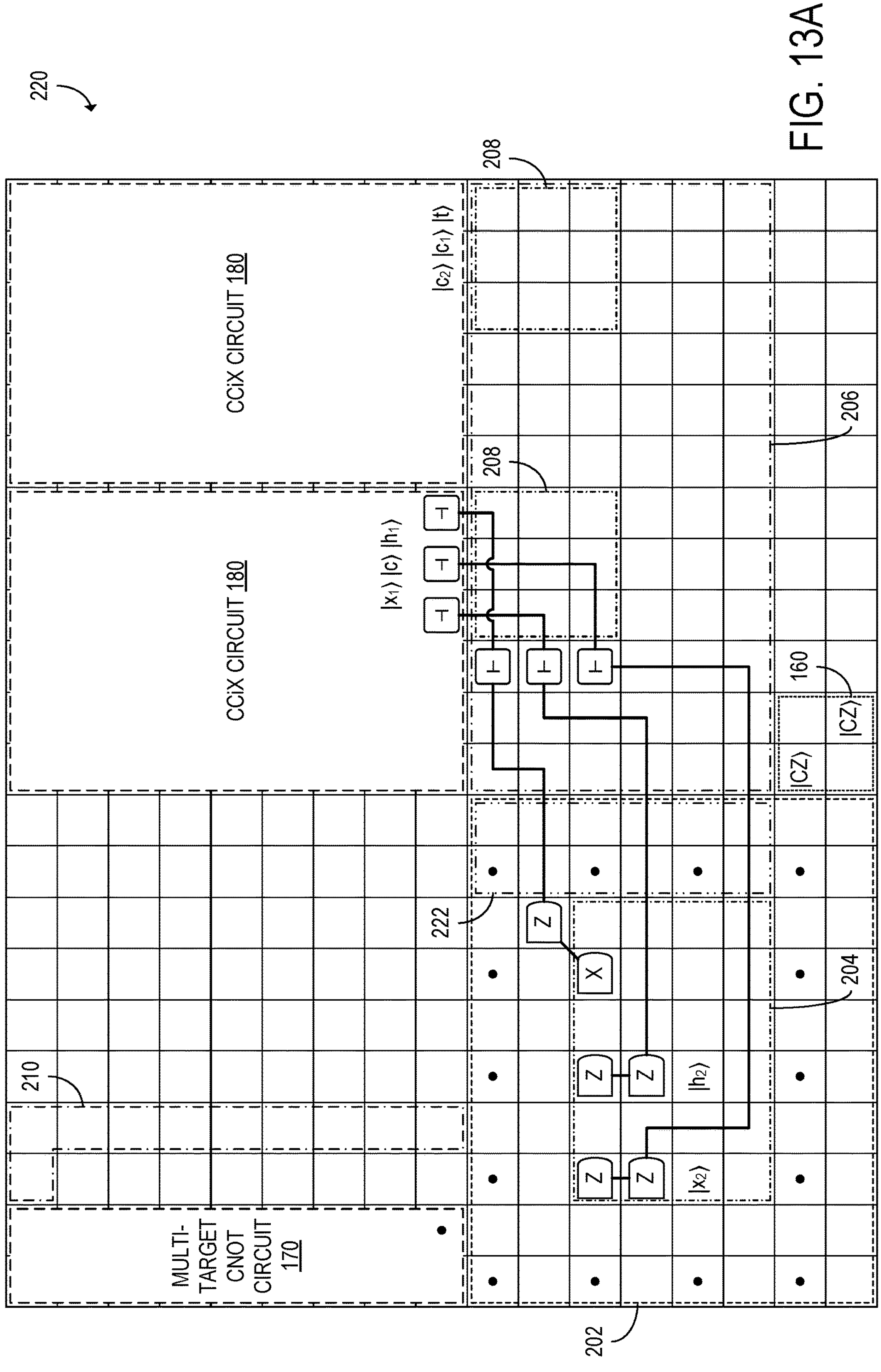
FIGS. 13A-13F shows example layer views of the encoding surface layout of FIG. 12 that depict operations performed at the logical qubit encoding surface during different temporal layers.

FIG. 13A shows a first-layer view 220 of the encoding surface layout 200 that depicts operations performed at the logical qubit encoding surface 12 during the first temporal layer L1. In the first temporal layer L1, as shown in FIG. 13A, a CCiX circuit 180 is executed on the input qubit $|x_1\rangle$ and the control qubits $|c\rangle$ and $|h_1\rangle$. This CCiX circuit 180, in the example of FIG. 13A, is the left CCiX circuit 180 in the encoding surface layout 200. During the first temporal layer L1, teleportation circuits may be executed to pass the outputs of joint measurements performed on $|x_1\rangle$, $|c\rangle$, and $|h_1\rangle$ to the switchboard region 208 below the left CCiX circuit 180. FIG. 13A further shows an exit region 222 of the encoding surface layout 200 through which the outputs of the joint measurements are configured to be routed to the switchboard region. The inputs to the left CCiX circuit 180 may also pass through an additional teleportation circuit included in the switchboard region 208. Thus, the outputs of the joint measurements performed on $|x_1\rangle$, $|c\rangle$, and $|h_1\rangle$ in the input qubit region 204 may be transmitted to the left CCiX circuit 180.

Figure 13B:
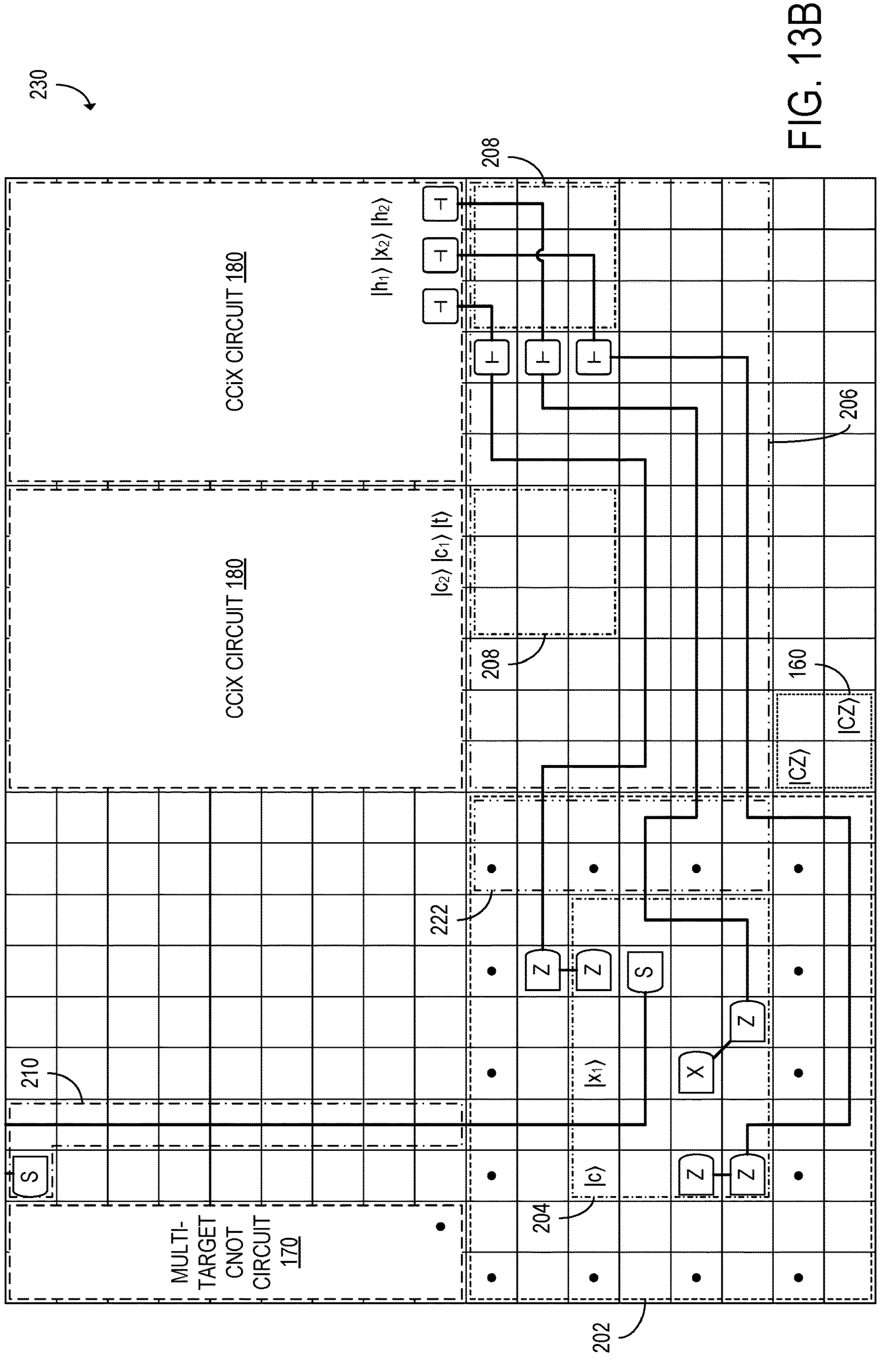

FIG. 13B shows a second-layer view 230 of the encoding surface layout 200 that depicts operations performed at the logical qubit encoding surface 12 during the second temporal layer L2. In the second temporal layer L2, as shown in the example of FIG. 13B, outputs of joint measurements performed on the input qubit $|x_2\rangle$ and the control qubits $|h_1\rangle$ and $|h_2\rangle$ are passed to the right CCiX circuit 180. The outputs of the joint measurements performed on $|x_2\rangle$, $|h_1\rangle$, and $|h_2\rangle$ are configured to be routed to the right CCiX circuit 180 via a teleportation circuit that passes through the exit region 222 and via an additional teleportation circuit that passes through the switchboard region 208 below the right CCiX circuit 180. Alternating between the left and right CCiX circuits 180, as shown in FIGS. 13A and 13B, may prevent the preparation stages of the first temporal layer L1 and the second temporal layer L2 from interfering with each other.

FIG. 13B further shows an $|S\rangle$ state that is delivered to the input qubit region 204 via the $|S\rangle$-state delivery region 210. An additional $|S\rangle$ state is delivered to a portion of the $|S\rangle$-state delivery region 210 proximate to the multi-target CNOT circuit 170.

Figure 13C:
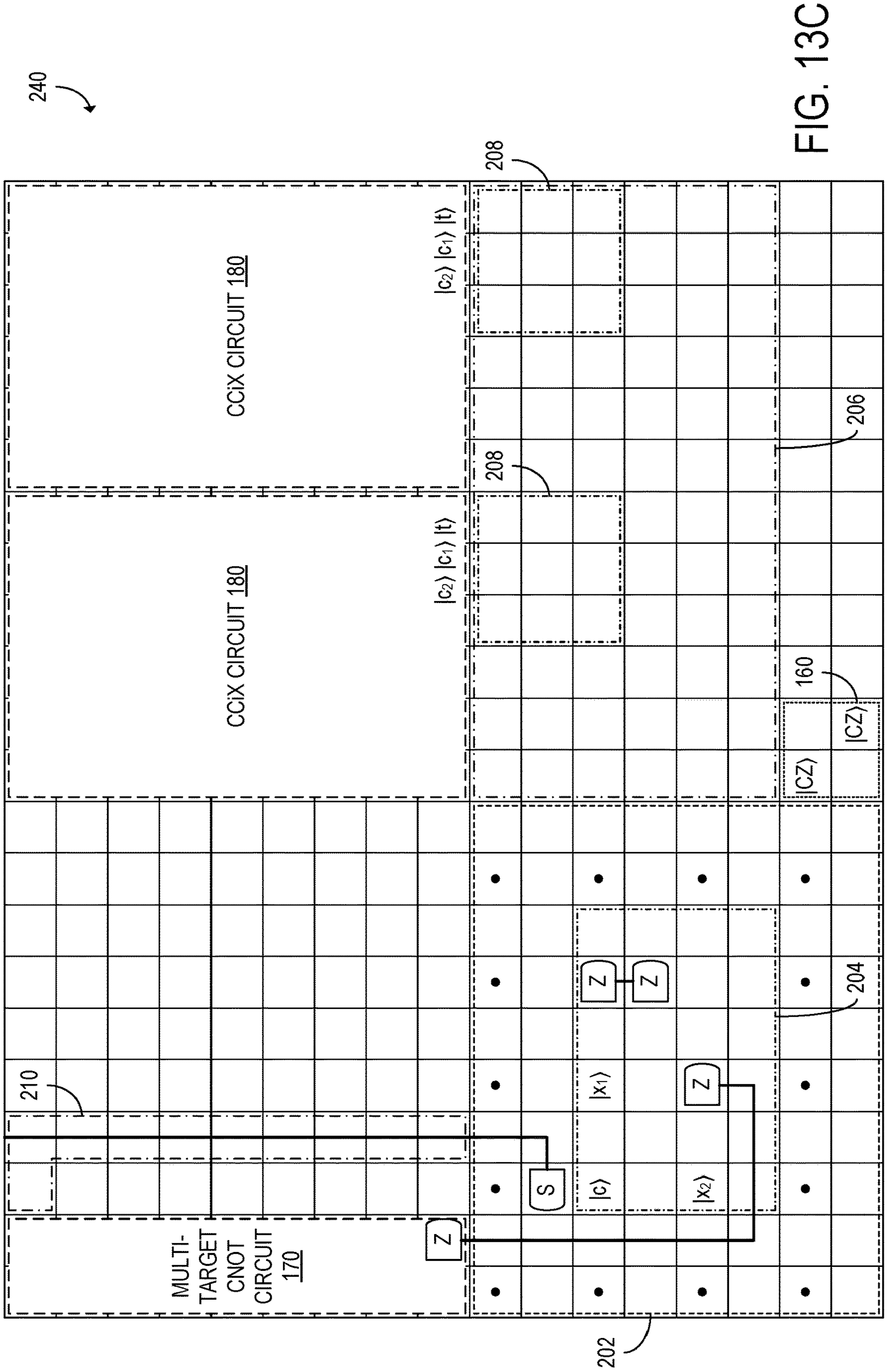

FIG. 13C shows a third-layer view 240 of the encoding surface layout 200 that depicts operations performed at the logical qubit encoding surface 12 during the third temporal layer L3. The $|S\rangle$ states that are delivered to the encoding surface layout 200 in the second temporal layer L2 are used in the third temporal layer L3 to execute a CXOR gate 100 at the multi-target CNOT circuit 170. Executing the CXOR gate 100 includes performing a remote joint ZZ measurement between $|h_2\rangle$ and the interface qubit of the multi-target CNOT circuit 170. One of the $|S\rangle$ states received in the second temporal layer L2 may be consumed in the third temporal layer L3 to apply an S gate to $|h_2\rangle$. The second $|S\rangle$ state received in the second temporal layer L2 may be consumed to perform an $|S\rangle$-state injection on $|h_1\rangle$. The $|S\rangle$ states may be injected via a remote joint ZZ measurement at $|h_2\rangle$ and a joint ZZ measurement at $|h_1\rangle$. In some examples, as shown in FIG. 13C, another $|S\rangle$ state may also be delivered via the $|S\rangle$-state delivery region 210 to the logical qubit located above $|c\rangle$ data qubit region 202 during the third temporal layer L3.

Figure 13D:
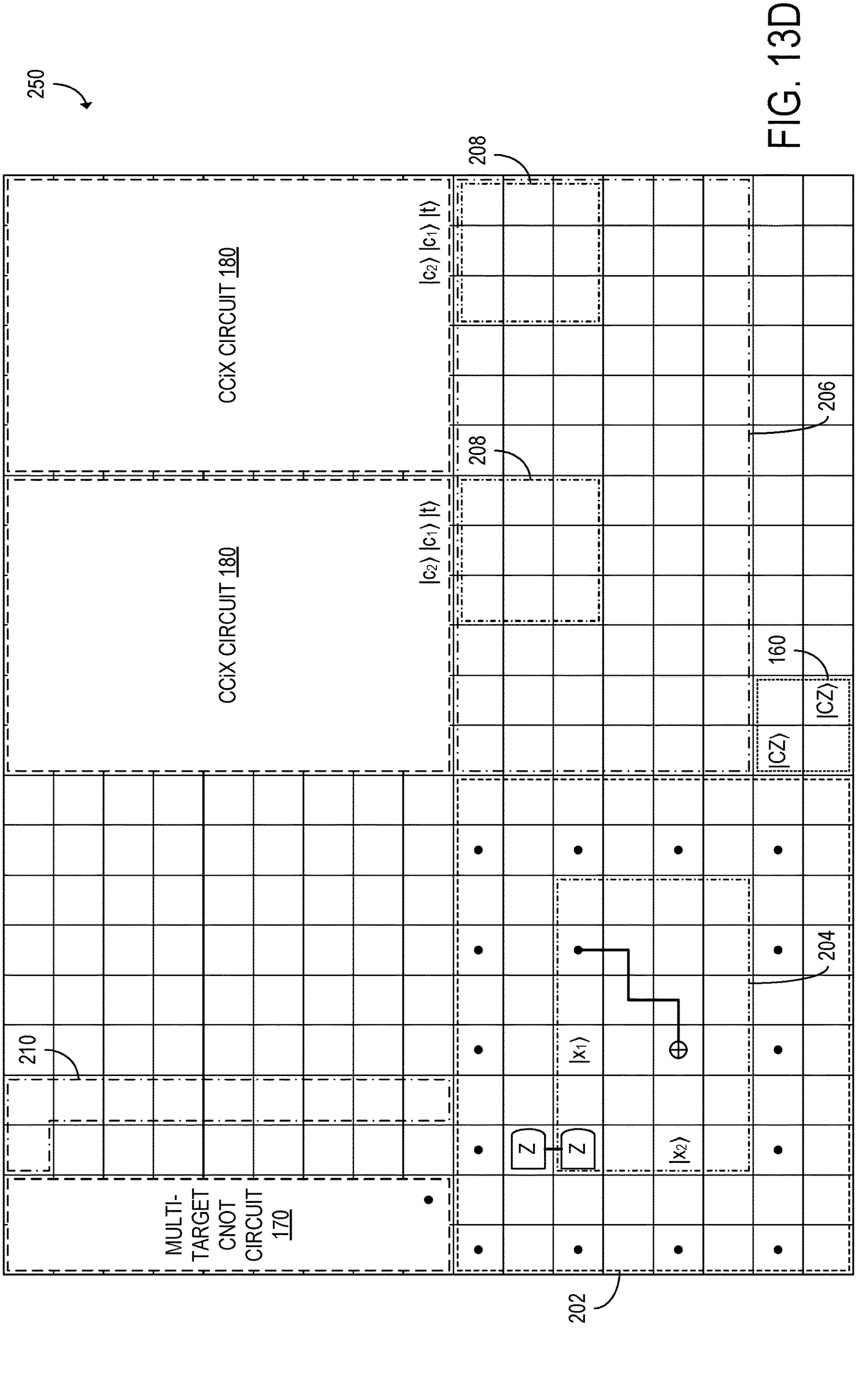

FIG. 13D shows a fourth-layer view 250 of the encoding surface layout 200 that depicts operations performed at the logical qubit encoding surface 12 during the fourth temporal layer L4. In examples in which an additional $|S\rangle$ state is delivered to the encoding surface layout 200 during the third temporal layer L3, the additional $|S\rangle$ state may be injected at $|c\rangle$ by performing a joint ZZ measurement. In addition, a remote CNOT gate controlled on $|h_1\rangle$ targeting $|h_2\rangle$ is performed in the fourth temporal layer L4.

Figure 13E:
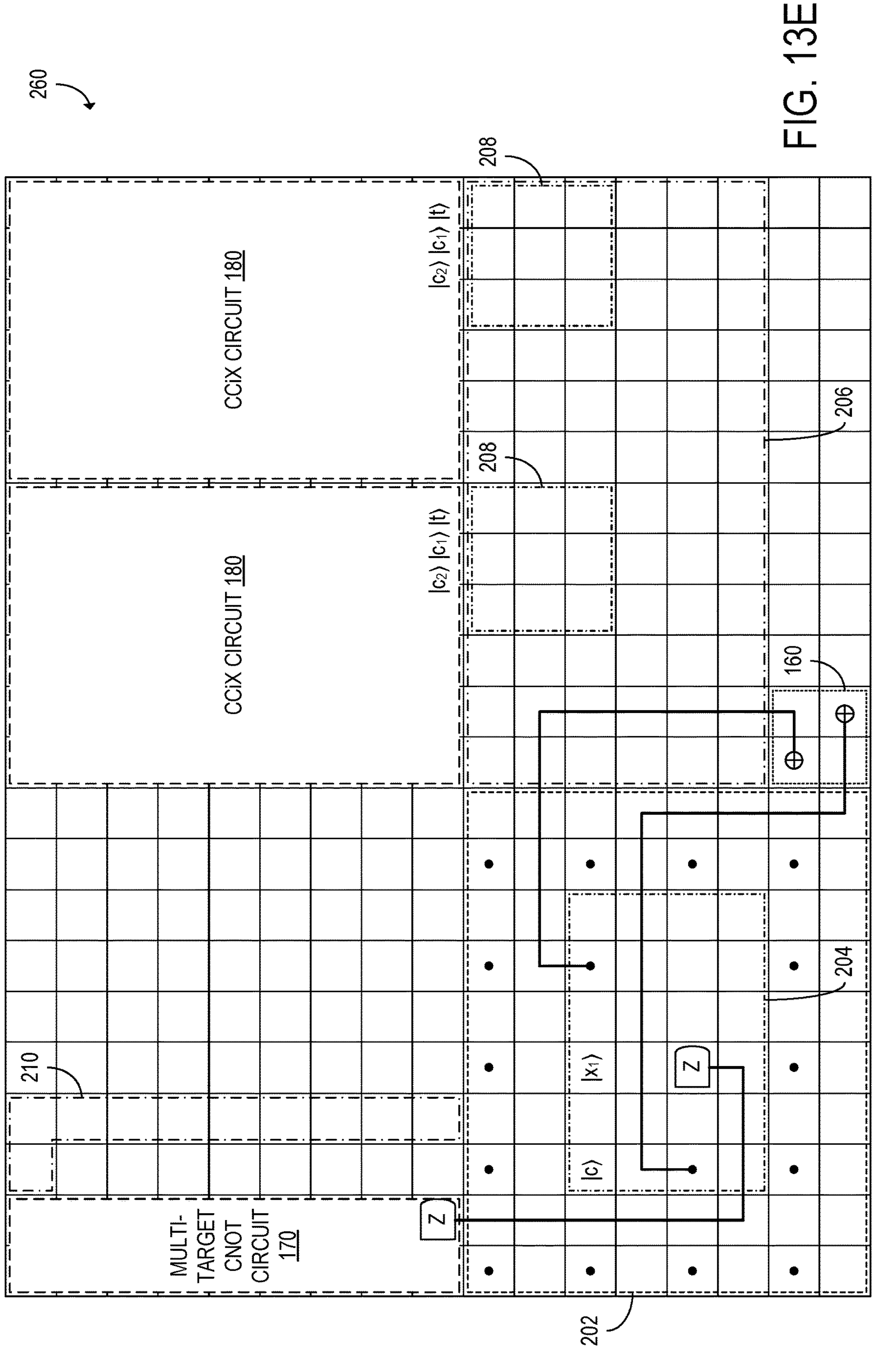

FIG. 13E shows a fifth-layer view 260 of the encoding surface layout 200 that depicts operations performed at the logical qubit encoding surface 12 during the fifth temporal layer L5. In the fifth temporal layer L5, another CXOR gate between $|h_2\rangle$ and the interface qubit of the multi-target CNOT circuit 170 is performed. $|h_1\rangle$ and $|h_2\rangle$ may also be connected to the $|CZ\rangle$ states instantiated at the delayed-choice $|CZ\rangle$ circuit 160 via two remote CNOT operations. The $|CZ\rangle$ states may be prepared in one or more prior temporal layers.

In temporal layers L6, L7, L8, L9, and L10, the respective operations performed during temporal layers L4, L2, L3, L4, and L5 may be performed, as discussed above with reference to FIG. 7B. The operations performed during temporal layer L8 may differ from the operations performed during temporal layer L3 in that the $|S\rangle$-gate injection may be omitted at temporal layer L8.

Figure 13F:
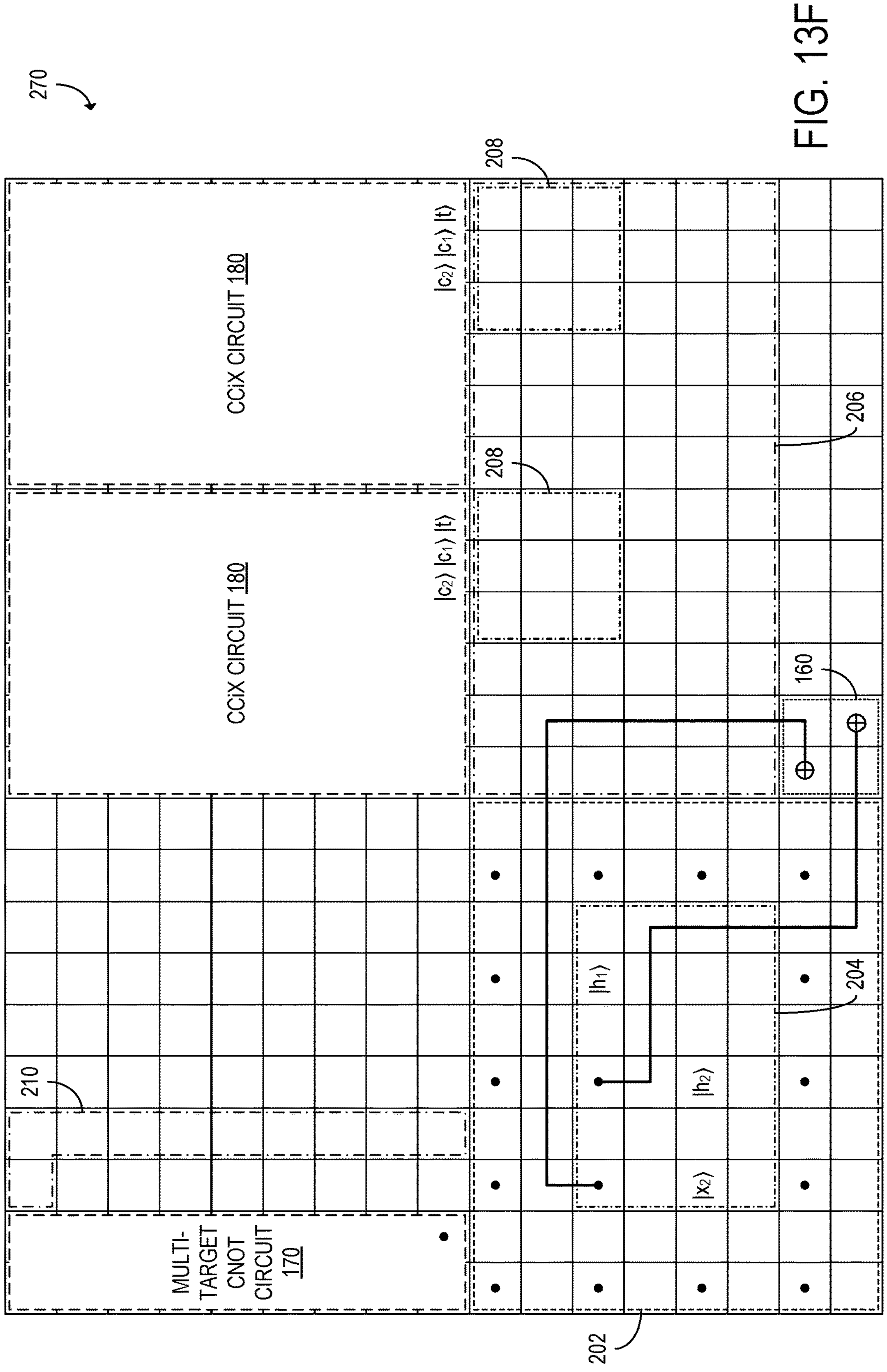

FIG. 13F shows an eleventh-layer view 270 of the encoding surface layout 200 that depicts operations performed at the logical qubit encoding surface 12 during the eleventh temporal layer L11. In the eleventh temporal layer L11, a delayed-choice $|CZ\rangle$ operation between $|c\rangle$ and $|x_1\rangle$ is performed at the delayed-choice $|CZ\rangle$ circuit 160 via two remote CNOT operations.

When the controlled table lookup circuit 140 is instantiated with the encoding surface layout 200 of FIG. 12, the controlled table lookup circuit 140 may have a peak $|T\rangle$-state consumption rate during temporal layers L1, L2, L6, and L7, when consecutive CCiX operations are performed. In some examples, T-state buffers may be used to smooth the $|T\rangle$-state consumption rate over a window of logical cycles. The smoothed peak number of $|T\rangle$-states consumed per cycle is given as:

$$\frac{\#T \text{ per } CCiX}{\tau_{RZZ}} = \frac{4}{\tau_{RZZ}}$$

When a plurality of instances of the controlled table lookup circuit 140 are run in parallel, the smoothed peak number of $|T\rangle$-states consumed per cycle may be multiplied by the number of controlled table lookup circuit 140 to determine the total $|T\rangle$-state consumption rate.

Figure 14A:
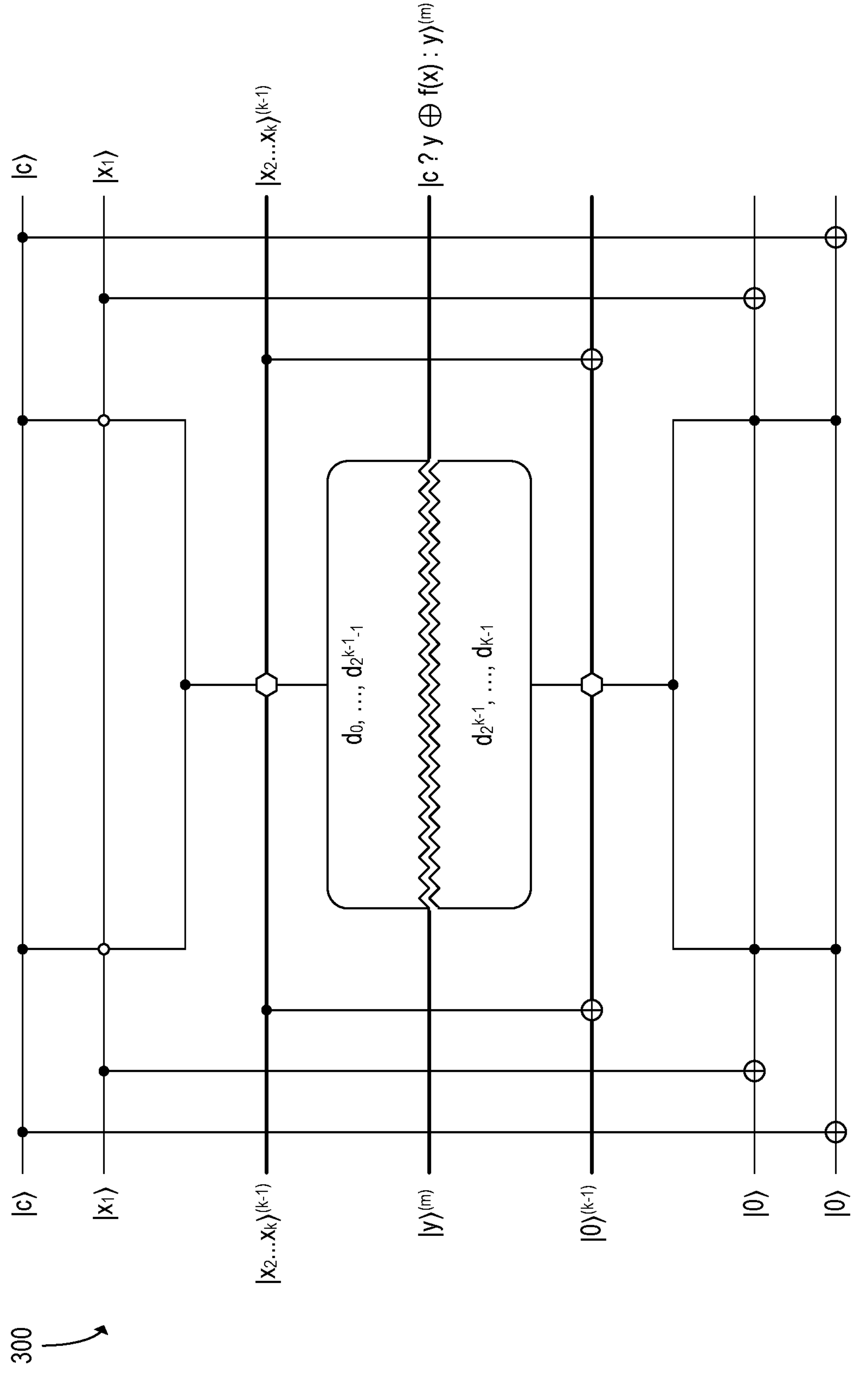
FIG. 14A shows an example of a controlled table lookup circuit with a zipper construction, according to the example of FIG. 1.

FIG. 14A shows an example of a controlled table lookup circuit 300 with a zipper construction, which may be another example of the table lookup circuit 40 of FIG. 1. The controlled table lookup circuit 300 has k input qubits and m output qubits and is configured to perform a controlled table lookup over K entries expressed as bit strings. As shown in the example of FIG. 14A, the controlled table lookup circuit 300 may be configured to receive at least a first table lookup input $|x_1\rangle$ and a second table lookup input $|x_2\rangle$. In some examples, $k \geq 3$, such that the first table lookup input $|x_1\rangle$ and the second table lookup input $|x_2\rangle$ are included among three or more table lookup inputs. In addition, the controlled table lookup circuit 300 may be configured to receive a control qubit state $|c\rangle$ as an additional input. The controlled table lookup circuit 300 may be further configured to perform a first table lookup operation on the first table lookup input $|x_1\rangle$ and a second table lookup operation on the second table lookup input $|x_2\rangle$ in parallel.

When the table lookup operations are performed in parallel, a combined table lookup output $|c?y\oplus f(x):y\rangle^{(m)}$ may be written to a combined output register $|y\rangle^{(m)}$. As shown in the expression for the combined table lookup output, the controlled $\rangle^{(m)}$ table lookup circuit 300 may be configured to compute the combined table lookup output based at least in part on the control qubit state $|c\rangle$. The combined table lookup output $|c?y\oplus f(x):y\rangle^{(m)}$ may include a plurality of first table lookup output qubits of the first table lookup operation and a plurality of second table lookup output qubits of the second table lookup operation. In the combined table lookup output, the plurality of first table lookup output qubits may be logically interleaved with the plurality of second table lookup output qubits within the combined output register $|y\rangle^{(m)}$.

Figure 14B:
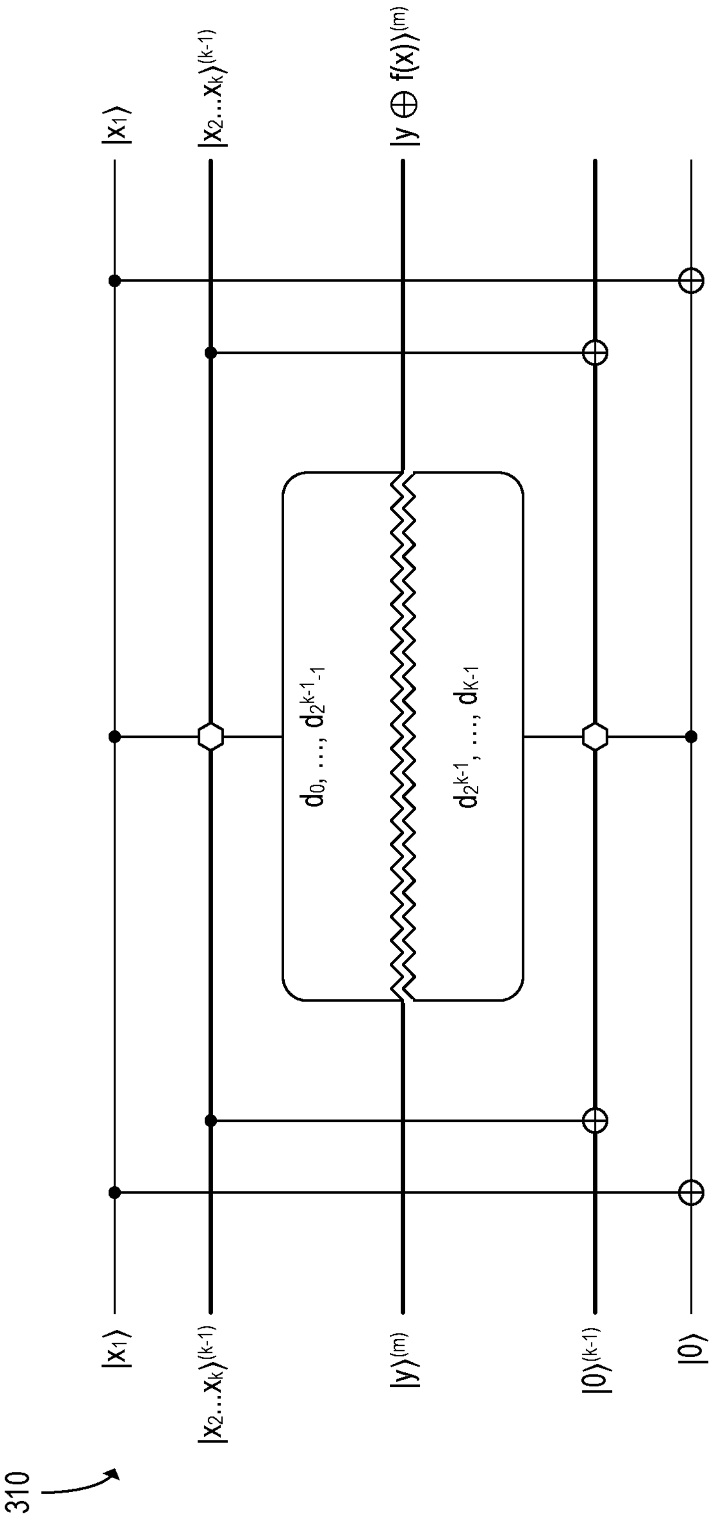
FIG. 14B shows an example of an uncontrolled table lookup circuit with the zipper construction, according to the example of FIG. 1.

FIG. 14B shows an example of an uncontrolled table lookup circuit 310 with the zipper construction, which may be another example of the table lookup circuit 40 of FIG. 1. The uncontrolled table lookup circuit 310, similarly to the controlled table lookup circuit 300, has k input qubits and m output qubits and is configured to perform a controlled table lookup over K entries. The uncontrolled table lookup circuit 310 may be configured to receive a plurality of input qubits and perform a plurality of table lookup operations on the input qubits in parallel. The output qubits $|y\oplus f(x)\rangle^{(m)}$ of the uncontrolled table lookup circuit 310 may be written to a combined output register $|y\rangle^{(m)}$. The output qubits of the plurality of table lookup operations may be logically interleaved within the combined output register $|y\rangle^{(m)}$ of the uncontrolled table lookup circuit 310.

In some examples, the controlled table lookup circuit 300 may be configured to logically interleave the plurality of first table lookup output qubits with the plurality of second lookup table output qubits at least in part by alternating between a respective plurality of first output qubit writing timesteps and a respective plurality of second output qubit writing timesteps. In the plurality of first output qubit writing timesteps, the plurality of first table lookup output qubits may be written to the combined output register $|y\rangle^{(m)}$. In the plurality of second output qubit writing timesteps, the plurality of second table lookup output qubits may be written to the combined output register $|y\rangle^{(m)}$. The controlled table lookup circuit 300 may be configured to perform three or more sets of output qubit writing timesteps in examples in which k≥3.

The controlled table lookup circuit 300 and/or the uncontrolled table lookup circuit 310 may be recursively constructed as discussed above with reference to FIGS. 5A-5C. As shown in FIGS. 14A-14B, the upper input register (denoted by the upper hexagon) may be configured to write entries $d_x$ for which the most-significant bit $x_1=0$ into the combined output register $|y\rangle^{(m)}$. The lower input register (denoted by the lower hexagon) may be configured to write entries $d_x$ for which the most-significant bit $x_1=1$ into the combined output register $|y\rangle^{(m)}$. In the examples of FIGS. 14A-14B, the qubits included in the combined output register $|y\rangle^{(m)}$ are the only qubits shared between the first table lookup operation and the second table lookup operation.

As shown in the example of FIG. 14A, the controlled table lookup circuit 300 may include a plurality of CXOR gates configured to receive the control qubit state $|c\rangle$. The plurality of first table lookup output qubits and the plurality of second table lookup output qubits may be written to the combined output register $|y\rangle^{(m)}$ via outputs of the plurality of CXOR gates. Thus, the first table lookup output qubits and the second table lookup output qubits may be logically interleaved by alternating between CXOR gates that are configured to output first table lookup output qubits and CXOR gates that are configured to output second table lookup output qubits.

The controlled table lookup circuit 300 may include an additional AND gate and an additional AND$^\dagger$ gate relative to the controlled multi-input table lookup circuit 122 of FIG. 5B, as shown in FIG. 14A.

Figure 15:
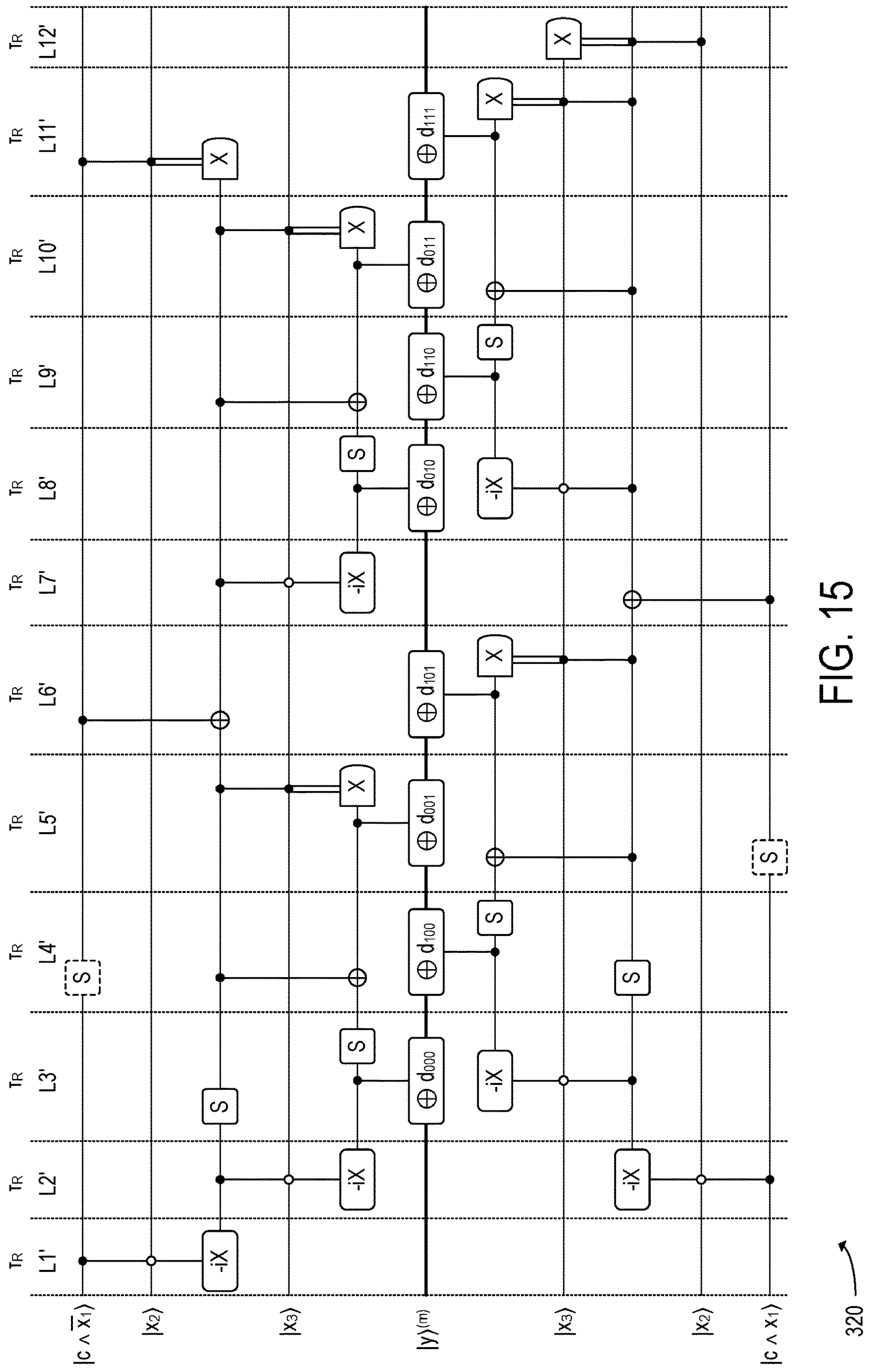
FIG. 15 an example temporal layer view of the controlled table lookup circuit of FIG. 14A.

FIG. 15 shows an example temporal layer view 320 of the controlled table lookup circuit 300 of FIG. 14A in an example in which k=3. In the example temporal layer view 320 of FIG. 15, the input qubits are split on $x_1$. Table lookups for $x_2$ and $x_3$ are logically interleaved in the example of FIG. 15. The temporal layer view 320 includes twelve temporal layers L1'-L12', each of which includes operations that may be performed in parallel. In the example of FIG. 15, the controlled table lookup circuit 300 includes an additional temporal layer compared to the controlled table lookup circuit 140 of FIG. 7B due to the lower table lookup (the table lookup for which $x_1=1$) beginning one temporal layer later than the upper table lookup (the table lookup for which $x_1=0$). This shift by one temporal layer changes the execution times of some layers from $\tau_R$ to $\tau_M$, since the CXOR gates included in the controlled table lookup circuit 300 have longer execution times than remote CNOT gates.

From temporal layers L7'-L11' of the controlled table lookup circuit 300 with the zipper construction, the number of logical cycles used by a controlled table lookup circuit with the zipper construction and k=2 may be computed as:

$$\hat{\tau}_{CTLz}(2)=2\tau_R+3\tau_M$$

The above time estimate does not account for the cycles spent copying the input qubits and performing the additional AND gate and the additional AND$^\dagger$ gate included in the controlled table lookup circuit 300 with the zipper construction. Combining the above equation with the durations of temporal layers L1', L6', and L12' results in the following recursive formula:

$$\hat{\tau}_{CTLz}(k)=2\tau_R+\tau_M+2\hat{\tau}_{CTLz}(k-1),\ k\geq 3$$

The recursive formula may be expressed in closed form as:

$$\hat{\tau}_{CTLz}(k)=2^k(\tau_R+\tau_M)-2\tau_R-\tau_M,\ k\geq 2$$

When the overhead durations of copying the input qubits and performing the additional AND gate and the additional AND$^\dagger$ gate are included, the total duration may be expressed as:

$$\hat{\tau}_{CTLz}(k)=2^k(\tau_R+\tau_M)-\tau_M+O(\sqrt{k}),\ k\geq 2$$

The $O(\sqrt{k})$ overhead of copying the input qubits assumes that the input qubits are aligned in a square.

Table 1, shown below, includes respective numbers of logical qubits, number of logical cycles, and effective number of logical cycles used by a controlled table lookup circuit 140 as a function of k. Table 1 also shows the upper-bound number of logical cycles used by a controlled table lookup circuit 300 with the zipper construction.

| k | $\sigma_{CTL}(k)$ | $\tau_{CTL}(k)$ | $\tau'_{CTL}(k)$ | $\tau_{CTLz}(k)$ |
|---|---|---|---|---|
| 1 | 186 | 22 | 22 | — |
| 2 | 292 | 59 | 44 | 41 |
| 3 | 312 | 133 | 90 | 89 |
| 4 | 312 | 281 | 214 | 185 |
| 5 | 332 | 577 | 455 | 377 |
| 6 | 356 | 1169 | 805 | 761 |

-continued

| k | $\sigma_{CTL}(k)$ | $\tau_{CTL}(k)$ | $\tau'_{CTL}(k)$ | $\tau_{CTLz}(k)$ |
|---|---|---|---|---|
| 7 | 356 | 2353 | 1812 | 1529 |
| 8 | 380 | 4721 | 3229 | 3065 |

The resource costs included in table 1 are shown for controlled table lookup circuits with $K=2^k$ entries, #CCiX=min{2, k}, and #CZ=1. In addition, in the controlled table lookup circuits for which resource costs are shown in table 1, m=7 and the CXOR circuit 100 is implemented with the vertical cat state layout of FIGS. 2A-2B. Preparations of $|0\rangle$ and $|+\rangle$ are assumed to have durations of one logical cycle, preparations of $|S\rangle$ and $|T\rangle$ are assumed to have durations of five logical cycles, joint XX and ZZ measurements are assumed to have durations of two logical cycles, and joint XZ measurements are assumed to have durations of three logical cycles. Thus, $\tau_R=5$ and $\tau_M=7$ in the example of table 1. A 20-logical-cycle initialization stage, in which $|S\rangle$ states for the CCiX circuits 180 are prepared and the initial preparation stage of the first CCiX execution is performed, is not included in the estimates shown in table 1. In addition, the initialization time in which qubits are copied is not included in the estimates of $\tau_{CTL}z(k)$.

In the example of table 1, the effective numbers of logical cycles $\tau r\alpha_{CTL}(k)$ are computed without assuming that the temporal layers are strictly separate. As shown in table 1, the effective overall runtime may be reduced by as much as ⅓ compared to $\tau_{TCL}(k)$ when strict separation between temporal layers is not assumed.

Figure 16A:
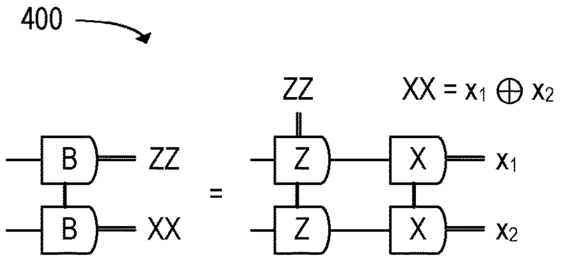
FIGS. 16A-16B show example axis-independent Bell measurement circuits, according to the example of FIG. 1.
Figure 16B:
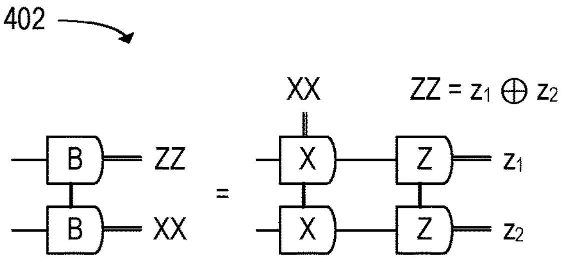

Circuits that may be included in the encoding surface layout 200 are discussed below. FIGS. 16A-16B respectively show examples of an axis-independent Bell measurement circuit 400 and an axis-independent Bell measurement circuit 402. The axis-independent Bell measurement circuit 400 of FIG. 16A includes a joint ZZ measurement followed by X measurements on the joint measurement outputs; the axis-independent Bell measurement circuit 402 of FIG. 16B includes a joint XX measurement followed by Z measurements on the joint measurement outputs. The axis-independent Bell measurement circuit 400 is configured to output $|x_1\rangle$, $|x_2\rangle$, and $|x_1 \oplus x_2\rangle$. The axis-independent Bell measurement circuit 402 is configured to output $|z_1\rangle$, $|z_2\rangle$, and $|z_1 \oplus z_2\rangle$.

Figure 17A:
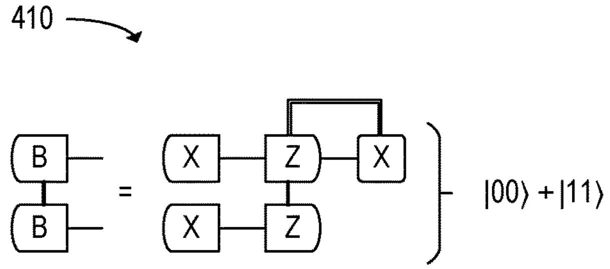
FIGS. 17A-17B show example axis-independent Bell state preparation circuits, according to the example of FIG. 1.
Figure 17B:
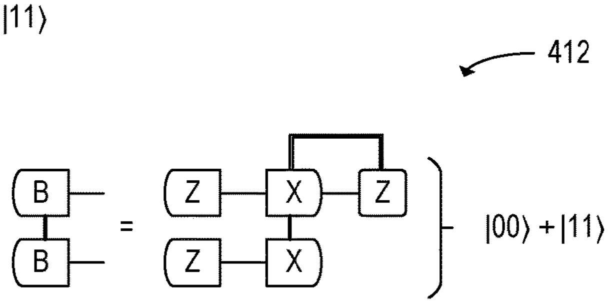

FIGS. 17A-17B respectively show examples of an axis-independent Bell state preparation circuit 410 and an axis-independent Bell state preparation circuit 412. In the axis-independent Bell state preparation circuit 410 of FIG. 17A, two $|+\rangle$ state preparations are followed by a joint ZZ measurement, and one of the outputs of the joint ZZ measurement is followed by an X operation. In the axis-independent Bell state preparation circuit 412 of FIG. 17B, two $|0\rangle$ state preparations are followed by a joint XX measurement, and one of the outputs of the joint XX measurement is followed by a Z operation. The axis-independent Bell state preparation circuits 410 and 412 are both configured to output $|00\rangle+|11\rangle$.

Figure 18A:
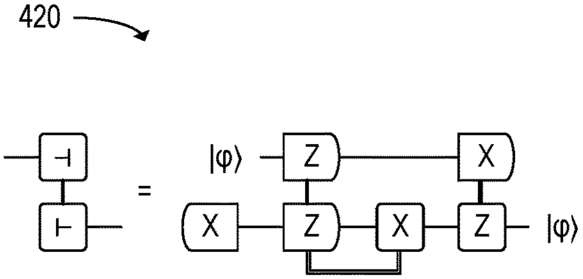
FIGS. 18A-18B show example axis-independent move operation circuits, according to the example of FIG. 1.
Figure 18B:
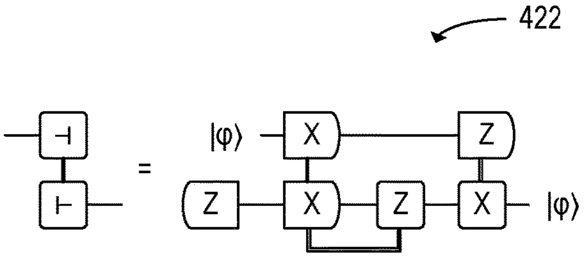

FIGS. 18A-18B respectively show examples of an axis-independent move operation circuit 420 and an axis-independent move operation circuit 422. The axis-independent move operation circuits 420 and 422 are configured to move a quantum state $|\varphi\rangle$ to a different location on the logical qubit encoding surface 12. For example, the axis-independent move operation circuits 420 and 422 may be used to move the states of qubits to respective ancillary qubits. In the axis-independent move operation circuit 422, X operations are replaced with Z operations and Z operations are replaced with X operations relative to the axis-independent move operation circuit 420.

Figure 19A:
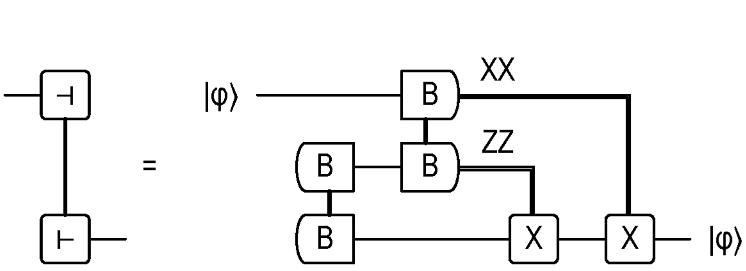
FIG. 19A shows an example teleportation circuit that includes a Bell state preparation and a Bell state measurement, according to the example of FIG. 1.
Figure 19B:
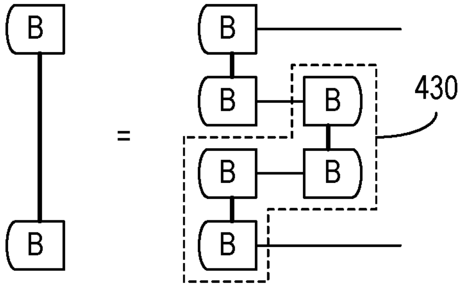
FIG. 19B shows an example remote Bell preparation circuit, according to the example of FIG. 1.
Figure 19C:
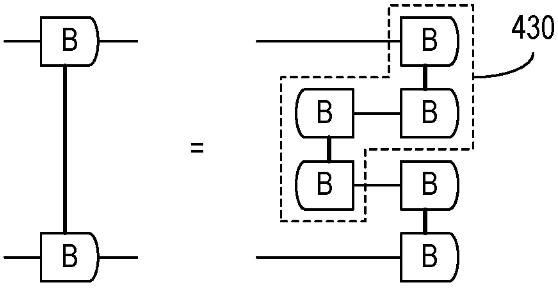
FIG. 19C shows an example remote Bell measurement circuit, according to the example of FIG. 1.

FIG. 19A shows an example teleportation circuit 430 that includes a Bell state preparation and a Bell state measurement. In the example teleportation circuit 430 of FIG. 19A, the source qubit and the destination qubit are connected by a path that includes an ancillary qubit. FIG. 19B shows an example remote Bell preparation circuit 432 in which two Bell preparation operations are connected by a path that includes two ancillary qubits. The remote Bell preparation circuit 432 shown in FIG. 19B includes an instance of the teleportation circuit 430. FIG. 19C shows an example remote Bell measurement circuit 434 in which two Bell measurements are connected by a path that includes two ancillary qubits. The remote Bell measurement circuit 434 shown in FIG. 19C includes an instance of the teleportation circuit 430. In some examples, the remote Bell preparation circuit 432 and/or the remote Bell measurement circuit 434 may be extended by an even number of ancillary qubits by including one or more additional instances of the teleportation circuit 430. Additionally or alternatively, the remote Bell preparation circuit 432 and/or the remote Bell measurement circuit 434 may be extended by an ancillary qubit by including an additional instance of the axis-independent move operation circuit 420 or the axis-independent move operation circuit 422.

Figure 20A:
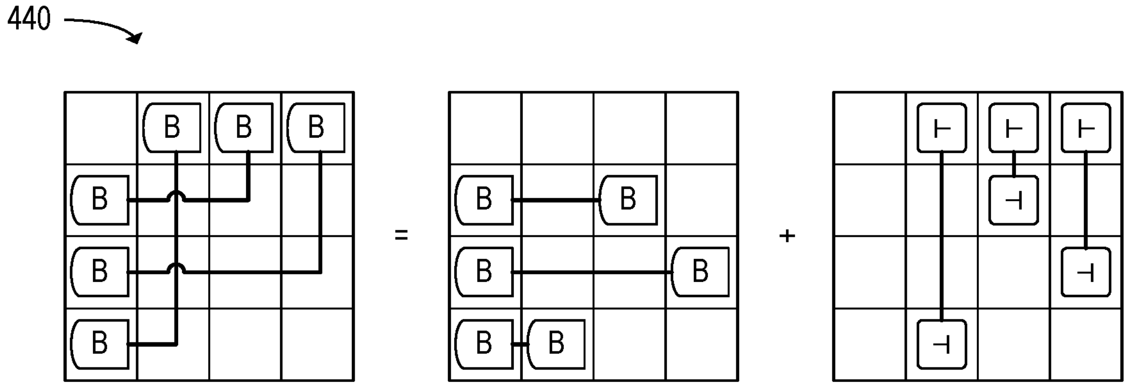
FIG. 20A shows an example Bell state preparation switchboard circuit, according to the example of FIG. 1.

FIG. 20A shows an example Bell state preparation switchboard circuit 440. The Bell state preparation switchboard circuit 440 may be constructed from a plurality of horizontal Bell state preparation operations and a plurality of vertical teleportation operations. The positions of the horizontal Bell state preparation operations and the vertical teleportation operations may be permuted within the set of rows occupied by the horizontal Bell state preparation operations and within the set of columns occupied by the vertical teleportation operations to reroute the connections between the Bell state preparation operations.

Figure 20B:
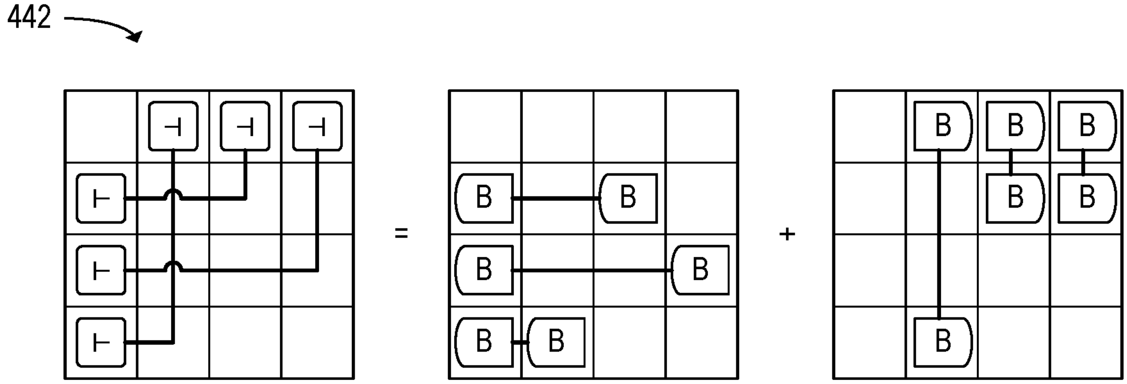
FIG. 20B shows an example teleportation switchboard circuit, according to the example of FIG. 1.

FIG. 20B shows an example teleportation switchboard circuit 442. The teleportation switchboard circuit 442 may be constructed from a plurality of horizontal Bell state preparation operations and a plurality of vertical Bell state measurement operations. The positions of the horizontal Bell state preparation operations and the vertical Bell state measurement operations may be permuted within the set of rows occupied by the horizontal Bell state preparation operations and within the set of columns occupied by the vertical Bell state measurement operations to reroute the connections between the source qubits and the destination qubits of the teleportation operations.

Figure 21A:
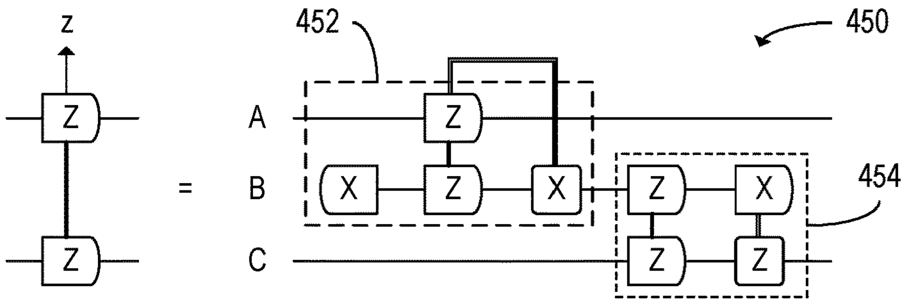
FIGS. 21A-21C show example remote ZZ measurement circuits, according to the example of FIG. 1.
Figure 21B:
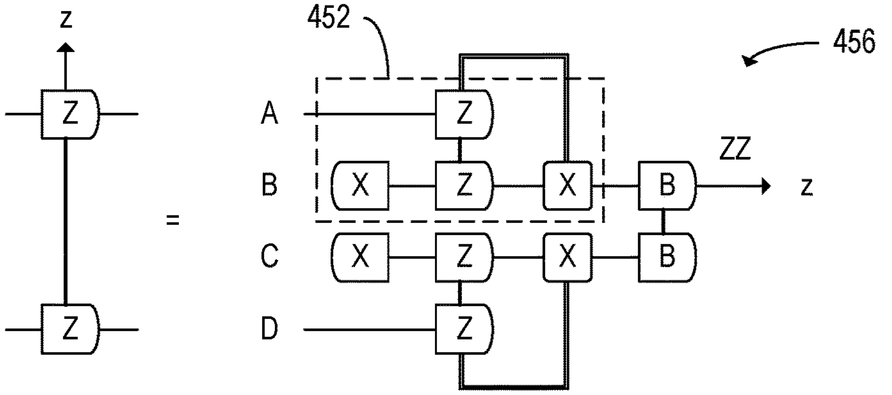
Figure 21C:
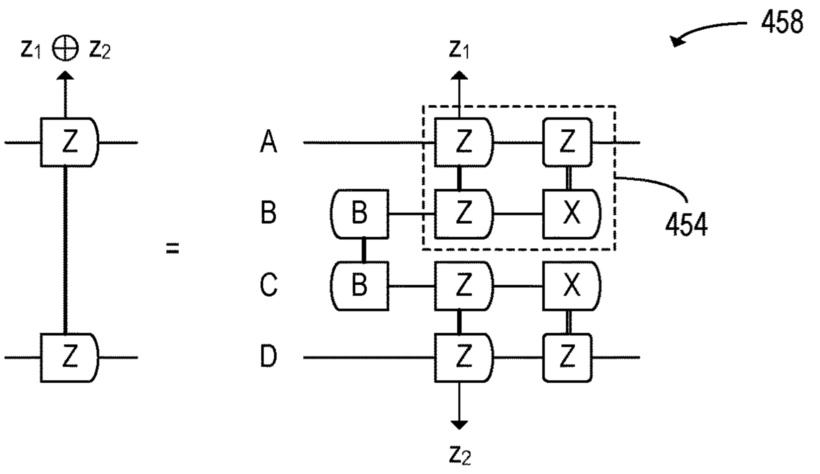

FIGS. 21A-21C respectively show example remote ZZ measurement circuits 450, 456, and 458. The remote ZZ measurement circuit 450 of FIG. 21A is configured to perform a joint ZZ measurement between two states separated by one qubit in the vertical direction. The remote ZZ measurement circuit 450 includes a Z-direction growth operation 452 and a Z-direction contraction operation 454. The Z-direction growth operation 452 shown in FIG. 21A is configured to fan out the state of qubit A to qubit B. The Z-direction contraction operation 454 is configured to be equivalent to a joint ZZ measurement on qubits A and C.

FIG. 21B shows a remote ZZ measurement circuit 456 in which the joint ZZ measurement is performed on two states separated by two qubits in the vertical direction. The remote ZZ measurement circuit 456 also includes a Z-direction contraction operation 454. At the remote ZZ measurement circuit 456, qubits A and D are fanned out to qubits B and C, respectively, followed by a joint Bell measurement across qubits B and C. The joint Bell measurement yields the result of the joint ZZ measurement.

At the remote ZZ measurement circuit 458 of FIG. 21C, the joint ZZ measurement is performed across two intervening qubits in the vertical direction, similarly to the remote ZZ measurement circuit 456 of FIG. 21B. The remote ZZ measurement circuit 458 of FIG. 21C is configured to prepare a joint Bell state on qubits B and C. The top joint ZZ measurement shown in FIG. 21C is configured to connect the joint Bell state to qubit A, thereby fanning qubit A out over qubits B and C. A conditional Pauli X gate may also be executed at qubits B and C. The bottom joint ZZ measurement is configured to perform a joint measurement of qubits A and D. The result of the joint ZZ measurement of qubits A and D is given by the XOR of the two joint ZZ measurements included in the remote ZZ measurement circuit 458. Since, up to conditional X corrections, qubits A and D are fanned out to qubits B and C, respectively, qubits B and C may be uncomputed using an X measurement and a conditional Z correction along qubits A and D. The X measurement commutes with each of the conditional corrections in examples in which conditional corrections are performed.

The example remote ZZ measurement circuits 450, 456, and 458 of FIGS. 21A-21C may be extended to perform a remote ZZ measurement along an arbitrary path. FIG. 22A shows an example of a remote ZZ measurement circuit 460 in which three intervening qubits are located between the qubits for which the joint ZZ measurement is performed. The example remote ZZ measurement circuit 460 of FIG. 22A is an instance of the remote ZZ measurement circuit 450 of FIG. 21A in which the teleportation circuit 430 inserted between the joint ZZ measurements. The X measurement following the first joint ZZ measurement is also removed in the remote ZZ measurement circuit 460 of FIG. 22A relative to the remote ZZ measurement circuit of FIG. 21A. The Bell preparation and measurement operations included in the remote ZZ measurement circuit 460 are configured to teleport qubit B to qubit D. The remote ZZ measurement circuit 460 includes a Z-direction growth operation 462 and a Z-direction contraction operation 464 that differ from the Z-direction growth operation 452 and the Z-direction contraction operation 454 of FIG. 21A by the absence of an X gate and a Z gate, respectively.

In order to extend a remote ZZ measurement circuit, a ZZ measurement circuit over k qubits may be extended to a remote ZZ measurement circuit over k+2 qubits by replacing a two-qubit Bell preparation circuit with the four-qubit remote Bell preparation circuit 432 of FIG. 19B and/or by replacing a two-qubit Bell measurement circuit with the four-qubit remote Bell measurement circuit 434 of FIG. 19C. These replacements may, for example, be performed to extend the remote ZZ measurement circuit 456 of FIG. 21B and/or the remote ZZ measurement circuit 458 of FIG. 21C to obtain remote ZZ measurement circuits over even numbers of qubits. As another example, the replacement of two-qubit Bell preparation circuits and two-qubit Bell measurement circuits discussed above may be performed on the remote ZZ measurement circuit 460 of FIG. 22A to obtain remote ZZ measurement circuits over odd numbers of qubits. Thus, remote ZZ measurement circuits performed over numbers of qubits greater than five may be constructed. The remote ZZ measurement circuit may take an arbitrary path across the logical qubit encoding surface 12 in which the target qubits are vertically adjacent to their neighboring ancillary qubits.

Figure 22B:
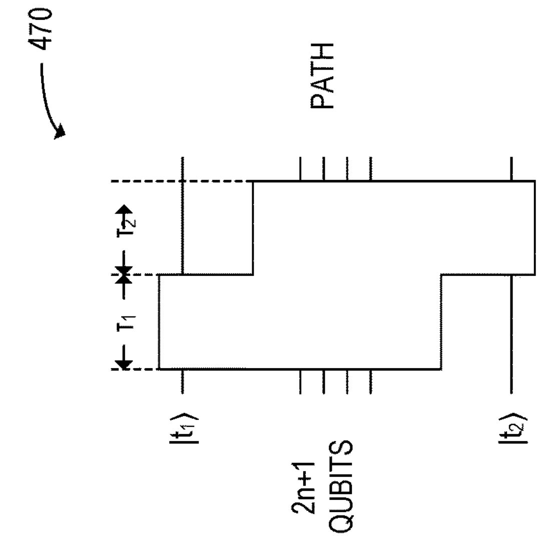
FIGS. 22B-22D show example timing shapes of respective remote ZZ measurement circuits, according to the examples of FIGS. 21A-22A.
Figure 22A:
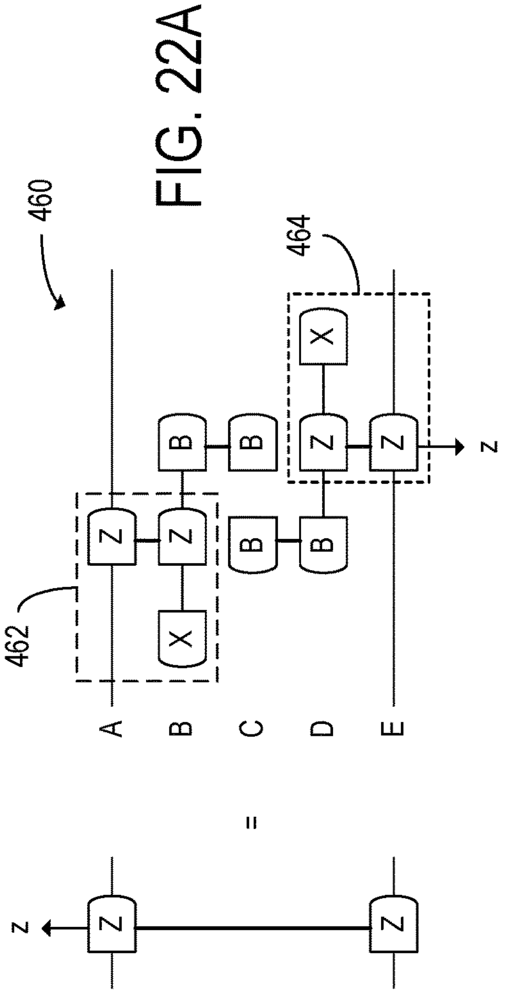
FIG. 22A shows an example of a remote ZZ measurement circuit in which three intervening qubits are located between the qubits for which the joint ZZ measurement is performed, according to the example of FIG. 1.
Figure 22D:
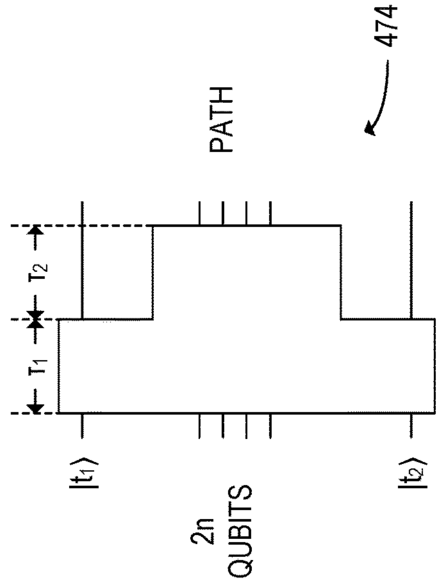
Figure 22C:
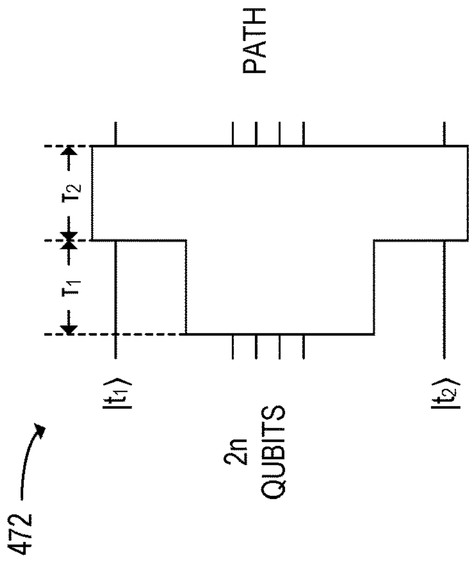

FIGS. 22B-22D show example timing shapes 470, 472, and 474 of respective remote ZZ measurement circuits. The timing shape 470 shown in FIG. 22B is the timing shape of a remote ZZ measurement circuit over an odd number of qubits given by 2n+1. FIG. 22B shows a first duration $\tau_1$, which is the longer of the duration of Bell state preparation and the duration of the Z-direction growth operation 452. FIG. 22B further shows a second duration $\tau_2$, which is the longer of the duration of Bell state measurement and the duration of the Z-direction contraction operation 454.

In the timing shape 470 of FIG. 22B, the operations with the first duration $\tau_1$ are performed at a first target qubit $|\tau_1\rangle$ and the plurality of intervening qubits of the remote ZZ measurement circuit. The operations with the second duration $\tau_2$ are performed for the plurality of intervening qubits and a second target qubit $|\tau_2\rangle$.

In the timing shape 472 of FIG. 22B, the operations with the first duration $\tau_1$ are performed at the plurality of intervening qubits. The operations with the second duration $\tau_2$ are performed at the first target qubit $|t_1\rangle$, the plurality of intervening qubits, and the second target qubit $|\tau_2\rangle$.

In the timing shape 474 of FIG. 22C, the operations with the first duration $\tau_1$ are performed at the first target qubit $|\tau_1\rangle$, the plurality of intervening qubits, and the second target qubit $|\tau_2\rangle$. The operations with the second duration $\tau_2$ are performed at the plurality of intervening qubits.

A remote XX measurement circuit may be constructed in a manner analogous to the remote ZZ measurement circuits discussed above, but with each X preparation replaced with a Z preparation, each X measurement replaced with a Z measurement, each Z preparation replaced with an X preparation, and each Z measurement replaced with an X measurement. Bell preparations and Bell measurements in the remote XX measurement circuit are unchanged relative to the corresponding remote ZZ measurement circuit. The remote XX measurement circuit may take an arbitrary path across the logical qubit encoding surface 12 in which the target qubits are horizontally adjacent to their neighboring ancillary qubits.

Figure 23:
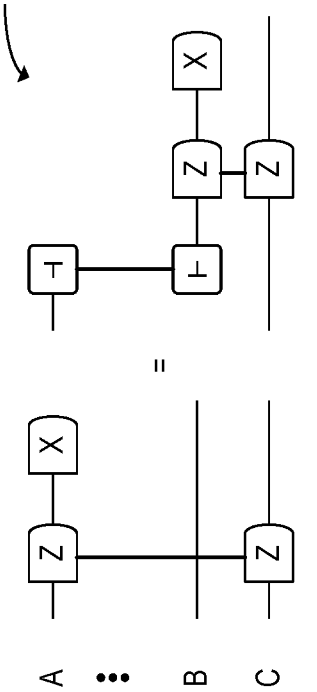
FIG. 23 shows an example remote ZZ and X measurement circuit, according to the example of FIG. 1.

FIG. 23 shows an example remote ZZ and X measurement circuit 480 in which an X measurement is performed on one of the target qubits of a remote ZZ measurement immediately following the remote ZZ measurement. In the remote ZZ and X measurement circuit 480, a teleportation operation is performed using the example teleportation circuit 430 of FIG. 19A. This teleportation operation allows the remote ZZ measurement to be performed across qubits A and B even though qubits A and B are not adjacent. The remote ZZ measurement may be performed in parallel with the Bell measurements included in the teleportation circuit.

Figure 24A:
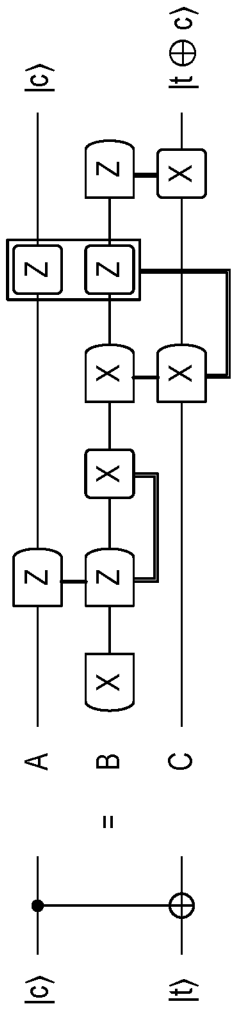
FIGS. 24A-24B show example remote CNOT circuits over three qubits, according to the example of FIG. 1.
Figure 24B:
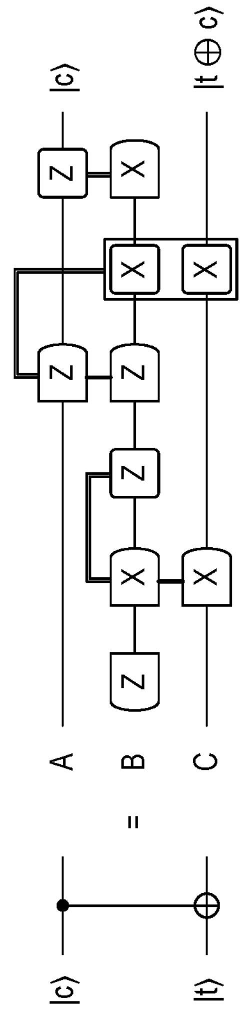
Figure 24C:
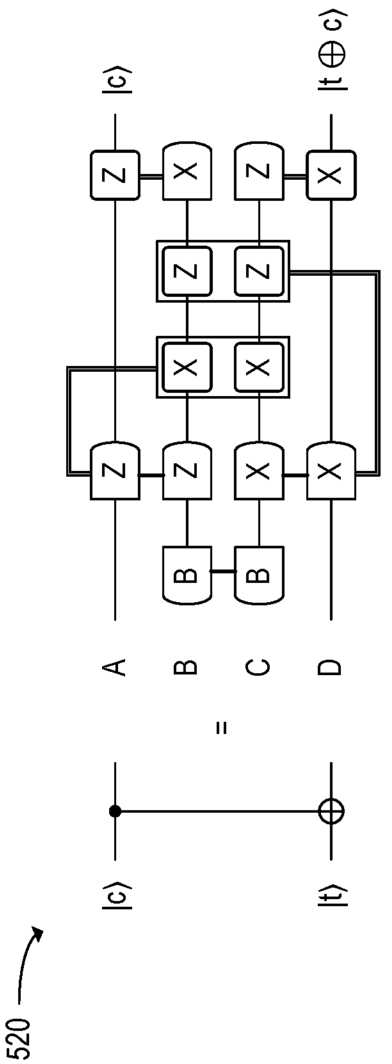
FIGS. 24C-24D show example remote CNOT circuits over four qubits, according to the example of FIG. 1.
Figure 24D:
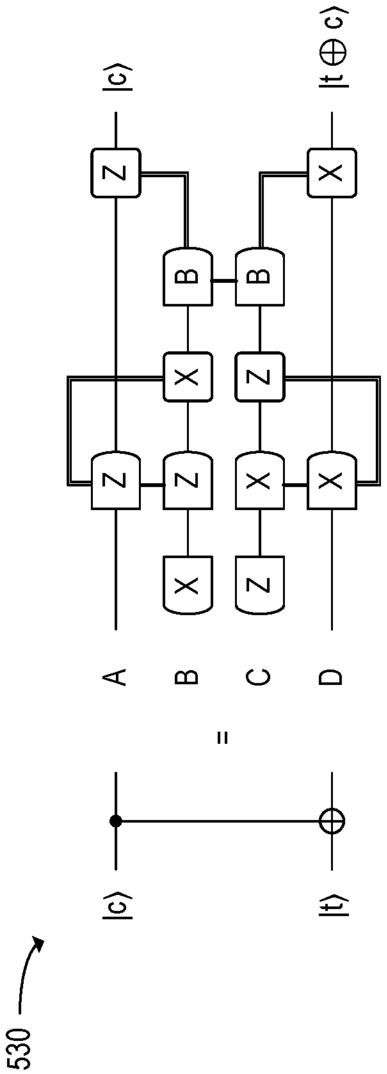

FIGS. 24A and 24B show example remote CNOT circuits 500 and 510 over three qubits. In addition, FIGS. 24C and 24D show examples of remote CNOT circuits 520 and 530 over four qubits. In the remote CNOT circuits 500 and 510 of FIGS. 24A and 24B, the three qubits include a control qubit $|c\rangle$, a target qubit $|t\rangle$, and an auxiliary qubit located on a path between the control qubit $|c\rangle$ and the target qubit $|t\rangle$. The remote CNOT circuits 520 and 530 of FIGS. 24C and 24D instead have two auxiliary qubits located on the path between the control qubit $|c\rangle$ and the target qubit $|t\rangle$. The remote CNOT circuit 520 may be derived from the remote CNOT circuit 500 by replacing the local ZZ measurement in the remote CNOT circuit 500 with the three-qubit remote ZZ measurement circuit 450 and performing a remote Bell preparation and a remote Bell measurement using instances of the remote Bell preparation circuit 432 and the remote Bell measurement circuit 434.

Figure 25A:
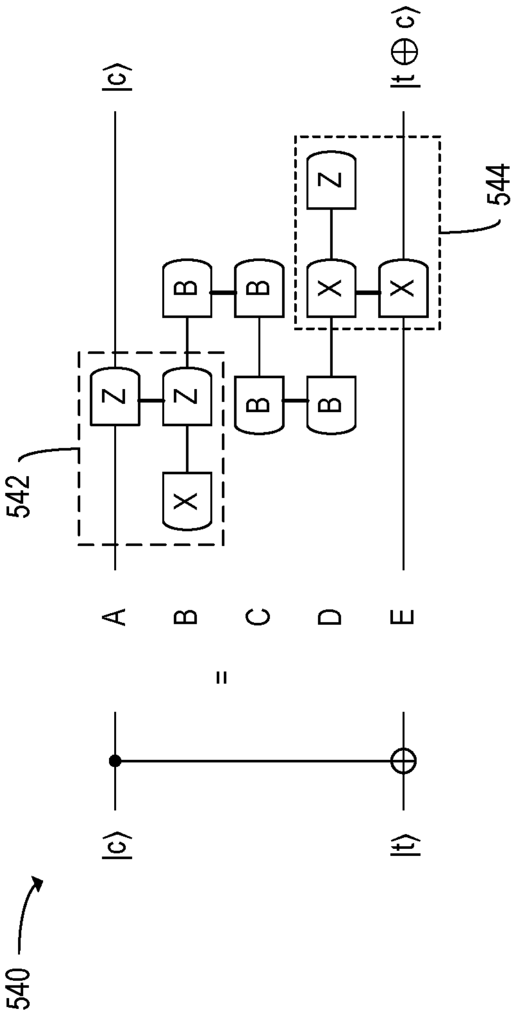
FIGS. 25A-25B show example remote CNOT circuits over five qubits, according to the example of FIG. 1.
Figure 25B:
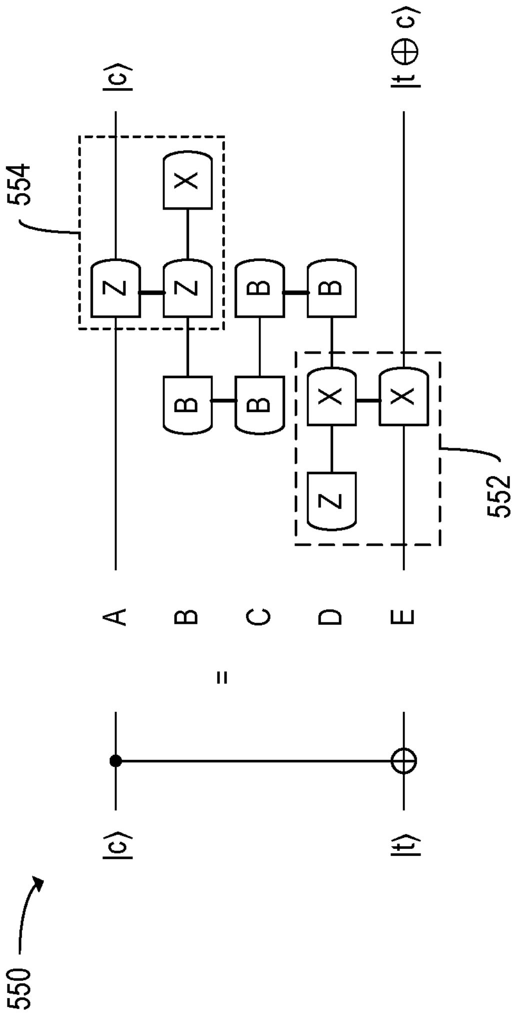
Figure 25C:
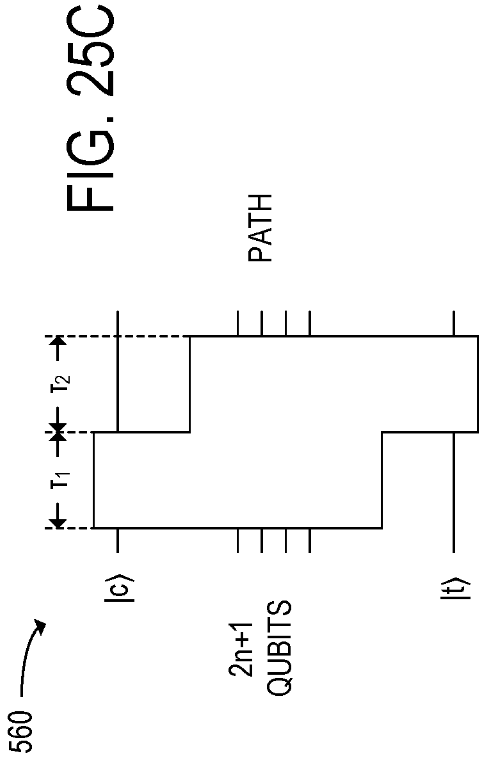
FIGS. 25C-25F show example timing shapes of remote CNOT circuits, according to the examples of FIGS. 24A-25B.

FIGS. 25A and 25B show example remote CNOT circuits 540 and 550 over five qubits. The five qubits of the remote CNOT circuits 540 and 550 include a control qubit $|c\rangle$, a target qubit $|t\rangle$, and three auxiliary qubits located on the path between the control qubit $|c\rangle$ and the target qubit $|t\rangle$. The remote CNOT circuit 540 of FIG. 25A includes a Z-direction growth operation 542 and a Z-direction contraction operation 544 with a teleportation circuit between them. The remote CNOT circuit 550 of FIG. 25B includes an X-direction growth operation 552 and an X-direction contraction operation 554 with a teleportation circuit between them. Remote CNOT circuits over more than five qubits may be constructed by replacing a two-qubit Bell preparation circuit with the four-qubit remote Bell preparation circuit 432 and/or by replacing a two-qubit Bell measurement circuit with the four-qubit remote Bell measurement circuit 434 in a four-qubit or five-qubit remote CNOT circuit.

Figure 25D:
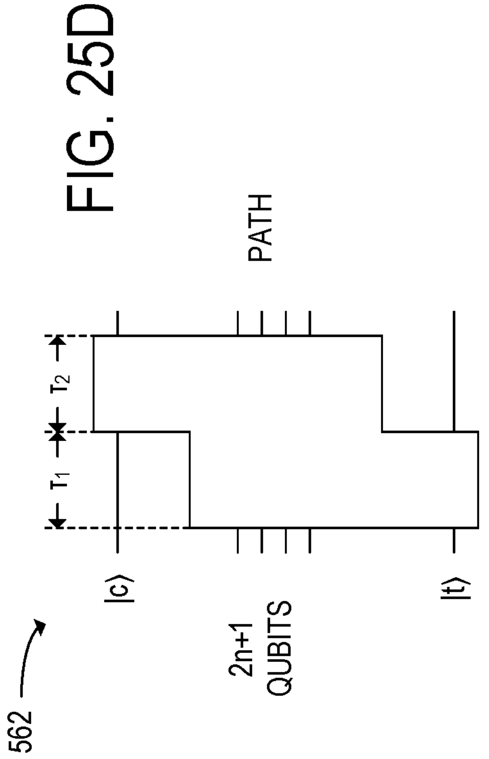
Figure 25E:
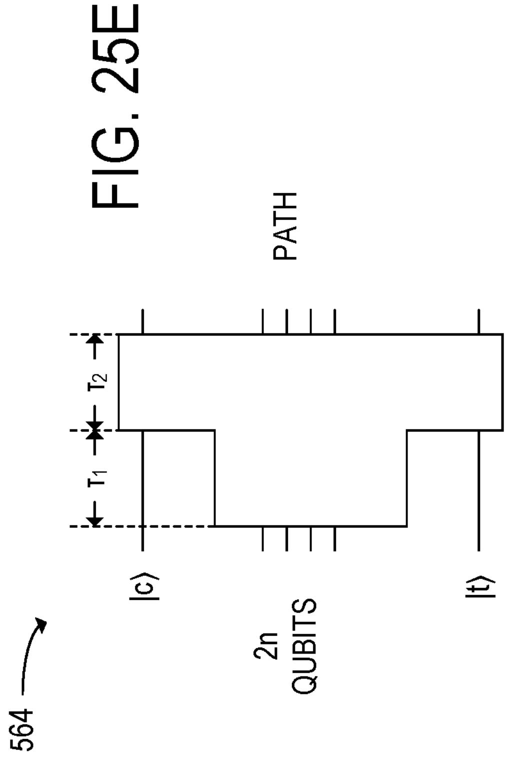
Figure 25F:
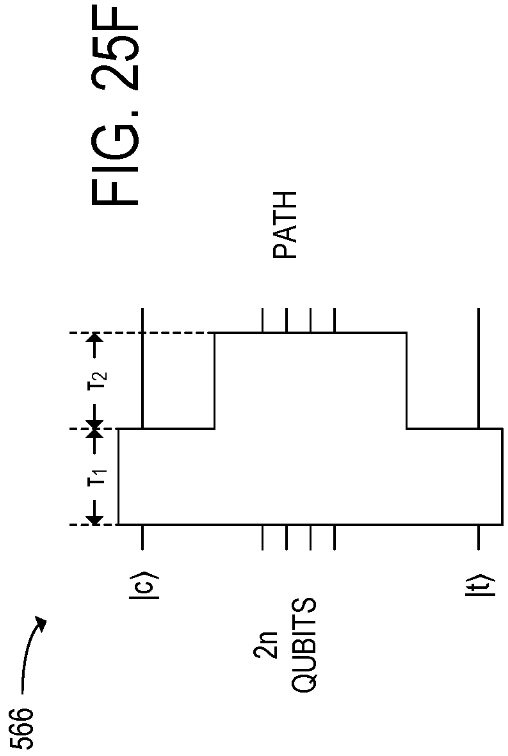

FIGS. 25C-25F show example timing shapes 560, 562, 564, and 566 of remote CNOT circuits. The example timing shape 560 of FIG. 25C and the timing shape 562 of FIG. 25D are timing shapes for remote CNOT circuits over odd numbers of qubits. The example timing shape 564 of FIG. 25E and the timing shape 566 of FIG. 25F are timing shapes for remote CNOT circuits over even numbers of qubits. The first duration $\tau_1$ is the longer of the duration of Bell state preparation and the duration of the Z-direction growth operation 542 or X-direction growth operation 552. The second duration $\tau_2$ is the longer of the duration of Bell state measurement and the duration of the Z-direction contraction operation 544 or X-direction contraction operation 554.

Figure 26:
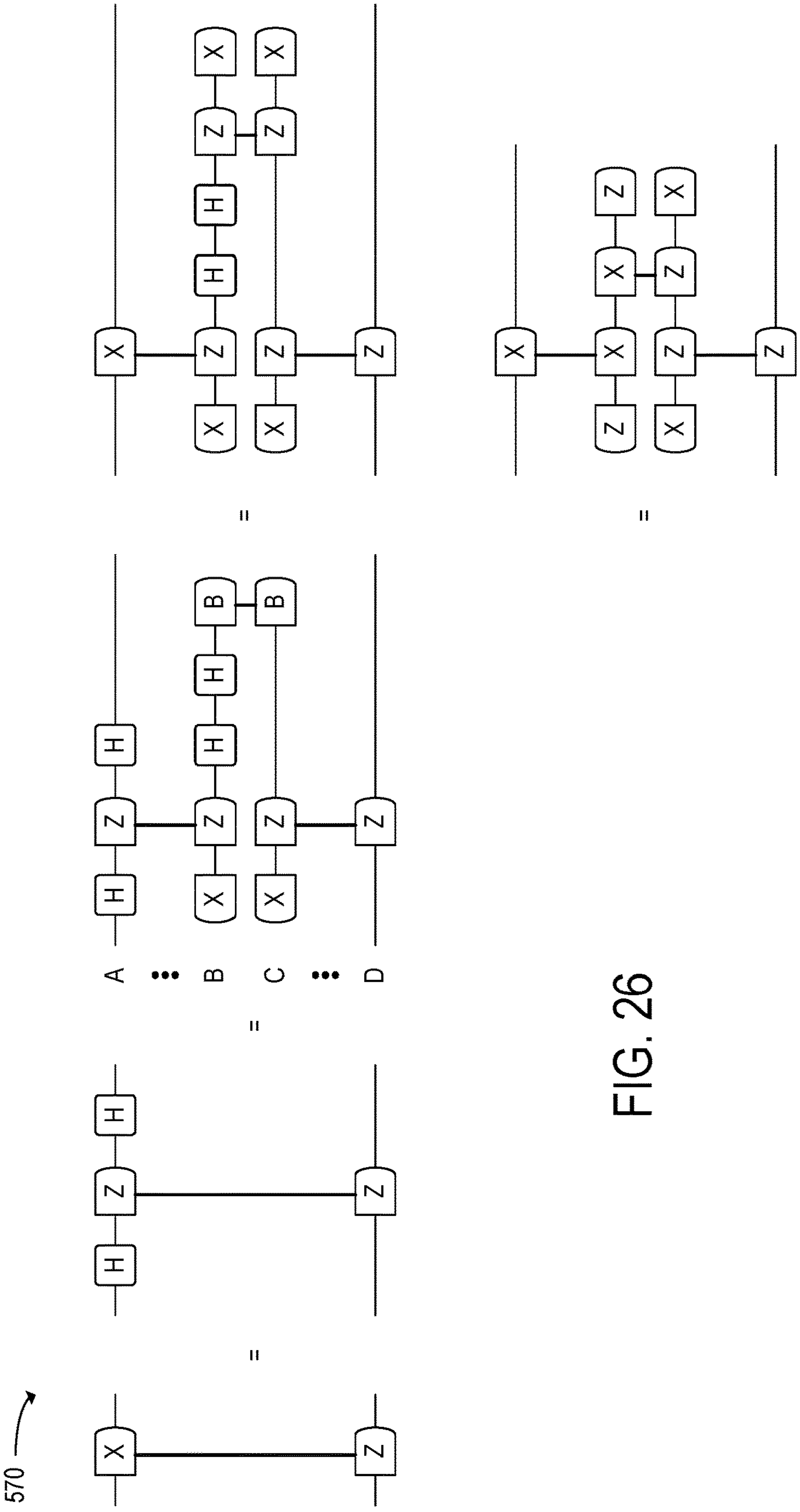
FIG. 26 shows an example remote XZ measurement circuit, according to the example of FIG. 1.

FIG. 26 shows an example remote XZ measurement circuit 570. The remote XZ measurement circuit 570 may be constructed from an X preparation, a Z preparation, a remote XX measurement, a remote ZZ measurement, a local XZ measurement, a Z measurement, and an X measurement, as shown on the lower righthand side of FIG. 26. As depicted in FIG. 26, this construction of the remote XZ measurement circuit 570 may be derived by applying the commutativity of Hadamard gates with the other measurements included in the remote XZ measurement circuit 570. The Hadamard gates may be merged into the X preparation and X measurement operations, thereby transforming the upper remote ZZ measurement into a remote XX measurement and transforming the joint ZZ measurement from the Bell measurement circuit into an XZ measurement.

The preparation of cat states at the logical qubit encoding surface 12 is discussed below. Recursive constructions may be used to prepare the following cat states:

$$|GHZ_n\rangle_Z = |GHZ_n\rangle = \frac{1}{\sqrt{2}}(|0\rangle^{\otimes n} + |1\rangle^{\otimes n})$$

$$|GHZ_n\rangle_X = H^{\otimes n}|GHZ_n\rangle = \frac{1}{\sqrt{2}}(|+\rangle^{\otimes n} + |-\rangle^{\otimes n})$$

These cat states may be constructed on n vertically adjacent logical qubits and n horizontally adjacent logical qubits, respectively, and are referred to as z-cat states and x-cat states. The x-cat states may also be expressed as:

$$|GHZ_n\rangle_X = \frac{1}{\sqrt{2^{n-1}}} \sum_{\substack{0 \le i < 2^n, \\ vi \bmod 2 = 0}} |i\rangle$$

In the above expression, vi refers to the number of is in the binary representation of i. Thus, the x-cat states may be expressed as the uniform superposition over the basis states with even numbers of is in their binary representations.

The z-cat state may be constructed from a decomposition of cat states. For any n≥2 and j+k=n for 1≤j<n, The decomposition may be given by:

$$|GHZ_j\rangle \otimes |GHZ_k\rangle = \frac{1}{2}(|0^j0^k\rangle + |0^j1^k\rangle + |1^j0^k\rangle + |1^j1^k\rangle)$$

The qubit j (the last qubit in the first cat state) and the qubit j+1 (the first qubit of the second cat state) may be measured using a joint ZZ measurement. When the outcome of the joint ZZ measurement corresponds to the +1 eigenvalue, the measurement results in the $|GHZ_n\rangle$ state. When the outcome corresponds to a different eigenvalue, the resulting state is $$\frac{1}{\sqrt{2}}(|0^j1^k\rangle + |1^j0^k\rangle),$$

which may be transformed into $|GHZ_n\rangle$ by applying X corrections on the first j qubits or the last k qubits.

Figure 27A:
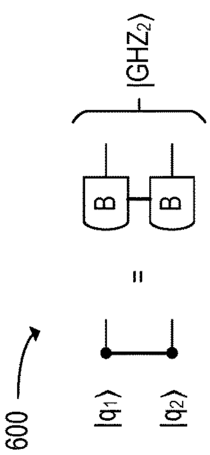
FIGS. 27A-27C show example z-cat state preparation circuits at which $|GHZ_n\rangle_Z$ states may be prepared, according to the example of FIG. 1.
Figure 27B:
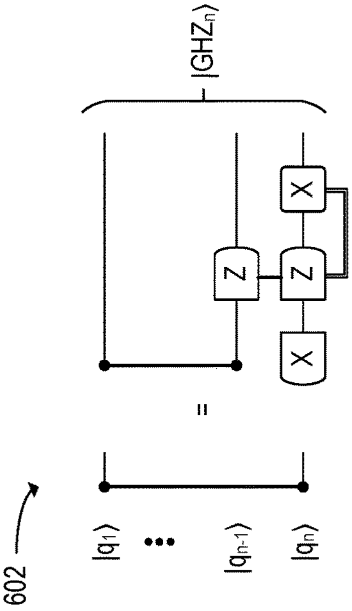
Figure 27C:
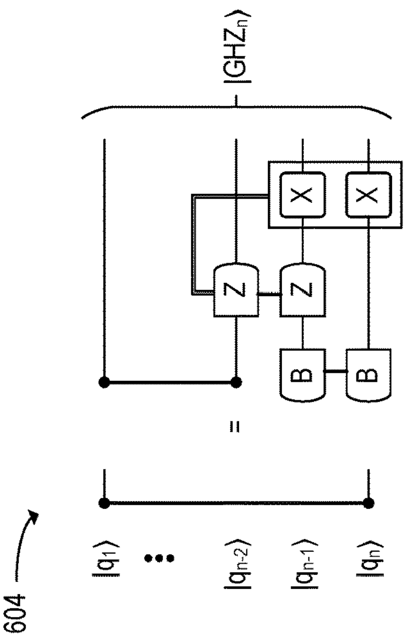

FIGS. 27A-27C show example z-cat state preparation circuits 600, 602, and 604 at which $|GHZ_n\rangle_Z$ may be prepared. In the examples of FIGS. 27A-27C, k∈{1,2} such that j is even and X corrections are applied to the last k qubits. The z-cat state preparation circuit 600 of FIG. 27A may be used to prepare $|GHZ_n\rangle$ when n=2. The z-cat state preparation circuit 602 of FIG. 27B may be used to prepare $|GHZ_n\rangle$ when n>2 and n is odd. The z-cat state preparation circuit 604 of FIG. 27C may be used to prepare $|GHZ_n\rangle$ when n>2 and n is even. In the recursive construction of the z-cat state preparation circuits 602 and 604, the base case is $$|GHZ_2\rangle = \frac{1}{\sqrt{2}}(|00\rangle + |11\rangle)$$

when k=1. Since the cat state preparations used in the recursive construction are applied on even numbers of qubits, the z-cat state preparation circuits 602 and 604 have constant temporal depth, with the first temporal layer including Bell state preparations and the second temporal layer including joint ZZ measurements.

Figure 27D:
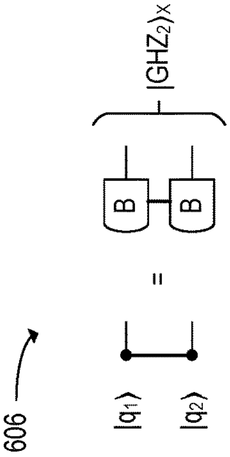
FIGS. 27D-27F show example x-cat state preparation circuits at which $|GHZ_n\rangle_X$ states may be prepared, according to the example of FIG. 1.
Figure 27E:
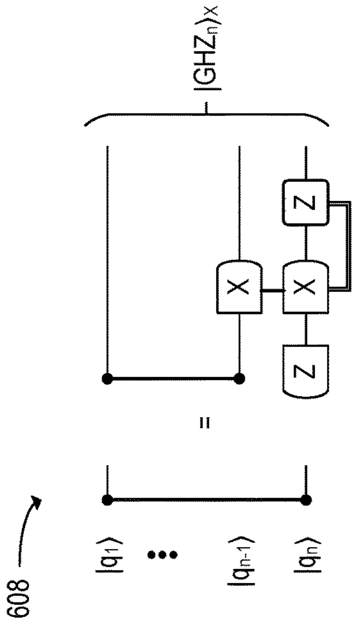
Figure 27F:
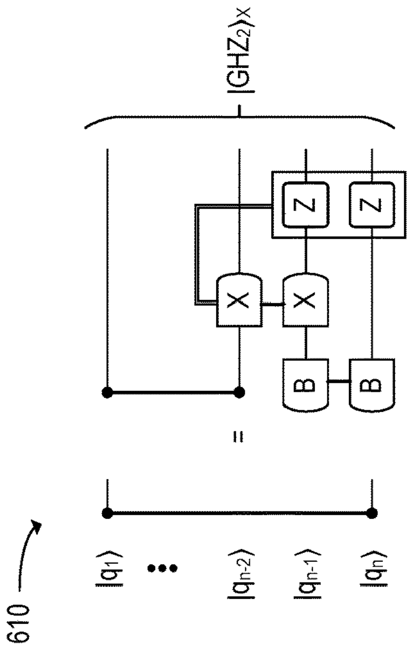

FIGS. 27D-27F show example x-cat state preparation circuits 606, 608, and 610 at which $|GHZ_n\rangle_X$ may be prepared. X preparation, joint ZZ measurements, and X corrections are replaced with Z preparation, joint XX measurement, and Z corrections in the x-cat state preparation circuits 606, 608, and 610 relative to the z-cat state preparation circuits 600, 602, and 604 of FIGS. 27A-27C.

Cat states with holes may also be constructed. Let $Q=\{q_1, \ldots, q_n\}$ be a set of vertically adjacent qubits and let $H=\{h_1, \ldots, h_m\} \subseteq Q \backslash q_1\}$. A z-cat state may be prepared on the qubits Q\H by preparing a z-cat state on Q using the construction process discussed above and performing X measurements on each of the qubits included in H. The results of the X measurements may be given as $r_1, \ldots, r_m$. A Z correction may be conditionally applied to $q_1$ when $r_1 \oplus \ldots \oplus r_m$ is true. An x-cat state with holes may additionally or alternatively be prepared on horizontally adjacent qubits by replacing X measurements and Z corrections with Z measurements and X corrections, respectively.

A z-cat state may be constructed on an arbitrary path by leaving holes on segments of horizontally adjacent qubits as discussed below. Similarly, an x-cat state may be constructed along an arbitrary path by leaving holes on segments of vertically adjacent qubits. Let $Q=(q_1, \ldots, q_n)$ be a tuple of qubits, where $q_i$ and $q_{i+1}$ are either vertically or horizontally adjacent. Let vadj(q, q') and hadj(q, q') be logical predicates for $q_i$ and $q_{i+1}$ being vertically adjacent and for $q_i$ and $q_{i+1}$ being horizontally adjacent, respectively. Q may be partitioned into $q_1|q_2$, $q_3|q_4$, $q_5|\ldots$, where $q_n$ is included in a pair only if n is odd. Accordingly, the qubits included in Q are part of the cat state if those qubits are not included in a pair, or if those qubits are included in a pair of vertically adjacent qubits. Inclusion in the cat state may be formally defined by the following logical predicate:

$$\text{incat}(q_i)=[i=1]\vee([n \bmod 2=0]\wedge[i=n])\vee\text{vadj}(q_{2\lfloor i/2\rfloor}, q_{2\lfloor i/2\rfloor+1})$$

In addition, let $C=\{q\in Q|\text{incat}(q)\}$. The cat state on C in Q with holes $H=Q\backslash C$ may be constructed according to the following steps.

1. Prepare Bell pairs on qubits $q_{2i-1}$ and $q_{2i}$ for $$1 \le i < \frac{n}{2}.$$

When n is even, prepare the qubit $q_n$ in a $|+\rangle$ state.

2. For each pair $q_i$, $q_{i+1}$ as in the partition discussed above, perform one of the following steps based on the adjacency of the qubits included in the pair. If hadj($q_i$, $q_{i+1}$), perform a joint Bell measurement of $q_i$ and $q_{i+1}$ and retrieve two measurement results ZZ and XX. The joint Bell measurement may, for example, be performed as shown in the example Bell measurement circuit 400 of FIG. 16A or the example Bell measurement circuit 402 of FIG. 16B. If vadj($q_i$, $q_{i+1}$), perform a joint ZZ measurement on $q_i$ and $q_{i+1}$. If the result of the joint ZZ measurement is true, perform respective X corrections on each of the qubits included in $C\cap\{q_1, \ldots, q_i\}$.

Figure 28A:
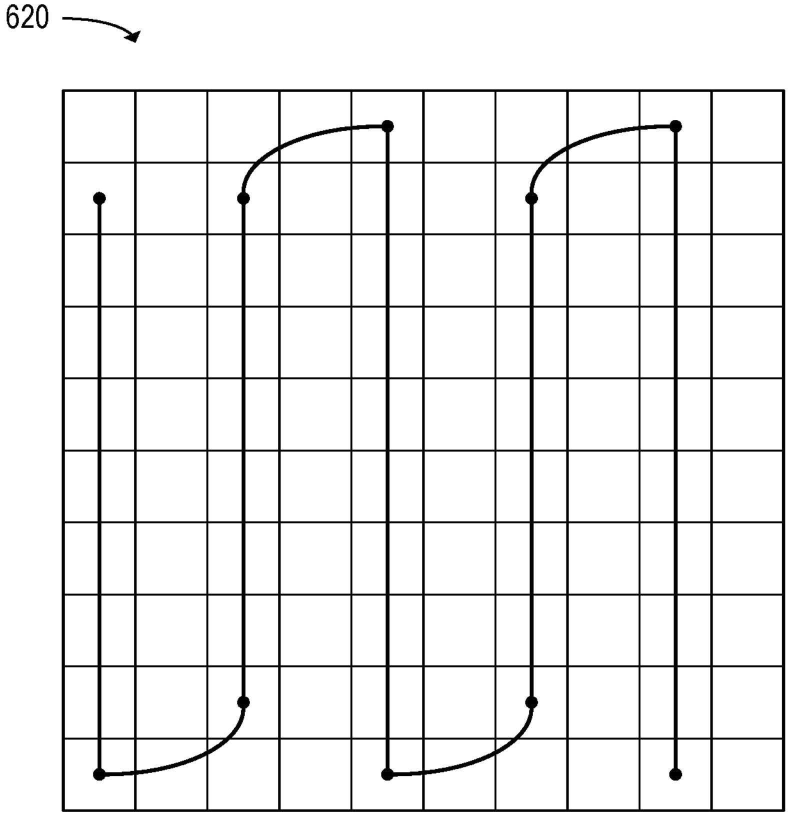
FIG. 28A shows an example cat state construction that follows a snake line pattern on a rectangular grid of logical qubits, according to the example of FIG. 1.
Figure 28B:
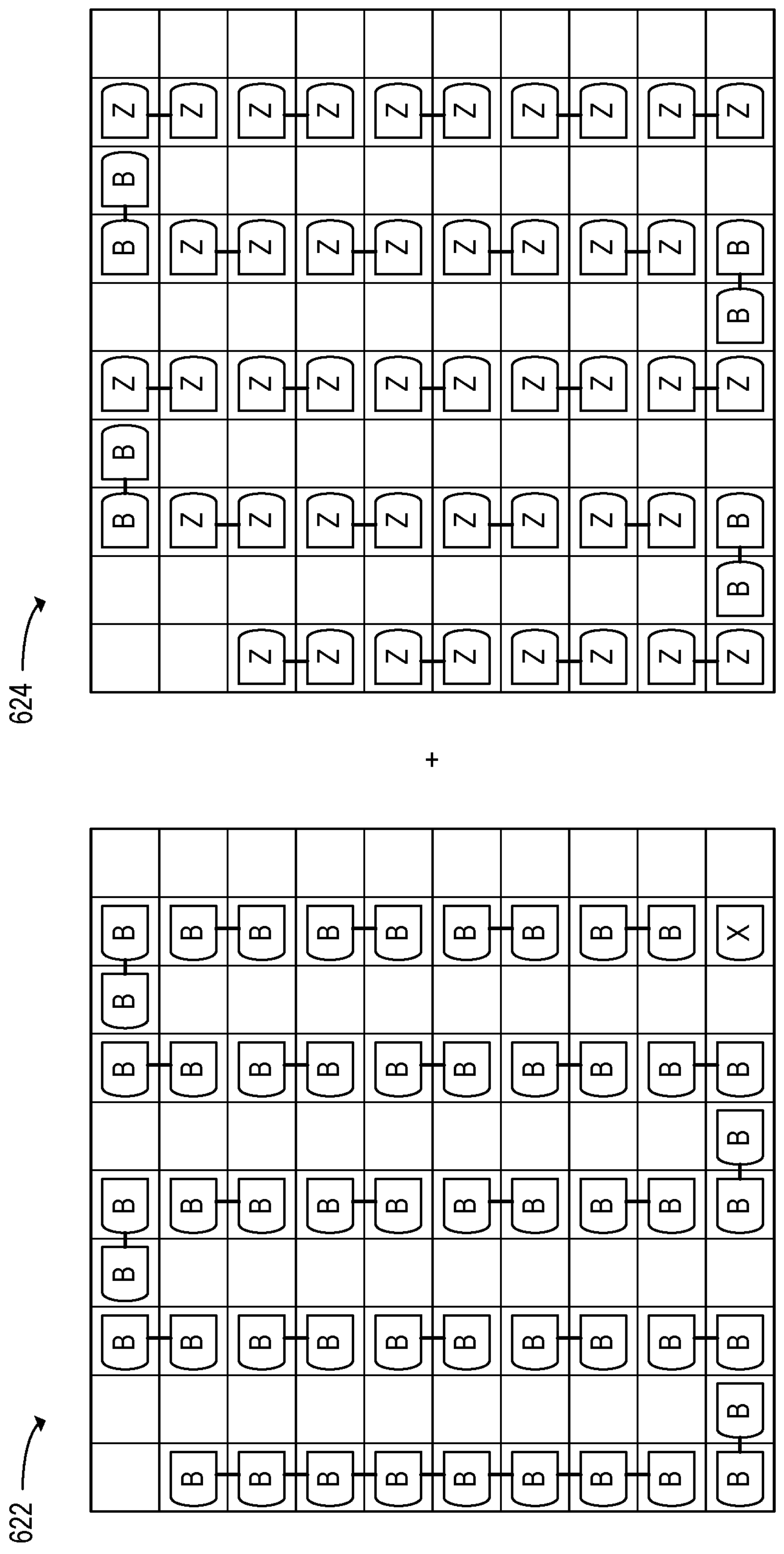
FIG. 28B shows an example Bell state preparation layer and an example joint ZZ measurement layer that may be performed sequentially to perform the cat state construction of FIG. 28A.

FIG. 28A shows an example cat state construction 620 on a rectangular grid of logical qubits. The cat state construction 620 of FIG. 28A follows a snake line pattern. In addition, FIG. 28B shows a Bell state preparation layer 622 and a joint ZZ measurement layer 624 that may be performed sequentially to perform the cat state construction 620 of FIG. 28A, according to one example. As shown in FIG. 28B, the Bell state preparation layer includes a plurality of joint Bell state preparations performed on the qubits included in the snake line pattern. The Bell state preparation layer 622 further includes an X state preparation at an endpoint of the snake line pattern. The joint ZZ measurement layer 624 includes a plurality of joint ZZ measurements arranged in vertical rows. The joint ZZ measurements are performed on pairs of qubits that are included in the snake line pattern but are not connected by the joint Bell state preparations performed in the Bell state preparation layer. The joint ZZ measurement layer 624 also includes joint Bell state measurements at turning points of the snake line pattern that cross horizontal gaps between the vertical rows of joint ZZ measurements.

A quantum fanout operation is discussed below. The quantum fanout operation maps $$(\alpha|0\rangle+\beta|1\rangle)\otimes|0^{n-1}\rangle\mapsto\alpha|0^n\rangle+\beta|1^n\rangle$$

The above mapping may be implemented with a constant temporal depth. Implementing the above mapping may include preparing a z-cat state on the latter n−1 qubits, thereby resulting in the following state:

$$\frac{\alpha}{\sqrt{2}}|0^n\rangle+\frac{\beta}{\sqrt{2}}|1^n\rangle+\frac{\alpha}{\sqrt{2}}|01^{n-1}\rangle+\frac{\beta}{\sqrt{2}}|10^{n-1}\rangle$$

A joint ZZ measurement may be applied to the first two qubits of the above state. When the measurement result corresponds to the +1 eigenvalue, the measurement result is the output of the quantum fanout operation. When the measurement result corresponds to a different eigenvalue, an X correction on the last n−1 qubits may be performed to compute the output of the quantum fanout operation. The joint ZZ measurement included in the quantum fanout operation may be performed in parallel with the join ZZ measurements performed when preparing the z-cat state.

Figure 29:
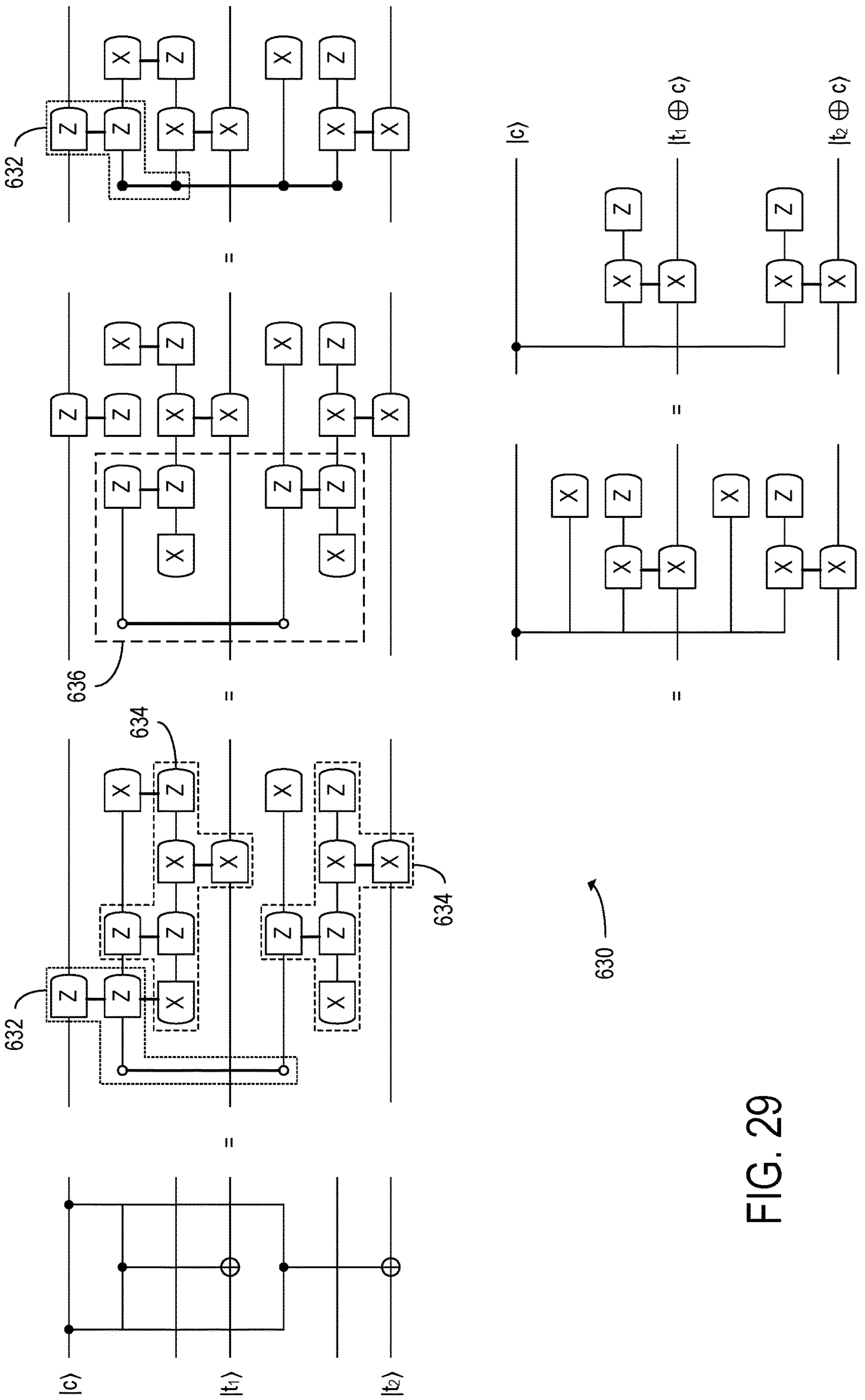
FIG. 29 shows an example multi-target CNOT circuit, according to the example of FIG. 1.

FIG. 29 shows an example multi-target CNOT circuit 630. In some examples, the multi-target CNOT circuit 630 may be used instead of the multi-target CNOT circuit 170 in the encoding surface layout 200 with which the controlled table lookup circuit 300 is configured to be implemented. FIG. 29 depicts the steps by which the multi-target CNOT circuit 630 is derived. The representation of the multi-target CNOT circuit 630 on the lefthand side of FIG. 29 may be implemented with a quantum fanout operation 632 and two CNOT gates 634, with a respective X measurement following each of the CNOT gates 634. The first joint ZZ measurement in the multi-target CNOT circuit 630 may be moved past the joint ZZ measurement included in the upper CNOT gate 634. The two-qubit z-cat state may also be extended into a four-qubit z-cat state 636. The four-qubit z-cat state 636, combined with the joint ZZ measurement on the top two qubits, forms a quantum fanout operation. Since two of the four target qubits of the quantum fanout operation are subsequently removed by the X measurements, the corresponding qubits may be removed from the multi-target CNOT circuit 630 altogether. Thus, the multi-target CNOT circuit 630 may be constructed as shown in the lower righthand portion of FIG. 29.

Figure 30:
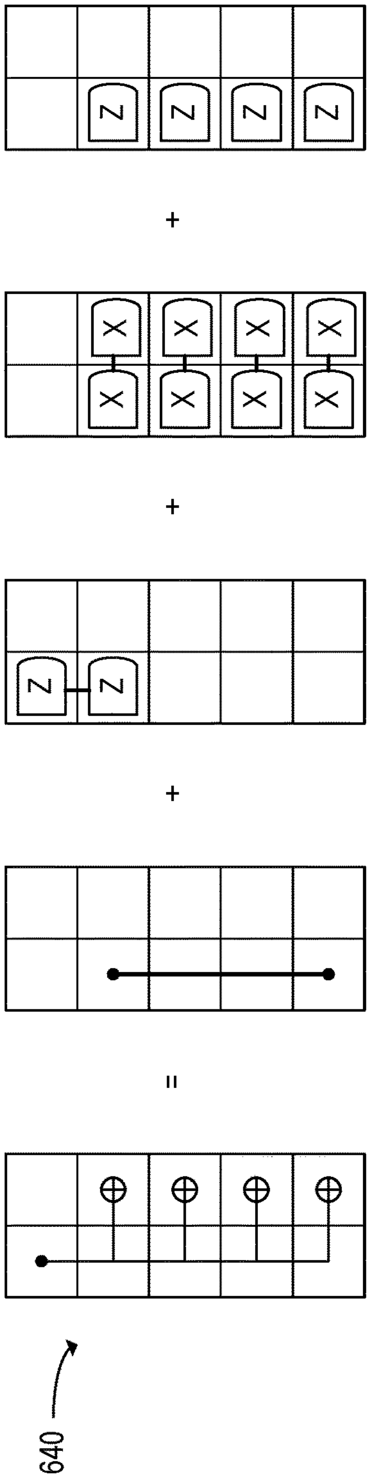
FIG. 30 shows an example multi-target CNOT grid layout of the multi-target CNOT circuit of FIG. 29.

FIG. 30 shows an example multi-target CNOT grid layout 640 of the multi-target CNOT circuit 630 of FIG. 29. The multi-target CNOT grid layout 640 in the example of FIG. 30 is constructed by preparing a vertical z-cat state, performing a joint ZZ measurement on an endpoint qubit of the vertical z-cat state, performing a plurality of joint XX measurements on the qubits included in the vertical z-cat state, and performing a plurality of Z measurements on the qubits included in the vertical z-cat state. In the example of FIG. 30, the cat state preparation and the joint ZZ measurement may be performed in parallel, resulting in the control qubit in the upper lefthand corner of the grid being fanned out to each of the qubits in the lefthand column prior to the joint XX measurements and the Z measurements.

Figure 31:
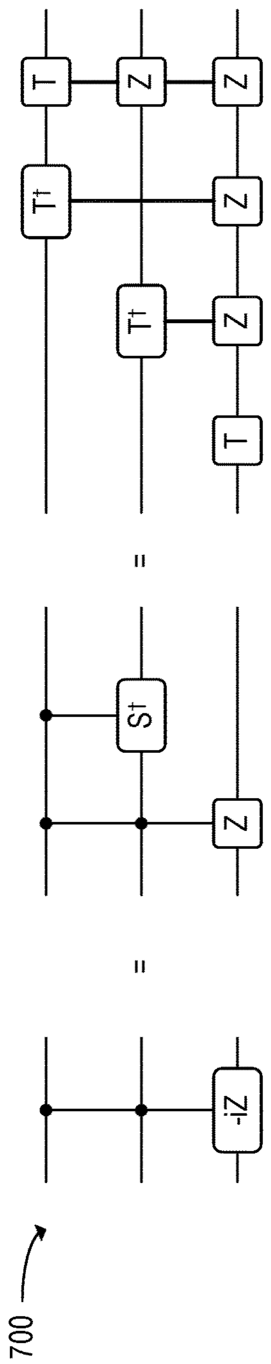
FIG. 31 shows an example decomposition of a doubly controlled −iZ gates into exponential gates, according to the example of FIG. 1.

The construction of the CCiX circuit 180 of FIG. 11 is discussed below. As a preliminary step of the derivation of the structure of the CCiX circuit 180, a doubly controlled −iZ gate may be decomposed into four exponentials of multi-qubit Pauli operators. A decomposition of an example doubly controlled −iZ gate 700 is shown in FIG. 31. The four exponential gates on the righthand side of the doubly controlled −iZ gate circuit 700 of FIG. 31 are the 8×8 unitary matrices $$e^{i\frac{\pi}{8}(I\otimes I\otimes Z)},\ e^{-i\frac{\pi}{8}(I\otimes Z\otimes Z)},\ e^{-i\frac{\pi}{8}(Z\otimes I\otimes Z)},\ \text{and}\ e^{i\frac{\pi}{8}(Z\otimes Z\otimes Z)}.$$

The $$e^{i\frac{\pi}{8}(I\otimes I\otimes Z)}$$

gate, the $$e^{-i\frac{\pi}{8}(I\otimes Z\otimes Z)}$$

gate, the $$e^{-i\frac{\pi}{8}(Z\otimes I\otimes Z)}$$

gate, and the $$e^{i\frac{\pi}{8}(Z\otimes Z\otimes Z)}$$

gate commute with each other. As discussed in further detail below, the exponential gates may be applied in parallel to the plurality of input qubit states of the CCiX circuit 180 when performing the CCiX operation.

Figure 32:
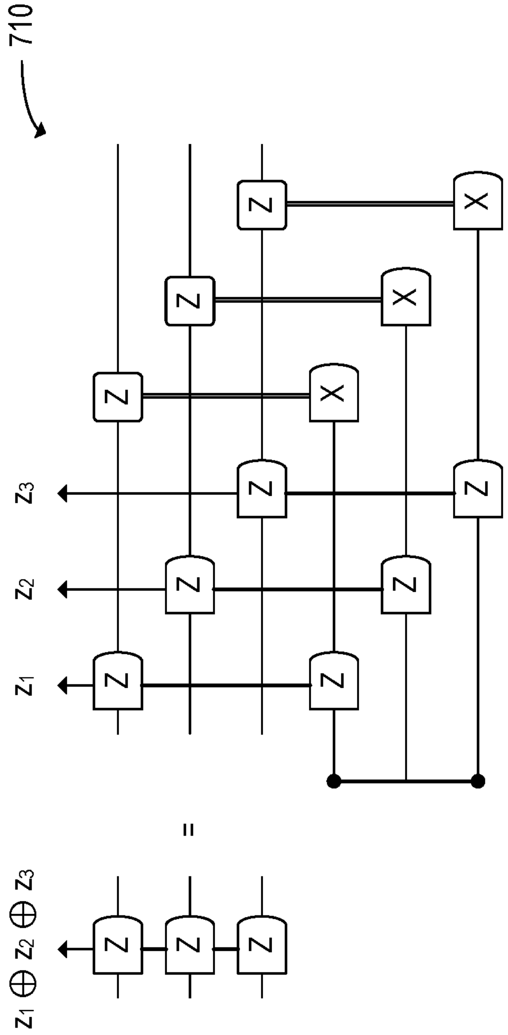
FIG. 32 shows an example multi-qubit joint ZZ measurement circuit, according to the example of FIG. 1.

FIG. 32 shows an example multi-qubit joint ZZ measurement circuit 710. The multi-qubit joint ZZ measurement circuit 710 shown in FIG. 32 may be implemented using an x-cat state and a plurality of joint ZZ measurements. The joint ZZ measurements are remote joint ZZ measurements across four qubits in the example of FIG. 32. In addition, the multi-qubit joint ZZ measurement circuit 710 of FIG. 32 includes a plurality of X measurements and a plurality of Z corrections.

Figure 33:
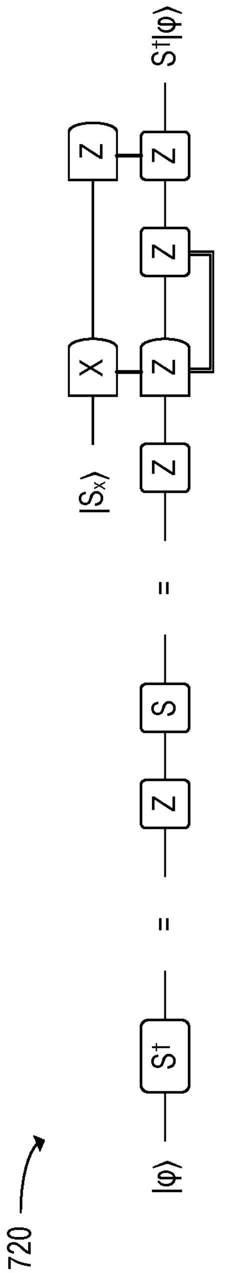
FIG. 33 shows an example $S^\dagger$ gate circuit, according to the example of FIG. 1.

FIG. 33 shows an example $S^\dagger$ gate circuit 720. As shown in the example of FIG. 33, the $S^\dagger$ gate circuit 720 may be implemented by conjugating the first $|S\rangle$-state injection circuit 150 with Hadamard gates and prepending a Z gate. The $S^\dagger$ gate circuit 720 includes a joint XZ measurement.

Figure 34:
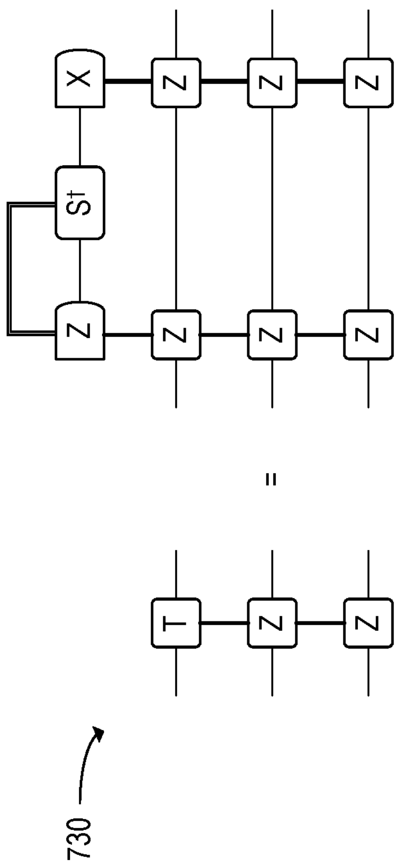
FIG. 34 shows an example exponential operator circuit that may be implemented using the multi-qubit joint ZZ measurement circuit of FIG. 32 and the $S^\dagger$ gate circuit of FIG. 33.

FIG. 34 shows an example exponential operator circuit 730 that may be implemented using the multi-qubit joint ZZ measurement circuit 710 of FIG. 32 and the $S^\dagger$ gate circuit 720 of FIG. 33 to perform the $$e^{i\frac{\pi}{8}(Z\otimes Z\otimes Z)}$$

operation. In the exponential operator circuit 730 of FIG. 34, the $S^\dagger$ gate is configured to be conditionally applied when the result of the multi-qubit joint ZZ measurement is 0.

The plurality of exponential operators included in the −iZ gate circuit 700 may be parallelized. When the exponential operators are parallelized, quantum fanouts may be performed to generate four z-cat state copies of the target qubit and two z-cat state copies for each control qubit. In this example, the z-cat state copies of the target qubit include two z-cat state copies over three qubits and two z-cat state copies over five qubits. The z-cat state copies generated for each of the control qubits include a respective z-cat state copy over three qubits and a respective z-cat state copy over five qubits for each control qubit. The z-cat state copies are used to apply the exponential operators and to connect the target qubit and the control qubits via joint ZZ measurement.

Figure 35:
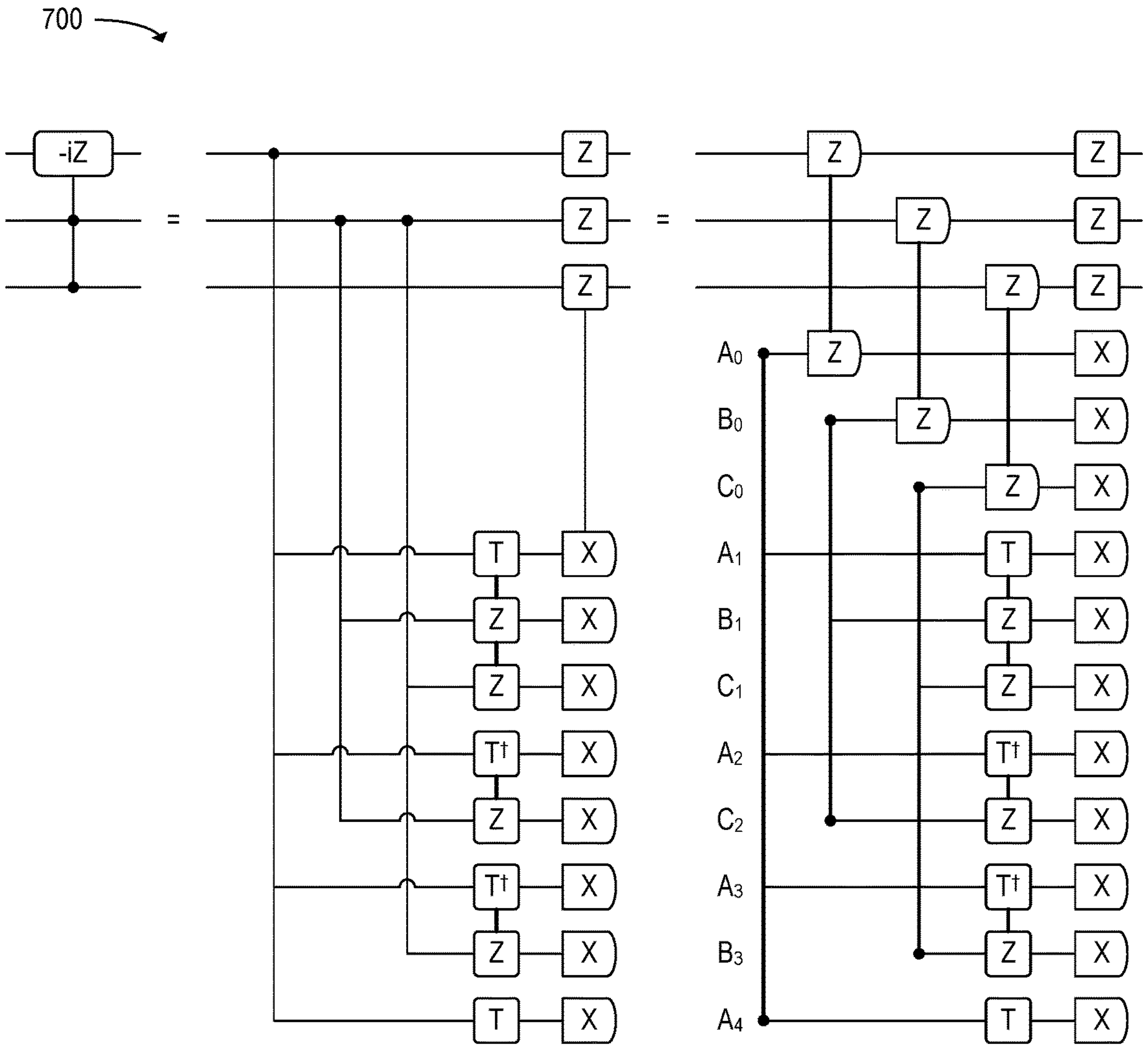
FIG. 35 shows an example of the doubly controlled −iZ gate circuit of FIG. 31 after copies of $|GHZ_n\rangle_X$ states have been generated.

FIG. 35 shows the doubly controlled −iZ gate circuit 700 when the z-cat state copies have been generated, according to one example. In the example of FIG. 35, the target qubit has five auxiliary qubits $A_0$, $A_1$, $A_2$, $A_3$, and $A_4$. A first control qubit has three auxiliary qubits $B_0$, $B_1$, and $B_3$, and a second control qubit has three auxiliary qubits $C_0$, $C_1$, and $C_2$. The indices of $A_i$, $B_i$, and $C_i$ indicate respective z-cat state copies that include the auxiliary qubits. Rather than applying Z corrections to the auxiliary qubits, as depicted in FIG. 34, the Z corrections in the example doubly controlled −iZ gate circuit 700 of FIG. 35 are conditionally applied based on the outcomes of the X measurements performed on the auxiliary qubits. The Z correction on the target qubit is applied when an odd number of X measurement results are equal to 1.

The doubly-controlled −iZ gate circuit 700 may be transformed into a doubly-controlled −iX gate circuit by conjugating the target line with a Hadamard gate. Conjugating the target line with a Hadamard gate may transform the joint ZZ measurement and Z correction into a joint XZ measurement and an X correction, respectively. The joint measurements and Pauli corrections shown in FIG. 35 correspond to the joint measurements and Pauli corrections shown in FIG. 11.

Figure 36:
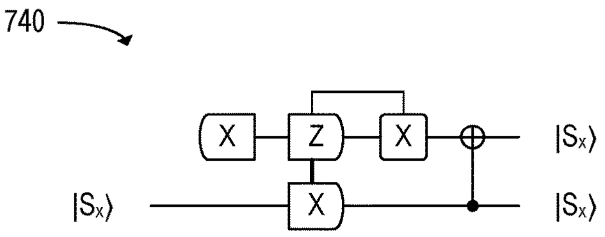
FIG. 36 shows an example magic state cloning circuit that may be used to clone an $|S_x\rangle$ state, according to the example of FIG. 1.

Returning to FIG. 34, the conditional $S^\dagger$ gate included in the exponential operator circuit 730 may be implemented using an $|S_x\rangle$ magic state, where $|S_x\rangle = HS|+\rangle$. FIG. 36 shows an example magic state cloning circuit 740 that may be used to clone an $|S_x\rangle$ state during the preparation stage 182 of the CCiX circuit 180. Using the magic state cloning circuit 740 to generate copies of the $|S_x\rangle$ state may reduce the number of magic states the CCiX circuit 180 receives from separate magic state preparation protocols, thereby increasing the efficiency with which quantum computations utilizing the CCiX circuit 180 may be performed.

Figure 37C:
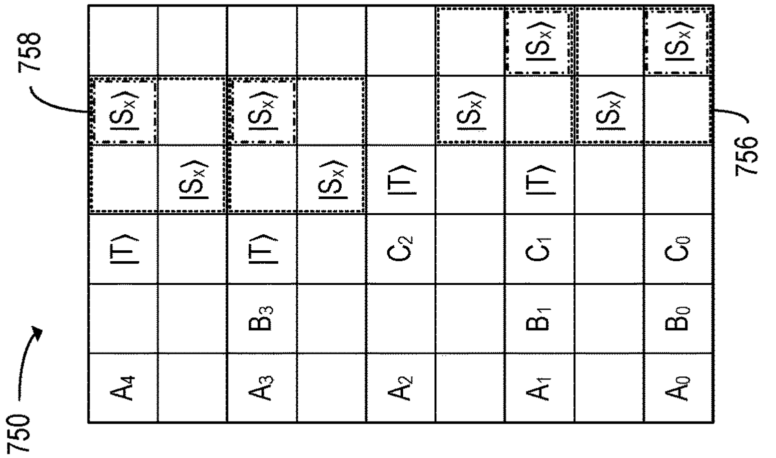
FIGS. 37A-37C show an example surface code layout of the qubits included in the CCiX circuit of FIG. 11 during a preparation stage.
Figure 37B:
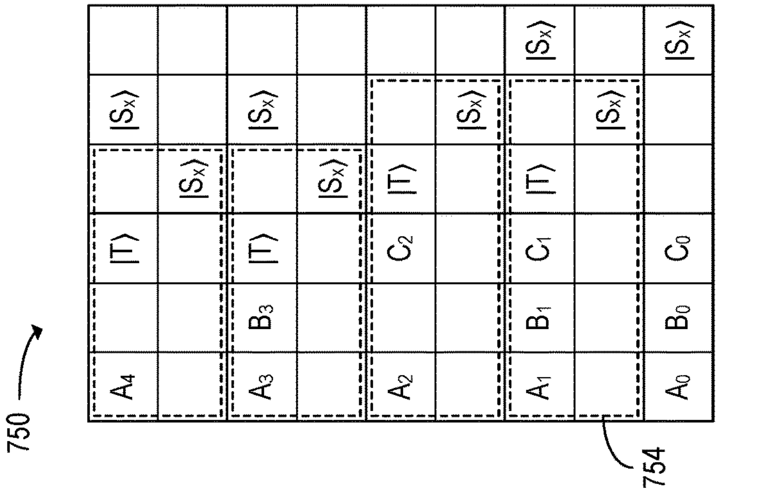
Figure 37A:
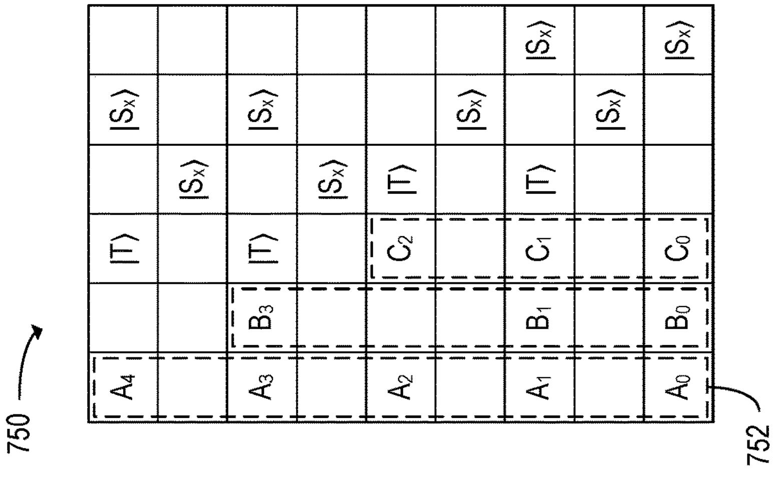

FIGS. 37A-37C show an example surface code layout 750 of the qubits included in the CCiX circuit 180 during the preparation stage 182. The view of the surface code layout 750 shown in FIG. 37A shows a plurality of z-cat state preparation regions 752 in which the CCiX circuit 180 is configured to prepare z-cat states. The view of the surface code layout 750 shown in FIG. 37B shows a plurality of x-cat state preparation regions 754 in which the CCiX circuit 180 is configured to prepare x-cat states. The view of the surface code layout 750 shown in FIG. 37C shows a plurality of magic state cloning regions 756 in which respective $|S_x\rangle$ states are configured to be cloned. In FIG. 37C, the magic states that are used as inputs to the magic state cloning circuit 740 are shown in a plurality of cloning circuit input regions 758. In addition, the $|T\rangle$ states depicted in FIGS. 37A-37C are configured to be prepared during the preparation stage 182.

Figure 38B:
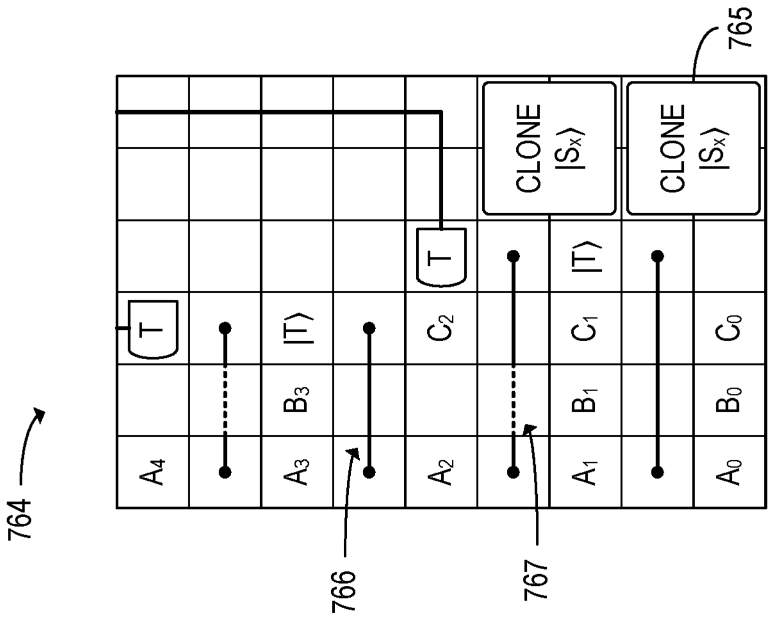
FIGS. 38A-38B respectively show an example first preparation sub-stage and a second preparation sub-stage of the preparation stage performed at the CCiX circuit, according to the example of FIGS. 37A-37C.
Figure 38A:
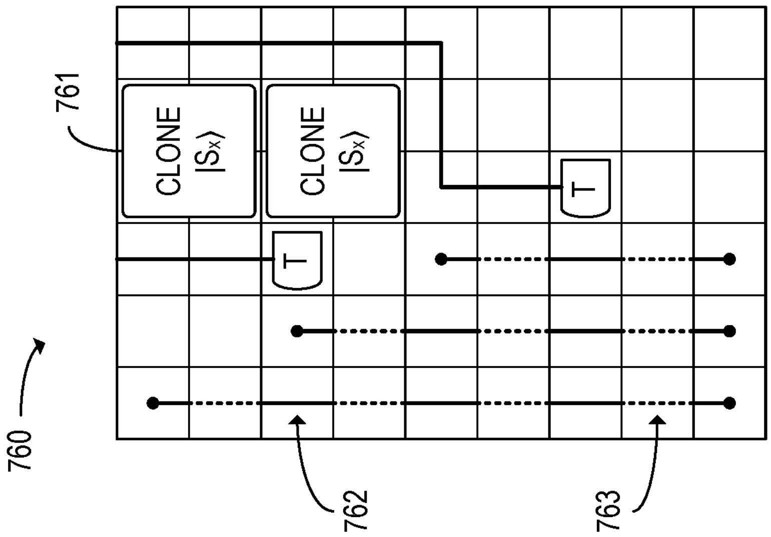

FIG. 38A shows a first preparation sub-stage 760 of the preparation stage 182 performed at the CCiX circuit 180. In the first preparation sub-stage 760, quantum fanout operations are performed on the qubits included in the z-cat state preparation regions 752 shown in FIG. 37A. In addition, two of the $|T\rangle$ states are prepared, and $|S_x\rangle$ states are cloned within two upper magic state cloning regions 761. Thus, in the first preparation sub-stage 760, the CCiX circuit is configured to prepare a first $|S_x\rangle$ state, a second $|S_x\rangle$ state, a first $|T\rangle$ state, and a second $|T\rangle$ state in parallel. FIG. 38A further shows a plurality of z-cat state paths 762 along which the z-cat states are constructed. The dotted portions of the lines that show the z-cat state paths 762 indicate holes 763 in the z-cat states. The qubits located along the delivery paths of the $|T\rangle$ states are each configured to be in a blank state.

FIG. 38B shows a second preparation sub-stage 764 of the preparation stage 182 performed at the CCiX circuit 180. During the second preparation sub-stage 764, quantum fanout operations are performed on the qubits included in the x-cat state preparation regions 754. FIG. 38B shows a plurality of x-cat state paths 766 along which the x-cat states are constructed. The plurality of x-cat state paths 766 includes two x-cat state paths 766 that have respective holes 767 and two x-cat state paths 766 without holes. In addition, $|S_x\rangle$ states are cloned within two lower magic state cloning regions 765. The other two $|T\rangle$ states used by the CCiX circuit 180 are also prepared. The CCiX circuit 180 may accordingly be configured to prepare a third $|S_x\rangle$ a fourth $|S_x\rangle$ state, a third $|T\rangle$ state, and a fourth $|T\rangle$ state in parallel during the second preparation sub-stage 764. Thus, the CCiX circuit 180 may be configured to prepare each of the cat states and magic states used in the execution stage 184 during the first preparation sub-stage 760 and the second preparation sub-stage 764 of the preparation stage 182.

Figure 39B:
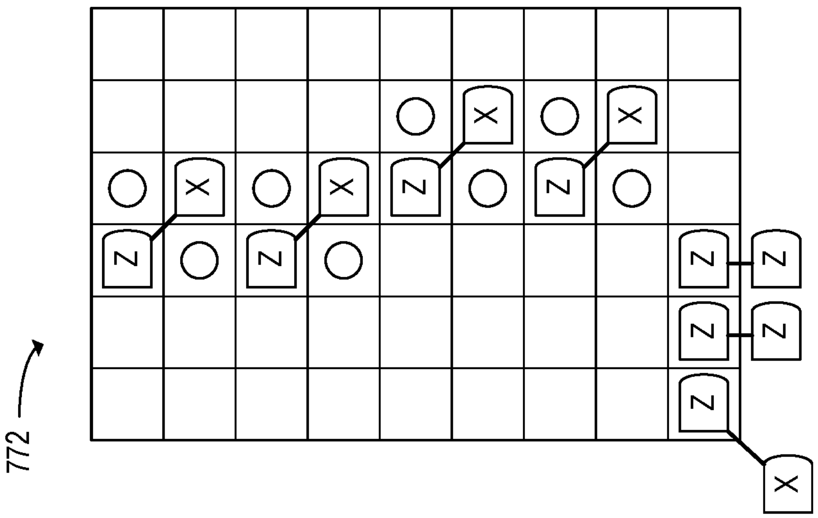
FIGS. 39A-39B respectively show an example first execution sub-stage and a second execution sub-stage of the execution stage performed at the CCiX circuit, according to the example of FIGS. 38A-38C.
Figure 39A:
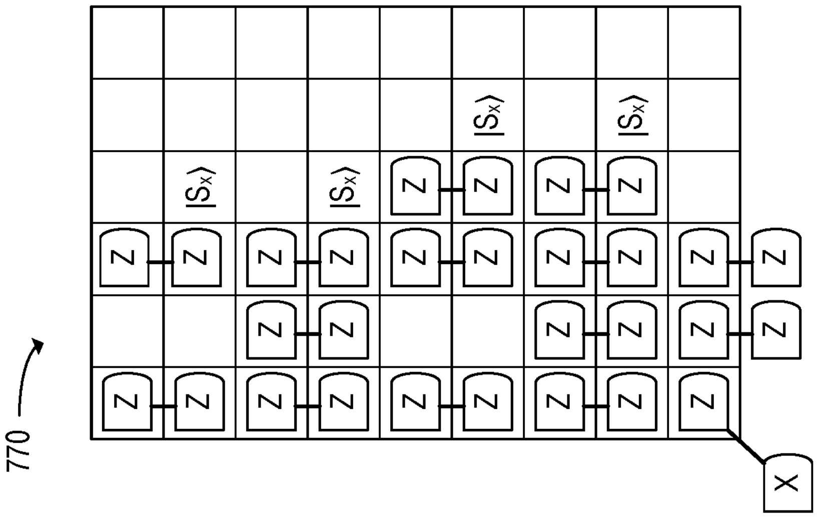

FIG. 39A shows a first execution sub-stage 770 of the execution stage 184 performed at the CCiX circuit 180. In the first execution sub-stage 770, a plurality of joint ZZ measurements are performed. The CCiX circuit 180 is configured to perform the plurality of local joint ZZ measurements of respective first subsets of the magic states and the auxiliary qubits. In addition, two remote joint ZZ measurements are performed on respective pairs of qubits in which one qubit of the pair is inside the CCiX circuit 180 and the other qubit of the pair is outside the CCiX circuit 180. A remote joint XZ measurement is also performed between a qubit inside the CCiX circuit 180 and a qubit outside the CCiX circuit 180. The measurements performed between qubits inside the CCiX circuit 180 and qubits outside the CCiX circuit 180 are remote measurements between the interface qubits $A_0$, $B_0$, and $C_0$ and the target qubit and control qubits, respectively.

FIG. 39B shows a second execution sub-stage 772 of the execution stage 184 performed at the CCiX circuit 180. During the second execution sub-stage 772, the CCiX circuit 180 is configured to perform a plurality of joint XZ measurements of respective second subsets of the magic states and the auxiliary qubits. As shown in the example of FIG. 39B, these joint XZ measurements are local joint XZ measurements performed on respective qubit pairs that each include a respective $|S_x\rangle$ state and a respective $|T\rangle$ state. In each of these pairs, the $|T\rangle$ state is located to the upper left of the $|S_x\rangle$ state. In addition, similarly to the first execution sub-stage 770, the second execution sub-stage 772 includes two joint ZZ measurements and a joint XZ measurement between respective qubits inside and outside the CCiX circuit 180. The two joint ZZ measurements and the joint XZ measurement are remote measurements that connect $A_0$, $B_0$, and $C_0$ to the target qubit and the control qubits.

Returning to FIG. 11, the CCiX circuit 180 may be further configured to perform a plurality of X corrections and a plurality of Z corrections on the control qubits $|c_1\rangle$ and $|c_2\rangle$ and the target qubit $|t\rangle$ subsequently to the execution stage 184. In the example of FIG. 11, a Z correction is performed on a first control qubit $|c_1\rangle$, a Z correction and an X correction are performed on the second control qubit $|c_2\rangle$, and an X correction is performed on the target qubit $|t\rangle$. The X and Z corrections may correct for rotations by factors of Pauli matrices in the states of the first control qubit $|c_1\rangle$, the second control qubit $|c_2\rangle$, and the target qubit $|t\rangle$ output during the execution stage 184 the CCiX circuit 180.

Figure 40A:
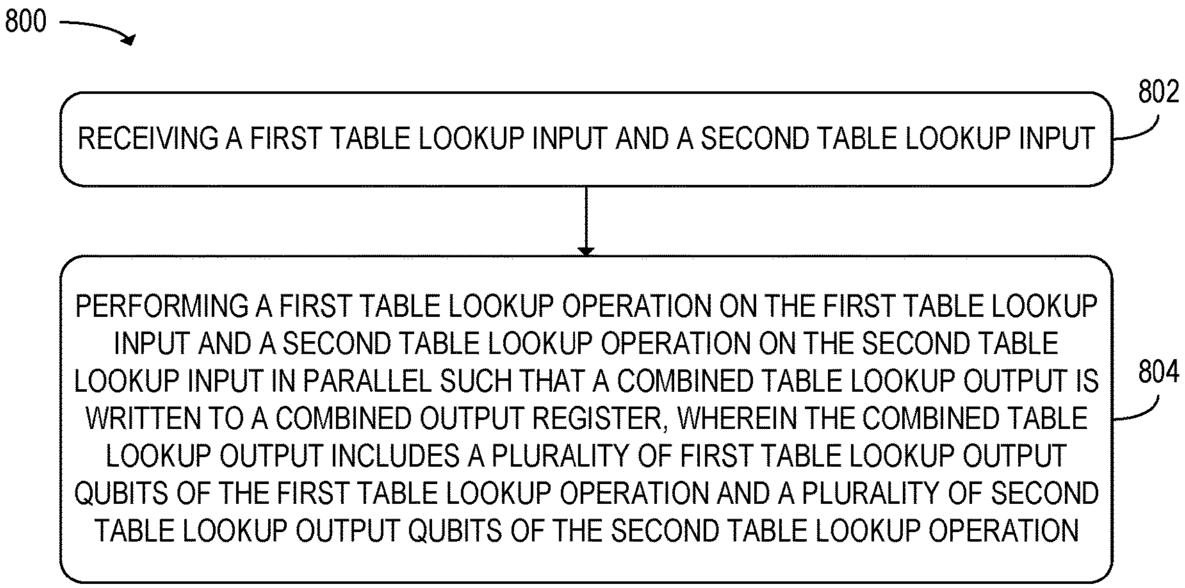
FIG. 40A shows a flowchart of an example method for use with a quantum computing device to perform a combined table lookup operation, according to the example of FIG. 1.

FIG. 40A shows a flowchart of an example method 800 for use with a quantum computing device to perform a combined table lookup operation. The steps of the method 800 may be performed at a table lookup circuit included in the quantum computing device. For example, the table lookup circuit may be included in a rectangular grid of logical qubits located on a logical qubit encoding surface. In this example, the rectangular grid may include a plurality of qubit patches that each include a data qubit and three auxiliary qubits arranged in a square. The rectangular grid may additionally or alternatively include one or more regions with one or more other layouts of logical qubits and auxiliary qubits.

At step 802, the method 800 may include receiving a first table lookup input and a second table lookup input. The first table lookup input and the second table lookup input may each be input qubit states. In some examples, the first table lookup input and the second table lookup input may be included among three or more table lookup inputs.

At step 804, the method 800 may further include performing a first table lookup operation on the first table lookup input and a second table lookup operation on the second table lookup input in parallel. The first table lookup operation and the second table lookup operation may be performed such that a combined table lookup output is written to a combined output register. The combined table lookup output may include a plurality of first table lookup output qubits of the first table lookup operation and a plurality of second table lookup output qubits of the second table lookup operation. In examples in which the table lookup circuit is configured to receive three or more table lookup inputs, the combined table lookup output may include a respective plurality of table lookup output qubits associated with each of the three or more table lookup inputs. The table lookup circuit may be configured to map $k \geq 2$ input qubits to $m \geq 2$ output qubits.

In some examples, the plurality of first table lookup output qubits may be logically interleaved with the plurality of second table lookup output qubits within the combined output register. The first table lookup output qubits may be logically interleaved with the plurality of second table lookup output qubits at least in part by alternating between a respective plurality of first output qubit writing timesteps and a respective plurality of second output qubit writing timesteps. In the first output qubit writing timesteps, the plurality of first table lookup output qubits are written to the combined output register, and in the second output qubit writing timesteps, the plurality of second table lookup output qubits may be written to the combined output register. The table lookup circuit may, for example, be configured to alternate between first table lookup output qubits and second table lookup output qubits. Additionally or alternatively, such as in examples in which the first table lookup output and the second table lookup output have different lengths, the table lookup circuit may be configured to write one or more blocks of first table lookup output qubits and/or second table lookup output qubits to the combined output register.

Figure 40B:
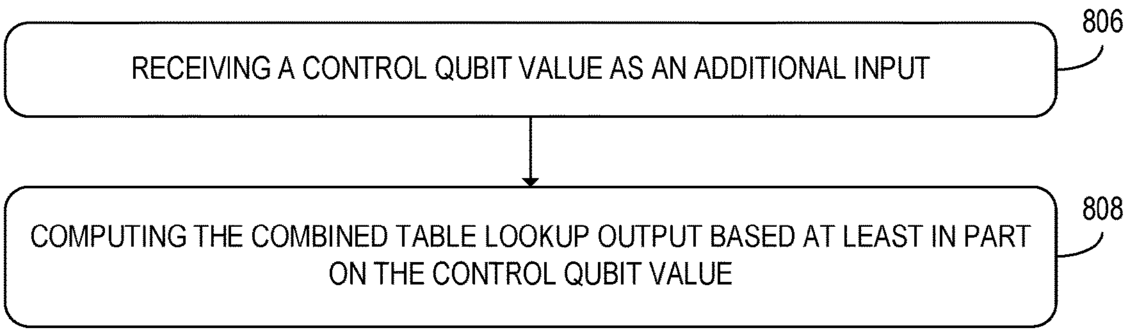
FIG. 40B shows additional steps of the method of FIG. 40A that may be performed in examples in which the method of FIG. 40A is performed at a combined table lookup circuit.

In some examples, the table lookup circuit may be a controlled table lookup circuit. Additional steps that may be performed in such examples are shown in FIG. 40B. At step 806, the method 800 may further include receiving a control qubit state as an additional input. The control qubit state may be received when the first lookup table input and the second lookup table input are received.

At step 808, the method 800 may further include computing the combined table lookup output based at least in part on the control qubit state. The table lookup circuit may, for example, be configured to leave the combined output register unchanged when the control qubit state is set to $|0\rangle$ and to write the table lookup output qubits to the combined output register when the control qubit state is set to $|1\rangle$. Thus, the table lookup circuit may be configured to implement an if-then-else statement.

In examples in which the table lookup circuit is a controlled table lookup circuit, the table lookup circuit may include a plurality of CXOR gates configured to receive the control qubit state. The plurality of first table lookup output qubits and the plurality of second table lookup output qubits may be written to the combined output register via outputs of the plurality of CXOR gates. In some examples, the plurality of CXOR gates may be located in a multi-target CNOT circuit included in the table lookup circuit.

Figure 41A:
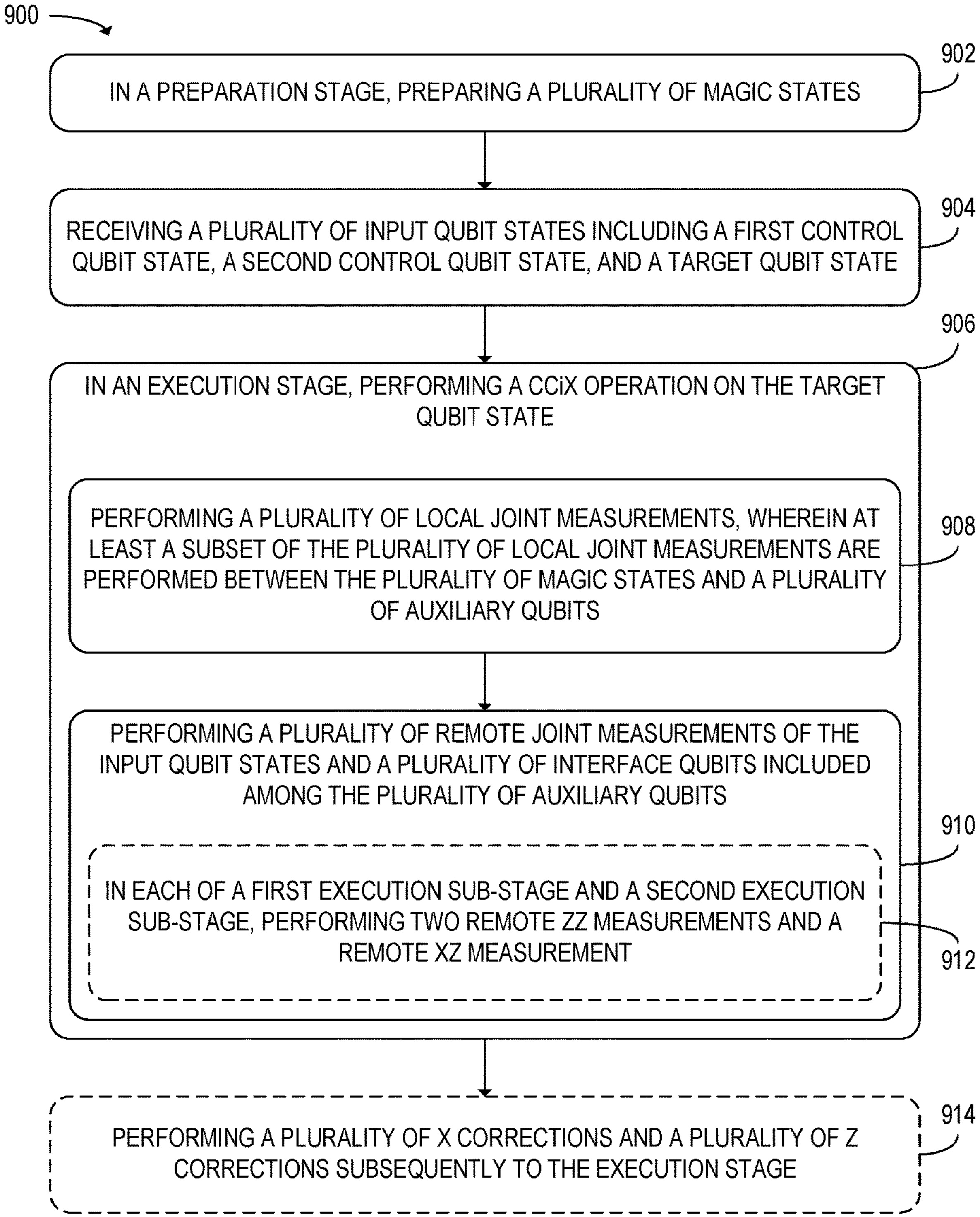
FIG. 41A shows a flowchart of another method for use with a quantum computing device to perform a CCiX operation, according to the example of FIG. 1.

FIG. 41A shows a flowchart of another method 900 for use with a quantum computing device to perform a CCiX operation. The method 900 of FIG. 41A may be performed at a CCiX circuit, which may be included in a rectangular grid of logical qubits located on a logical qubit encoding surface. In some examples, the CCiX circuit may be included in the table lookup circuit discussed above.

At step 902, the method 900 may include, in a preparation stage, preparing a plurality of magic states. The plurality of magic states prepared in the preparation stage may, for example, include a plurality of $|S_x\rangle$ states and a plurality of $|T\rangle$ states.

At step 904, the method 900 may further include receiving a plurality of input qubit states including a first control qubit state, a second control qubit state, and a target qubit state. At step 906, in an execution stage, the method may further include performing a CCiX operation on the target qubit state. When performing the CCiX operation, the CCiX circuit may be configured to modify the target qubit state in a manner conditioned by the first control qubit state and the second control qubit state.

During the execution stage of step 906, the CCiX operation may be performed at least in part by, at step 908, performing a plurality of local joint measurements. At least a subset of the plurality of local joint measurements are performed between the plurality of magic states and a plurality of auxiliary qubits. In some examples, one or more local joint measurements may also be performed between pairs of auxiliary qubits. At step 910, performing the CCiX operation at step 906 may further include performing a plurality of remote joint measurements. The plurality of remote joint measurements may be performed on the input qubit states and a plurality of interface qubits included among the plurality of auxiliary qubits. The plurality of interface qubits may be qubits located on an edge of the CCiX circuit on the logical qubit encoding surface. In some examples, performing step 910 may include, at step 912, performing two remote ZZ measurements and a remote XZ measurement in each of a first execution sub-stage and a second execution sub-stage included in the execution stage.

At step 914, the method 900 may further include, in some examples, performing a plurality of X corrections and a plurality of Z corrections subsequently to the execution stage. In such examples, a Z correction may be performed on the first control qubit, a Z correction and an X correction may be performed on the second control qubit, and an X correction may be performed on the target qubit. The plurality of X corrections and the plurality of Z corrections may be performed to correct for Pauli-matrix rotations in the results of the remote joint ZZ measurements and remote joint XZ measurements performed during the execution stage.

Figure 41B:
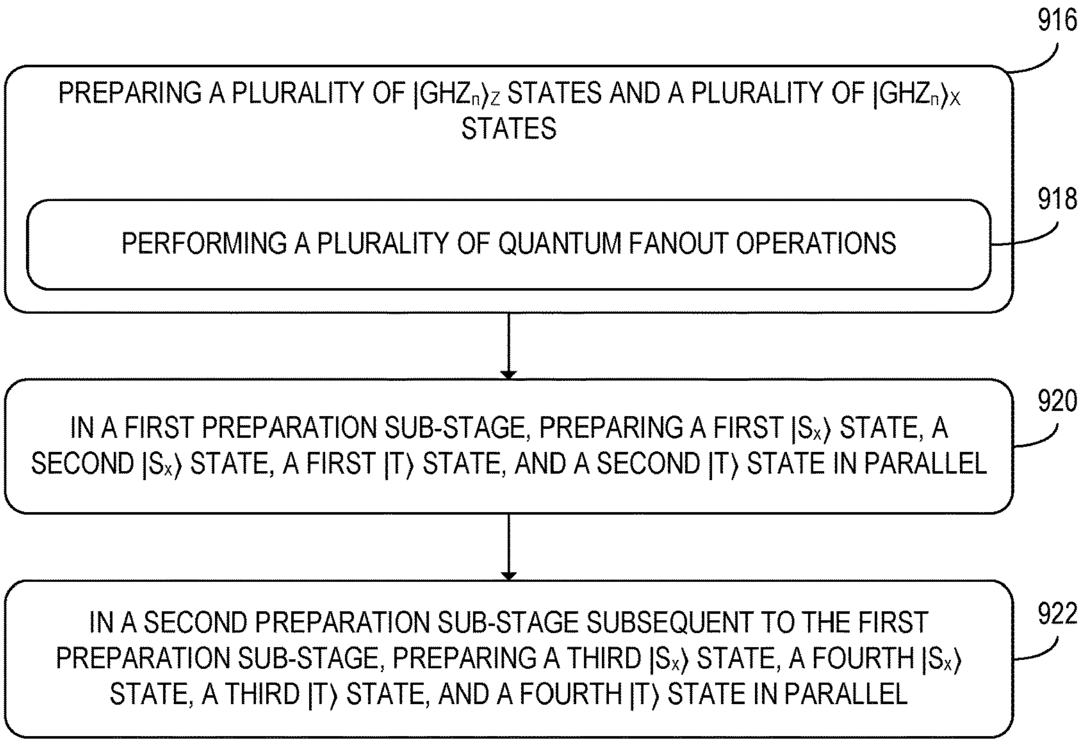
FIG. 41B shows additional steps of the method of FIG. 41A that may be performed at a preparation stage.

FIG. 41B shows additional steps of the method 900 that may be performed during step 902 at the preparation stage. At step 916, the method 900 may further include preparing a plurality of $|GHZ_n\rangle_Z$ states and a plurality of $|GHZ_n\rangle_X$ states. In some examples, at step 918, step 916 may include performing a plurality of quantum fanout operations. The quantum fanout operations may be performed to copy the $|GHZ_n\rangle_Z$ states and the $|GHZ_n\rangle_X$ states across the plurality of auxiliary qubits.

The method 900 may further include step 920 and step 922 in examples in which the plurality of magic states prepared in the preparation stage includes a plurality of $|S_x\rangle$ states and a plurality of $|T\rangle$ states. In such examples, at step 920, the method 900 may further include performing a first preparation sub-stage. In the first preparation sub-stage, a first $|S_x\rangle$ state, a second $|S_x\rangle$ state, a first $|T\rangle$ state, and a second $|T\rangle$ state may be prepared in parallel. At step 922, the method 900 may further include performing a second preparation sub-stage subsequently to the first preparation sub-stage. In the second preparation sub-stage, a third $|S_x\rangle$, a fourth $|S_x\rangle$ state, a third $|T\rangle$ state, and a fourth $|T\rangle$ state may be prepared in parallel. In examples in which step 916 is also performed, the $|GHZ_n\rangle_Z$ states and the $|GHZ_n\rangle_X$ states may be prepared in parallel with the $|S_x\rangle$ and $|T\rangle$ magic states.

Figure 41C:
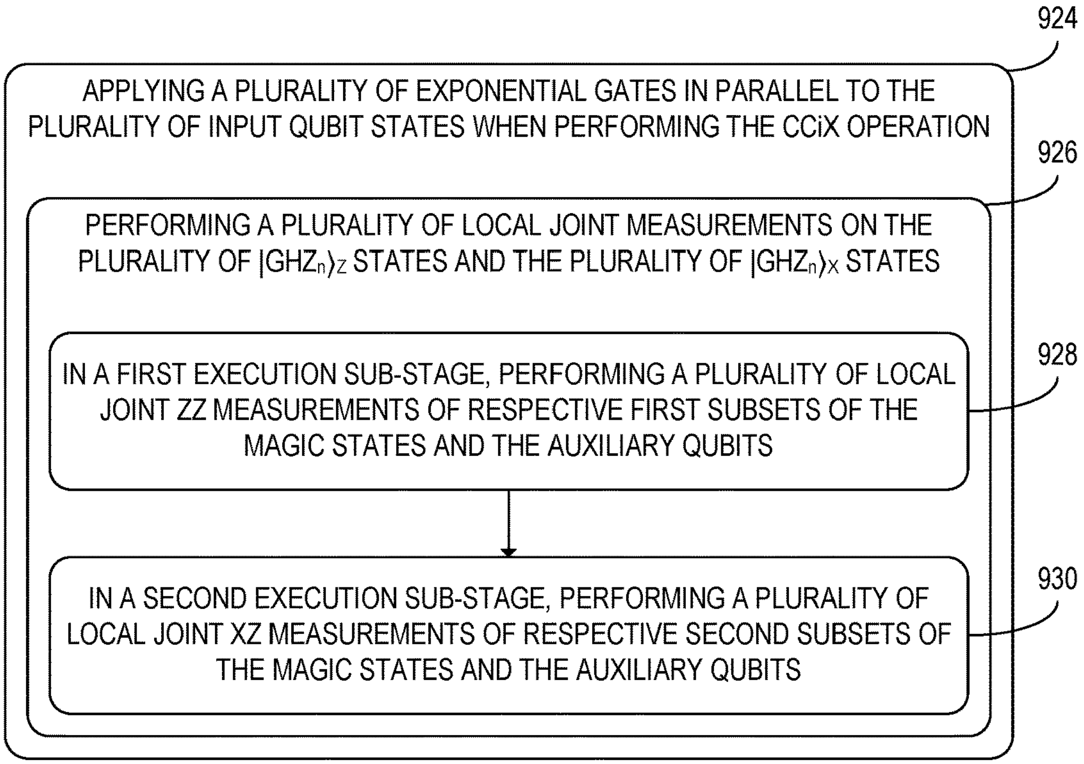
FIG. 41C shows additional steps of the method of FIG. 41A that may be performed at an execution stage.

FIG. 41C shows additional steps of the method 900 that may be performed during the execution stage at step 906 in some examples. At step 924, the method 900 may further include applying a plurality of exponential gates in parallel to the plurality of input qubit states when performing the CCiX operation. The plurality of exponential gates may include an $$e^{i\frac{\pi}{8}(I\otimes I\otimes Z)}\text{gate, an } e^{-i\frac{\pi}{8}(I\otimes Z\otimes Z)}\text{gate,}$$

$$\text{an } e^{-i\frac{\pi}{8}(Z\otimes I\otimes Z)}\text{gate, and an } e^{i\frac{\pi}{8}(Z\otimes Z\otimes Z)}\text{gate.}$$

Step 926 may be performed when applying the exponential gates at step 924 in examples in which a plurality of $|GHZ_n\rangle_Z$ states and the $|GHZ_n\rangle_X$ states are prepared at step 916. At step 926, the method 900 may include performing a plurality of local joint measurements on the plurality of $|GHZ_n\rangle_Z$ states and the plurality of $|GHZ_n\rangle_X$ states. In some examples, step 926 may include, at step 928, performing a first execution sub-stage. During the first execution sub-stage, a plurality of local joint ZZ measurements of respective first subsets of the magic states and the auxiliary qubits may be performed. In examples in which step 928 is performed, performing the plurality of local joint measurements at step 926 may further include, at step 930, performing a second execution sub-stage. The second execution sub-stage may include performing a plurality of local joint XZ measurements of respective second subsets of the magic states and the auxiliary qubits.

Using the table lookup circuits above, table lookup operations may be performed at a quantum computing device in a manner that is more efficient in terms of time elapsed and qubits used. Thus, the table lookup circuits discussed above may allow quantum algorithms that utilize table lookup operations to be executed more efficiently. In addition, through parallelization of some steps, the CCiX circuit discussed above may be used to apply CCiX gates in shorter amounts of time relative to existing CCiX circuits. The devices and methods discussed above may therefore increase the efficiency of a variety of different computation processes performed at quantum computing devices.

In some embodiments, the methods and processes described herein may be tied to a computing system of one or more computing devices. In particular, such methods and processes may be implemented as a computer-application program or service, an application-programming interface (API), a library, and/or other computer-program product.

Figure 42:
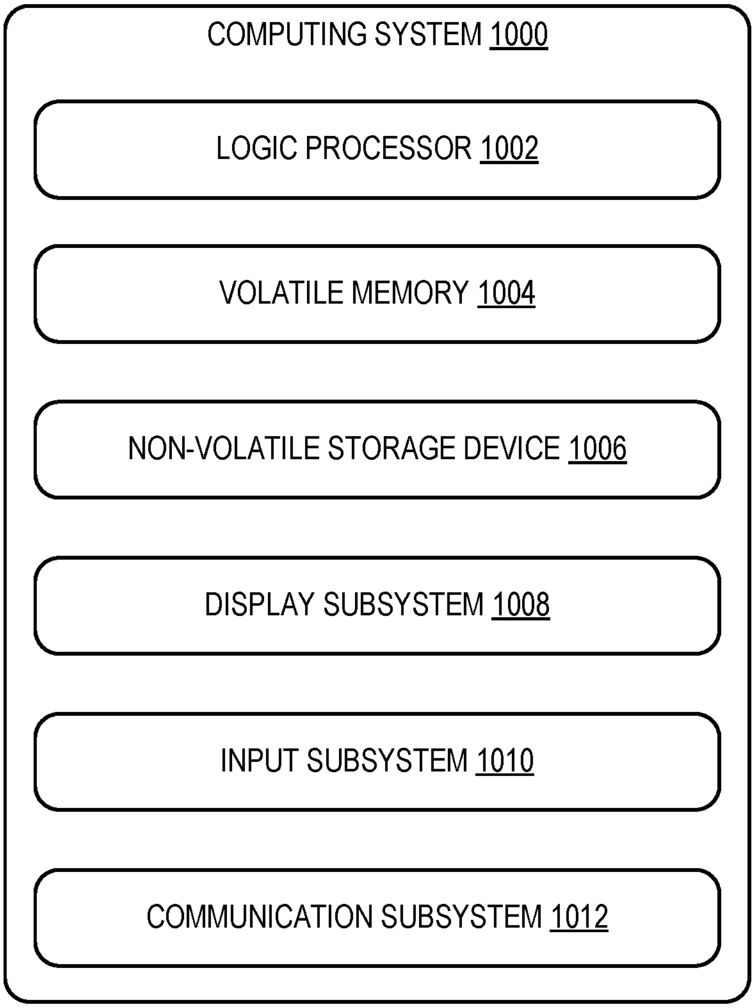
FIG. 42 shows a schematic view of an example computing environment in which components of the computing system of FIG. 1 may be instantiated.

FIG. 42 schematically shows a non-limiting embodiment of a computing system 1000 in which at least a portion of the quantum computing device 10 and/or the classical computing device 20 of FIG. 1 may be included. Computing system 1000 is shown in simplified form. Computing system 1000 may be instantiated at least in part at one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices. For example, one or more of the devices listed above may be used to implement the functionality of the classical computing device 20 included in the computing system 1 of FIG. 1 and may be configured to communicate with a quantum hardware accelerator that instantiates the quantum computing device 10. As another example, the quantum and classical components of the computing system 1 may be provided within a single physical computing device such as a server computing device.

Computing system 1000 includes a logic processor 1002, volatile memory 1004, and a non-volatile storage device 1006. Computing system 1000 may optionally include a display subsystem 1008, input subsystem 1010, communication subsystem 1012, and/or other components not shown in FIG. 42.

Logic processor 1002 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1002 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 1004 may include one or more physical devices that include random access memory. Volatile memory 1004 is typically utilized by logic processor 1002 to temporarily store information during processing of software instructions. It will be appreciated that volatile memory 1004 typically does not continue to store instructions when power is cut to the volatile memory 1004.

Non-volatile storage device 1006 includes one or more physical devices configured to hold instructions executable by the logic processors to implement the methods and processes described herein. When such methods and processes are implemented, the state of non-volatile storage device 1006 may be transformed—e.g., to hold different data.

Non-volatile storage device 1006 may include one or more physical devices that are removable from and/or built into a computing device. Non-volatile storage device 1006 may include optical memory, semiconductor memory, and/or magnetic memory, or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Aspects of logic processor 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 typically implemented in software by a processor to perform a particular function using portions of volatile memory, which function involves transformative processing that specially configures the processor to perform the function. Thus, a module, program, or engine may be instantiated via logic processor 1002 executing instructions held by non-volatile storage device 1006, using portions of volatile memory 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1008 may be used to present a visual representation of data held by non-volatile storage device 1006. The visual representation may take the form of a graphical user interface (GUI). As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more display devices utilizing virtually any type of technology. Such display devices may be combined with logic processor 1002, volatile memory 1004, and/or non-volatile storage device 1006 in a shared enclosure, or such display devices may be peripheral display devices.

When included, input subsystem 1010 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1012 may be configured to communicatively couple various computing devices described herein with each other, and with other devices. Communication subsystem 1012 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

The following paragraphs discuss several aspects of the present disclosure. According to one aspect of the present disclosure, a quantum computing device is provided, including a doubly controlled iX (CCiX) circuit. The CCiX circuit may be configured to, in a preparation stage, prepare a plurality of magic states. The CCiX circuit may be further configured to receive a plurality of input qubit states including a first control qubit state, a second control qubit state, and a target qubit state. In an execution stage, the CCiX circuit may be further configured to perform a CCiX operation on the target qubit state at least in part by performing a plurality of local joint measurements. At least a subset of the plurality of local joint measurements may be performed between the plurality of magic states and a plurality of auxiliary qubits. Performing the CCiX operation may further include performing a plurality of remote joint measurements of the input qubit states and a plurality of interface qubits included among the plurality of auxiliary qubits.

According to this aspect, the plurality of magic states prepared in the preparation stage may include a plurality of $|S_x\rangle$ states and a plurality of $|T\rangle$ states.

According to this aspect, the preparation stage may include a first preparation sub-stage in which the CCiX circuit is configured to prepare a first $|S_x\rangle$ state, a second $|S_x\rangle$ state, a first $|T\rangle$ state, and a second $|T\rangle$ state in parallel. The preparation stage may further include a second preparation sub-stage subsequent to the first preparation sub-stage in which the CCiX circuit is configured to prepare a third $|S_x\rangle$, a fourth $|S_x\rangle$ state, a third $|T\rangle$ state, and a fourth $|T\rangle$ state in parallel.

According to this aspect, performing the plurality of remote joint measurements may include, in each of a first execution sub-stage and a second execution sub-stage, performing two remote ZZ measurements and a remote XZ measurement.

According to this aspect, in the execution stage, the CCiX circuit may be configured to apply a plurality of exponential gates in parallel to the plurality of input qubit states when performing the CCiX operation.

According to this aspect, the CCiX circuit may be further configured to, in the preparation stage, prepare a plurality of $|GHZ_n\rangle_Z$ states and a plurality of $|GHZ_n\rangle_X$ states. The CCiX circuit may be further configured to, in the execution stage, apply the plurality of exponential gates at least in part by performing a plurality of local joint measurements on the plurality of $|GHZ_n\rangle_Z$ states and the plurality of $|GHZ_n\rangle_X$ states.

According to this aspect, the CCiX circuit may be configured to prepare the plurality of $|GHZ_n\rangle_Z$ states and the plurality of $|GHZ_n\rangle_X$ states at least in part by performing a plurality of quantum fanout operations.

According to this aspect, the CCiX circuit may be configured to prepare the plurality of $|GHZ_n\rangle_Z$ states and the plurality of $|GHZ_n\rangle_X$ states such that one or more of the $|GHZ_n\rangle_Z$ states and one or more of the $|GHZ_n\rangle_X$ states are formed along respective paths that have respective holes.

According to this aspect, the execution stage may include a first execution sub-stage in which the CCiX circuit is configured to perform a plurality of local joint ZZ measurements of respective first subsets of the magic states and the auxiliary qubits. The execution stage may further include a second execution sub-stage in which the CCiX circuit is configured to perform a plurality of local joint XZ measurements of respective second subsets of the magic states and the auxiliary qubits.

According to this aspect, the plurality of exponential gates may include an $$e^{i\frac{\pi}{8}(I\otimes I\otimes Z)}\text{gate, an } e^{-i\frac{\pi}{8}(I\otimes Z\otimes Z)}\text{gate,}$$

$$\text{an } e^{-i\frac{\pi}{8}(Z\otimes I\otimes Z)}\text{gate, and an } e^{i\frac{\pi}{8}(Z\otimes Z\otimes Z)}\text{gate.}$$

According to this aspect, the CCiX circuit may be further configured to perform a plurality of X corrections and a plurality of Z corrections subsequently to the execution stage.

According to this aspect, the CCiX circuit may be included in a rectangular grid of logical qubits.

According to another aspect of the present disclosure, a method for use with a quantum computing device is provided. The method may include, at a doubly controlled iX (CCiX) circuit, preparing a plurality of magic states in a preparation stage. The method may further include receiving a plurality of input qubit states including a first control qubit state, a second control qubit state, and a target qubit state. The method may further include, in an execution stage, performing a CCiX operation on the target qubit state at least in part by performing a plurality of local joint measurements. At least a subset of the plurality of local joint measurements may be performed between the plurality of magic states and a plurality of auxiliary qubits. Performing the CCiX operation may further include performing a plurality of remote joint measurements of the input qubit states and a plurality of interface qubits included among the plurality of auxiliary qubits.

According to this aspect, the plurality of magic states prepared in the preparation stage may include a plurality of $|S_x\rangle$ states and a plurality of $|T\rangle$ states. The preparation stage may include, in a first preparation sub-stage, preparing a first $|S_x\rangle$ state, a second $|S_x\rangle$ state, a first $|T\rangle$ state, and a second $|T\rangle$ state in parallel. The preparation stage may further include, in a second preparation sub-stage subsequent to the first preparation sub-stage, preparing a third $|S_x\rangle$, a fourth $|S_x\rangle$ state, a third $|T\rangle$ state, and a fourth $|T\rangle$ state in parallel.

According to this aspect, performing the plurality of remote joint measurements may include, in each of a first execution sub-stage and a second execution sub-stage, performing two remote ZZ measurements and a remote XZ measurement.

According to this aspect, the method may further include, in the execution stage, applying a plurality of exponential gates in parallel to the plurality of input qubit states when performing the CCiX operation. The plurality of exponential gates may include an $$e^{i\frac{\pi}{8}(I\otimes I\otimes Z)}\text{gate, an } e^{-i\frac{\pi}{8}(I\otimes Z\otimes Z)}\text{gate,}$$
$$\text{an } e^{-i\frac{\pi}{8}(Z\otimes I\otimes Z)}\text{gate, and an } e^{i\frac{\pi}{8}(Z\otimes Z\otimes Z)}\text{gate.}$$

According to this aspect, the method may further include, in the preparation stage, preparing a plurality of $|GHZ_n\rangle_Z$ states and a plurality of $|GHZ_n\rangle_Z$ states at least in part by performing a plurality of quantum fanout operations. The method may further include, in the execution stage, applying the plurality of exponential gates at least in part by performing a plurality of local joint measurements on the plurality of $|GHZ_n\rangle_Z$ states and the plurality of $|GHZ_n\rangle_X$ states.

According to this aspect, the execution stage may include, in a first execution sub-stage, performing a plurality of local joint ZZ measurements of respective first subsets of the magic states and the auxiliary qubits. The method may further include, in a second execution sub-stage, performing a plurality of local joint XZ measurements of respective second subsets of the magic states and the auxiliary qubits.

According to this aspect, the method may further include performing a plurality of X corrections and a plurality of Z corrections subsequently to the execution stage.

According to another aspect of the present disclosure, a quantum computing device is provided, including a doubly controlled iX (CCiX) circuit configured to, in a preparation stage, prepare a plurality of $|S_x\rangle$ states and a plurality of $|T\rangle$ states. The preparation stage may include, in a first preparation sub-stage, preparing a first $|S_x\rangle$ state, a second $|S_x\rangle$ state, a first $|T\rangle$ state, and a second $|T\rangle$ state in parallel. The preparation stage may further include, in a second preparation sub-stage subsequent to the first preparation sub-stage, preparing a third $|S_x\rangle$, a fourth $|S_x\rangle$ state, a third $|T\rangle$ state, and a fourth $|T\rangle$ state in parallel. In an execution stage, the CCiX circuit may be further configured to perform a CCiX operation on the target qubit state at least in part by, in a first execution sub-stage, performing a plurality of local joint ZZ measurements of respective first subsets of the $|S_x\rangle$ states, the $|T\rangle$ states, and the auxiliary qubits. Performing the CCiX operation may further include, in a second execution sub-stage, performing a plurality of local joint XZ measurements of respective second subsets of the $|S_x\rangle$ states, the $|T\rangle$ states, and the auxiliary qubits. The execution stage may further include, during each of the first execution sub-stage and the second execution sub-stage, performing a plurality of remote joint measurements of the input qubit states and a plurality of interface qubits included among the plurality of auxiliary qubits.

"And/or" as used herein is defined as the inclusive or v, as specified by the following truth table:

| A | B | A $\vee$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A quantum computing device comprising:

a doubly controlled iX (CCiX) circuit configured to:

in a preparation stage, prepare a plurality of magic states;

receive a plurality of input qubit states including a first control qubit state, a second control qubit state, and a target qubit state; and in an execution stage, perform a CCiX operation on the target qubit state at least in part by:

performing a plurality of local joint measurements, wherein at least a subset of the plurality of local joint measurements are performed between the plurality of magic states and a plurality of auxiliary qubits; and performing a plurality of remote joint measurements of the input qubit states and a plurality of interface qubits included among the plurality of auxiliary qubits.

2. The quantum computing device of claim 1, wherein the plurality of magic states prepared in the preparation stage includes a plurality of $|S_x\rangle$ states and a plurality of $|T\rangle$ states.

3. The quantum computing device of claim 2, wherein the preparation stage includes:

a first preparation sub-stage in which the CCiX circuit is configured to prepare a first $|S_x\rangle$ state, a second $|S_x\rangle$ state, a first $|T\rangle$ state, and a second $|T\rangle$ state in parallel; and a second preparation sub-stage subsequent to the first preparation sub-stage in which the CCiX circuit is configured to prepare a third $|S_x\rangle$, a fourth $|S_x\rangle$ state, a third $|T\rangle$ state, and a fourth $|T\rangle$ state in parallel.

4. The quantum computing device of claim 1, wherein performing the plurality of remote joint measurements includes, in each of a first execution sub-stage and a second execution sub-stage, performing two remote ZZ measurements and a remote XZ measurement.

5. The quantum computing device of claim 1, wherein, in the execution stage, the CCiX circuit is configured to apply a plurality of exponential gates in parallel to the plurality of input qubit states when performing the CCiX operation.

6. The quantum computing device of claim 5, wherein the CCiX circuit is further configured to:

in the preparation stage, prepare a plurality of $|GHZ_n\rangle_Z$ states and a plurality of $|GHZ_n\rangle_X$ states; and in the execution stage, apply the plurality of exponential gates at least in part by performing a plurality of local joint measurements on the plurality of $|GHZ_n\rangle_Z$ states and the plurality of $|GHZ_n\rangle_X$ states.

7. The quantum computing device of claim 6, wherein the CCiX circuit is configured to prepare the plurality of $|GHZ_n\rangle_Z$ states and the plurality of $|GHZ_n\rangle_X$ states at least in part by performing a plurality of quantum fanout operations.

8. The quantum computing device of claim 7, wherein the CCiX circuit is configured to prepare the plurality of $|GHZ_n\rangle_Z$ states and the plurality of $|GHZ_n\rangle_X$ states such that one or more of the $|GHZ_n\rangle_Z$ states and one or more of the $|GHZ_n\rangle_X$ states are formed along respective paths that have respective holes.

9. The quantum computing device of claim 6, wherein the execution stage includes:

a first execution sub-stage in which the CCiX circuit is configured to perform a plurality of local joint ZZ measurements of respective first subsets of the magic states and the auxiliary qubits; and a second execution sub-stage in which the CCiX circuit is configured to perform a plurality of local joint XZ measurements of respective second subsets of the magic states and the auxiliary qubits.

10. The quantum computing device of claim 5, wherein the plurality of exponential gates includes an $$e^{i\frac{\pi}{8}(I\otimes I\otimes Z)}\text{gate, an } e^{-i\frac{\pi}{8}(I\otimes Z\otimes Z)}\text{gate, an } e^{-i\frac{\pi}{8}(Z\otimes I\otimes Z)}\text{gate, and an } e^{i\frac{\pi}{8}(Z\otimes Z\otimes Z)}\text{gate.}$$

11. The quantum computing device of claim 1, wherein the CCiX circuit is further configured to perform a plurality of X corrections and a plurality of Z corrections subsequently to the execution stage.

12. The quantum computing device of claim 1, wherein the CCiX circuit is included in a rectangular grid of logical qubits.

13. A method for use with a quantum computing device that includes a doubtly controlled iX (CCiX) circuit and a measuremnet device, the method comprising:

at the (CCiX) circuit:

in a preparation stage, preparing a plurality of magic states;

receiving a plurality of input qubit states including a first control qubit state, a second control qubit state, and a target qubit state; and in an execution stage, performing a CCiX operation on the target qubit state at least in part by:

with the measurement device, performing a plurality of local joint measurements, wherein at least a subset of the plurality of local joint measurements are performed between the plurality of magic states and a plurality of auxiliary qubits; and with the measurement device, performing a plurality of remote joint measurements of the input qubit states and a plurality of interface qubits included among the plurality of auxiliary qubits.

14. The method of claim 13, wherein:

the plurality of magic states prepared in the preparation stage includes a plurality of $|S_x\rangle$ states and a plurality of $|T\rangle$ states; and the preparation stage includes:

in a first preparation sub-stage, preparing a first $|S_x\rangle$ state, a second $|S_x\rangle$ state, a first $|T\rangle$ state, and a second $|T\rangle$ state in parallel; and in a second preparation sub-stage subsequent to the first preparation sub-stage, preparing a third $|S_x\rangle$, a fourth $|S_x\rangle$ state, a third $|T\rangle$ state, and a fourth $|T\rangle$ state in parallel.

15. The method of claim 13, wherein performing the plurality of remote joint measurements includes, in each of a first execution sub-stage and a second execution sub-stage, performing two remote ZZ measurements and a remote XZ measurement.

16. The method of claim 13, further comprising, in the execution stage, applying a plurality of exponential gates in parallel to the plurality of input qubit states when performing the CCiX operation, wherein the plurality of exponential gates includes an $$e^{i\frac{\pi}{8}(I\otimes I\otimes Z)}\text{gate, an } e^{-i\frac{\pi}{8}(I\otimes Z\otimes Z)}\text{gate, an } e^{-i\frac{\pi}{8}(Z\otimes I\otimes Z)}\text{gate, and an } e^{i\frac{\pi}{8}(Z\otimes Z\otimes Z)}\text{gate.}$$

17. The method of claim 16, further comprising:

in the preparation stage, preparing a plurality of $|GHZ_n\rangle_Z$ states and a plurality of $|GHZ_n\rangle_X$ states at least in part by performing a plurality of quantum fanout operations; and in the execution stage, applying the plurality of exponential gates at least in part by performing a plurality of local joint measurements on the plurality of $|GHZ_n\rangle_Z$ states and the plurality of $|GHZ_n\rangle_X$ states.

18. The method of claim 17, wherein the execution stage includes:

in a first execution sub-stage, performing a plurality of local joint ZZ measurements of respective first subsets of the magic states and the auxiliary qubits; and in a second execution sub-stage, performing a plurality of local joint XZ measurements of respective second subsets of the magic states and the auxiliary qubits.

19. The method of claim 13, further comprising performing a plurality of X corrections and a plurality of Z corrections subsequently to the execution stage.

20. A quantum computing device comprising:

a doubly controlled iX (CCiX) circuit configured to:

in a preparation stage, prepare a plurality of $|S_x\rangle$ states and a plurality of $|T\rangle$ states at least in part by:

in a first preparation sub-stage, preparing a first $|S_x\rangle$ state, a second $|S_x\rangle$ state, a first $|T\rangle$ state, and a second $|T\rangle$ state in parallel; and in a second preparation sub-stage subsequent to the first preparation sub-stage, preparing a third $|S_x\rangle$, a fourth $|S_x\rangle$ state, a third $|T\rangle$ state, and a fourth $|T\rangle$ state in parallel; and in an execution stage, perform a CCiX operation on the target qubit state at least in part by:

in a first execution sub-stage, performing a plurality of local joint ZZ measurements of respective first subsets of the $|S_x\rangle$ states, the $|T\rangle$ states, and the auxiliary qubits;

in a second execution sub-stage, performing a plurality of local joint XZ measurements of respective second subsets of the $|S_x\rangle$ states, the $|T\rangle$ states, and the auxiliary qubits; and during each of the first execution sub-stage and the second execution sub-stage, performing a plurality of remote joint measurements of the input qubit states and a plurality of interface qubits included among the plurality of auxiliary qubits.

* * * * *